United States Patent
Reader et al.

(10) Patent No.: US 12,545,652 B2
(45) Date of Patent: Feb. 10, 2026

(54) CRYSTALLINE FORMS OF A TYK2 INHIBITOR

(71) Applicant: Sareum Limited, Cambridge (GB)

(72) Inventors: John Charles Reader, Cambridge (GB); Jamie Conor Marshall, Northumberland (GB); John Mykytiuk, Northumberland (GB); Julian Scott Northen, Tyne and Wear (GB)

(73) Assignee: SAREUM LIMITED, Cambridge (GB)

( * ) Notice: Subject to any disclaimer, the term of this patent is extended or adjusted under 35 U.S.C. 154(b) by 659 days.

(21) Appl. No.: 17/905,183

(22) PCT Filed: Apr. 6, 2021

(86) PCT No.: PCT/EP2021/058864
§ 371 (c)(1),
(2) Date: Aug. 29, 2022

(87) PCT Pub. No.: WO2021/204762
PCT Pub. Date: Oct. 14, 2021

(65) Prior Publication Data
US 2023/0159473 A1    May 25, 2023

(30) Foreign Application Priority Data
Apr. 7, 2020 (GB) ....................... 2005114

(51) Int. Cl.
*C07D 263/48* (2006.01)

(52) U.S. Cl.
CPC ........ *C07D 263/48* (2013.01); *C07B 2200/13* (2013.01)

(58) Field of Classification Search
CPC .......................... C07D 263/48; C07B 2200/13
See application file for complete search history.

(56) References Cited

U.S. PATENT DOCUMENTS

| | | |
|---|---|---|
| 7,125,891 B2 | 10/2006 | Breslin et al. |
| 8,378,095 B2 | 2/2013 | Reader et al. |
| 8,624,036 B2 | 1/2014 | Allegretti et al. |
| 8,921,544 B2 | 12/2014 | Reader et al. |
| 9,187,465 B2 | 11/2015 | Reader et al. |
| 10,882,829 B2 | 1/2021 | Reader |
| 11,154,539 B2 | 10/2021 | Reader |
| 11,673,870 B2 | 6/2023 | Reader |
| 12,187,716 B2 * | 1/2025 | Reader .................... A61P 29/00 |
| 2011/0166129 A1 | 7/2011 | Machacek et al. |
| 2013/0102592 A1 | 4/2013 | Reader et al. |
| 2013/0143915 A1 | 6/2013 | Ellard et al. |
| 2021/0387981 A1 | 12/2021 | Reader |

FOREIGN PATENT DOCUMENTS

| | | |
|---|---|---|
| DE | 2301030 | 2/1974 |
| DE | 19653355 A1 | 6/1998 |
| DK | 200600313 L | 3/2006 |
| EP | 2634185 A1 | 9/2013 |
| GB | 1374345 | 11/1974 |
| GB | 1497536 | 1/1978 |
| JP | 6310767 A | 1/1988 |
| RU | 2011114992 A | 10/2012 |
| SU | 623518 | 9/1978 |
| WO | 2001058890 A1 | 8/2001 |
| WO | 0200649 A1 | 1/2002 |
| WO | 2004005283 A1 | 1/2004 |
| WO | 2005040139 A2 | 5/2005 |
| WO | 2006095159 A1 | 9/2006 |
| WO | 2007043400 A1 | 4/2007 |
| WO | 2007131953 A1 | 11/2007 |
| WO | 2008024980 A2 | 2/2008 |

(Continued)

OTHER PUBLICATIONS

Argiriadi et al., "Enabling Structure-Based Drug Design of Tyk2 Through Co-Crystallization with a Stabilizing Aminoindazole Inhibitor", BMC Structural Biology, Biomed Central Ltd., London GB, vol. 12:22, (11 pages). Sep. 20, 2012.

Lykkeberg et al., "Preparation of Some 2,4-Disubstituted Imidazole-5-Carboxamides by Thermolysis of β-Substituted α-(1-Tetrazolyl) Acrylamides", Acta Chemica Scandinavica, Series B: Organic Chemistry and Biochemistry. 329(7), pp. 793-795. 1975.

Ozaki et al., "Syntheses of 5-Substituted Oxazole-4-Carboxylic Acid Derivatives with Inhibitory Activity on Blood Platelet Aggression", Chem. Pharm. Bull., 31(12), pp. 4417-4424. 1983.

(Continued)

*Primary Examiner* — Kamal A Saeed
(74) *Attorney, Agent, or Firm* — Heslin Rothenberg Farley & Mesiti P.C.

(57) ABSTRACT

The invention provides crystalline forms of a compound having the formula (1):

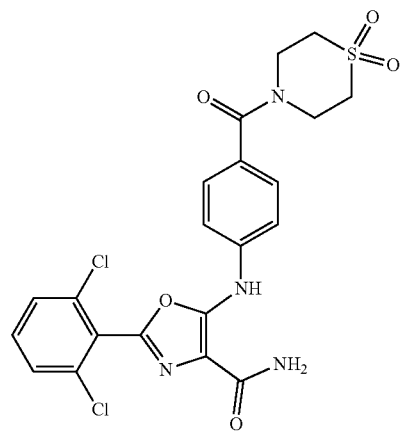

along with methods of making the crystalline forms and pharmaceutical formulations comprising the crystalline forms.

20 Claims, 12 Drawing Sheets

Specification includes a Sequence Listing.

(56) References Cited

FOREIGN PATENT DOCUMENTS

| WO | 2008139161 | A1 | 11/2008 |
|---|---|---|---|
| WO | 2008156726 | A1 | 12/2008 |
| WO | 2009155156 | A1 | 12/2009 |
| WO | 2010005841 | A1 | 1/2010 |
| WO | 2010011375 | A2 | 1/2010 |
| WO | 2010055304 | A2 | 5/2010 |
| WO | 2011113802 | A2 | 9/2011 |
| WO | 2012000970 | A1 | 1/2012 |
| WO | 2012021611 | A1 | 2/2012 |
| WO | 2013055645 | A1 | 4/2013 |
| WO | 2014074661 | A1 | 5/2014 |
| WO | 2015032423 | A1 | 3/2015 |
| WO | 2016027195 | A1 | 2/2016 |
| WO | 2018073438 | A1 | 4/2018 |
| WO | 2020074461 | A1 | 4/2020 |

OTHER PUBLICATIONS

Harrington et al., "VX-680, A Potent and Selective Small-Molecule Inhibitor of the Aurora Kinases, Suppresses Tumor Growth in vivo", Nature Medicine, vol. 10, No. 3, pp. 262-267. Mar. 2004.

Franchetti et al., "Synthesis and Antitumor Activity of 2-β-D-Ribofuranosylozazole-4-carbozamide", (Oxazofurin), J. Med. Chem., 33, pp. 2849-2852. 1990.

Jansen et al., Some 4-Substituted Oxazoles, J. Chem. Soc., pp. 405-411. 1961.

Morwick et al. "Evolution of the Trienopyridine Class of Inhibitors of IKB Kinase-B: Part I: Hit-to-Lead Strategies", J. Med. Chem., 49, pp. 2898-2908. 2006.

Spiekermann et al., "The Protein Tyrosine Kinase Inhibitor SU5614 Inhibits FLT3 and Induces Growth Arrest and Apoptosis in AML-Derived Cell Lines Expressing a Constitutively Activated FLT3", Blood, 101(4), pp. 1494-1504. 2003.

Ponomarev et al., Zhurnal Fizicheskoi Khimii, 64(10), pp. 2723-2729 (Chem Abs. 114:100938). 1990.

Works et al., "Inhibition of TYK2 and JAK1 Ameliorates Imiquimod-Induced Psoriasis-like Dermatitis by Inhibiting L-22 and the IL-23/IL-17 Axis", The Journal of Immunology, vol. 193. Aug. 25, 2014.

International Search Report and Written Opinion in International Application No. PCT/EP2019/077118. Dec. 9, 2019.

Search Report in GB Application No. 1816369.1. Mar. 28, 2019.

Papp et al., "Phase 2 Trial of Selective Tyrosine Kinase 2 Inhibition in Psoriasis", The New England Journal of Medicine, pp. 1313-1321. Sep. 12, 2018.

International Search Report and Written Opinion in International Application No. PCT/EP2021/058864, 16 pages. Jul. 6, 2021.

Search Report in Great Britain Application No. 2005114.0. Sep. 23, 2020.

* cited by examiner

CRYSTALLINE FORMS OF A TYK2 INHIBITOR

CROSS REFERENCE TO RELATED APPLICATIONS

This application is a U.S. National Phase filing under 35 U.S.C. § 371 of International Application PCT/EP2021/058864, filed Apr. 6, 2021, and published as WO2021/204762 A1 on Oct. 14, 2021. PCT/EP2021/058864 claims priority from Great Britain application number 2005114.0, filed Apr. 7, 2020. The entire contents of each of these prior applications are hereby incorporated herein by reference.

SEQUENCE LISTING

The instant application contains a Sequence Listing, created on Dec. 27, 2022; the file, in ASCII format, is designated H2549261.txt and is 675 bytes in size. The file is hereby incorporated by reference in its entirety into the instant application.

This invention relates to crystalline forms of the compound 2-(2,6-dichlorophenyl)-5-[4-(1,1-dioxo-1,4-thiazinane-4-carbonyl)anilino]oxazole-4-carboxamide, pharmaceutical compositions containing them and their use in the treatment of various diseases such as autoimmune diseases.

BACKGROUND OF THE INVENTION

Protein kinases constitute a large family of structurally related enzymes that are responsible for the control of a wide variety of signal transduction processes within the cell (Hardie and Hanks (1995) *The Protein Kinase Facts Book. I and II*, Academic Press, San Diego, CA). The kinases may be categorized into families by the substrates they phosphorylate (e.g., protein-tyrosine, protein-serine/threonine, lipids, etc.). Sequence motifs have been identified that generally correspond to each of these kinase families (e.g., Hanks and Hunter, *FASEB J.*, (1995) 9. 576-596; Knighton, et al., *Science*, (1991) 253, 407-414; Hiles, et al., *Cell*, (1992) 70, 419-429; Kunz, et al., *Cell*, (1993) 73, 585-596; Garcia-Bustos, et al., *EMBO J.*, (1994) 13, 2352-2361).

Protein kinases may be characterized by their regulation mechanisms. These mechanisms include, for example, autophosphorylation, transphosphorylation by other kinases, protein-protein interactions, protein-lipid interactions, and protein-polynucleotide interactions. An individual protein kinase may be regulated by more than one mechanism.

Kinases regulate many different cell processes including, but not limited to, proliferation, differentiation, apoptosis, motility, transcription, translation and other signalling processes, by adding phosphate groups to target proteins. These phosphorylation events act as molecular on/off switches that can modulate or regulate the target protein biological function. Phosphorylation of target proteins occurs in response to a variety of extracellular signals (hormones, neurotransmitters, growth and differentiation factors, etc.), cell cycle events, environmental or nutritional stresses, etc. The appropriate protein kinase functions in signalling pathways to activate or inactivate (either directly or indirectly), for example, a metabolic enzyme, regulatory protein, receptor, cytoskeletal protein, ion channel or pump, or transcription factor. Uncontrolled signalling due to defective control of protein phosphorylation has been implicated in a number of diseases, including, for example, inflammation, cancer, allergy/asthma, disease and conditions of the immune system, disease and conditions of the central nervous system, and angiogenesis.

The Janus kinase (JAK) family is a family of intracellular non-receptor tyrosine kinases, ranging in size from 120-140 kDa, that transduce cytokine-mediated signals via the JAK-STAT pathway. The JAK family plays a role in the cytokine-dependent regulation of proliferation and function of cells involved in immune response. Currently, there are four known mammalian JAK family members: JAK1, JAK2, JAK3 and TYK2. JAK1, JAK2 and TYK2 are ubiquitously expressed whereas JAK3 is expressed in the myeloid and lymphoid lineages. The JAK family members are non-receptor tyrosine kinases that associate with many hematopoietin cytokines, receptor tyrosine kinases and GPCR's.

Each JAK kinase protein has a kinase domain and a catalytically inactive pseudo-kinase domain. The JAK proteins bind to cytokine receptors through their amino-terminal FERM (Band-4.1, ezrin, radixin, moesin) domains. After the binding of cytokines to their receptors, JAKs are activated and phosphorylate the receptors, thereby creating docking sites for signalling molecules, especially for members of the signal transducer and activator of transcription (STAT) family (Yamaoka et al, 2004. The Janus kinases (Jaks). Genome Biology 5(12): 253).

In mammals, JAK1, JAK2 and TYK2 are ubiquitously expressed. TYK2 activates signal transducer and activator of transcription (STAT)-dependent gene expression and functional responses of interleukin-12, interleukin-23, and type I and III interferon receptors (Papp et al., The New England Journal of Medicine, 12 Sep. 2018, DOI: 10.1056/NEJMoa1806382 and references cited therein) These cytokine pathways are involved in the pathologic processes associated with immune-mediated disorders, including psoriasis, and are reported (Papp et al., idem) to be distinct from responses driven by Janus kinase (JAK) 1 (JAK1), JAK1 and JAK3 in combination, JAK2, or other signalling kinases.

Interleukin-23 (IL-23), composed of two subunits p19 and p40, is considered to be essential for the survival and expansion of Th17 cells which produce pro-inflammatory cytokines such as IL-17A, IL-17F, IL-6 and TNFα (see WO2014/07466 and references cited therein). These cytokines are reported as being critical in mediating the pathobiology of a number of autoimmune diseases including rheumatoid arthritis, multiple sclerosis, inflammatory bowel disease, and lupus.

IL-23 acts through a heterodimeric receptor composed of IL-12Rβ1 and IL-23R.

IL-12, in addition to the p40 subunit in common with IL-23, contains a p35 subunit and acts through a heterodimeric receptor composed of IL-12R1β and IL-12Rβ2. IL-12 is essential for Th1 cell development and secretion of IFNγ, a cytokine which plays a critical role in immunity by stimulating MHC expression, class switching of B cells to IgG subclasses, and the activation of macrophages (Gracie, J. A. et al., "Interleukin-12 induces interferon-gamma-dependent switching of IgG alloantibody subclass", Eur. J. Immunol, 26: 1217-1221 (1996); Schroder, K. et al., "Interferon-gamma: an overview of signals, mechanisms and functions", J. Leukoc. Biol, 75(2): 163-189 (2004)).

TYK2 associates with the IL-12Rβ1 subunit in the IL-12 and IL-23 receptors.

The importance of the p40-containing cytokines in autoimmunity is demonstrated by the discovery that mice deficient in either p40, p19, or IL-23R are protected from disease in models of multiple sclerosis, rheumatoid arthritis, inflammatory bowel disease, lupus and psoriasis, among others (Kyttaris, V. C. et al, "Cutting edge: IL-23 receptor deficiency prevents the development of lupus nephritis in C57BL/6-lpr/lpr mice", J. Immunol, 184:4605-4609 (2010); Hong, K. et al, "IL-12, independently of IFN-gamma, plays a crucial role in the pathogenesis of a murine psoriasis like skin disorder", J. Immunol, 162:7480-7491 (1999); Hue, S. et al, "Interleukin-23 drives innate and T cell-mediated intestinal inflammation", J. Exp. Med., 203:2473-2483 (2006); Cua, D. J. et al., "Interleukin-23 rather than interleukin-12 is the critical cytokine for autoimmune inflammation of the brain", Nature, 421:744-748 (2003); Murphy, C. A. et al., "Divergent pro- and anti-inflammatory roles for IL-23 and IL-12 in joint autoimmune inflammation", J. Exp. Med, 198: 1951-1957 (2003)).

The role of TYK2 in the biological response to cytokines has been characterized using a mutant human cell line that was resistant to the effects of Type I interferons (IFNs) and by demonstrating that IFNα responsiveness could be restored by genetic complementation of TYK2 (Velazquez et al, 1992. Cell 70, 313-322). Further in vitro studies have implicated TYK2 in the signalling pathways of multiple other cytokines involved in both innate and adaptive immunity. However, analysis of TYK2$^{-/-}$ mice revealed less profound immunological defects than were anticipated (Karaghiosoff et al, 2000. Immunity 13, 549-560; Shimoda et al, 2000. Immunity 13, 561-671). Surprisingly, TYK2 deficient mice display merely reduced responsiveness to IFNα/β and signal normally to interleukin 6 (IL-6) and interleukin 10 (IL-10), both of which activate TYK2 in vitro. In contrast, TYK2 was shown to be essential for IL-12 signalling with the absence of TYK2 resulting in defective STAT4 activation and the failure of T cells from these mice to differentiate into IFNy-producing Th1 cells. Consistent with the involvement of TYK2 in mediating the biological effects of Type I IFNs and IL-12, TYK2$^{-/-}$ mice were more susceptible to viral and bacterial infections.

The first patient with an autosomal recessive TYK2 deficiency was described by Minegishi et al, 2006. Immunity 25, 745-755. The homozygous deletion of four base pairs (GCTT at nucleotide 550 in the TYK2 gene) and consequent frameshift mutation in the patient's coding DNA introduced a premature stop codon and resulted in the truncation of the TYK2 protein at amino acid 90. The phenotype of this null mutation in human cells was much more severe than predicted by the studies in murine cells lacking TYK2. The patient displayed clinical features reminiscent of the primary immunodeficiency hyper-IgE syndrome (HIES) including recurrent skin abscesses, atopic dermatitis, highly elevated serum IgE levels and susceptibility to multiple opportunistic infections.

Contrary to reports in TYK2$^{-/-}$ mice, signalling by a wide variety of cytokines was found to be impaired thus highlighting non-redundant roles for human TYK2 in the function of Type I IFNs, IL-6, IL-10, IL-12 and IL-23. An imbalance in T helper cell differentiation was also observed, with the patient's T cells exhibiting an extreme skew towards the development of IL-4 producing Th2 cells and impaired Th1 differentiation. Indeed, these cytokine signalling defects could be responsible for many of the clinical manifestations described, for example atopic dermatitis and elevated IgE levels (enhanced Th2), increased incidence of viral infections (IFN defect), infection with intracellular bacteria (IL-12/ThI defect) and extracellular bacteria (IL-6 and IL-23/Th17 defect).

Seven further TYK2-deficient patients from five families and four different ethnic groups were identified by Kreins et al., pages 1-22, The Journal of Experimental Medicine, published 24 Aug. 2015. These patients were homozygous for one of five null mutations. By comparing the data obtained by Minegishi et al. with the data obtained for the seven further TYK2-deficient patients, Kreins et al. concluded that the core clinical phenotype of TYK2 deficiency is mycobacterial and/or viral infections, caused by impaired responses to IL-12 and IFN-α/β but that impaired IL-6 responses and HIES do not appear to be intrinsic features of TYK2 deficiency in humans.

Emerging evidence from genome-wide association studies suggests that single nucleotide polymorphisms (SNPs) in the TYK2 gene significantly influence autoimmune disease susceptibility.

Less efficient TYK2 variants are associated with protection against systemic lupus erythematosus (SLE) (TYK2 rs2304256 and rs12720270, Sigurdsson et al, 2005. Am. J. Hum. Genet. 76, 528-537; Graham et al, 2007. Rheumatology 46, 927-930; Hellquist et al, 2009. J. Rheumatol. 36, 1631-1638; Jarvinen et al, 2010. Exp. Dermatol. 19, 123-131) and multiple sclerosis (MS) (rs34536443, Ban et al, 2009. Eur. J. Hum. Genet. 17, 1309-1313; Mero et al, 2009. Eur. J. Hum. Genet. 18, 502-504), whereas predicted gain-of-function mutations increase susceptibility to inflammatory bowel disease (IBD) (rs280519 and rs2304256, Sato et al, 2009. J. Clin. Immunol. 29, 815-825).

It has been reported (see WO2014074661 and references cited therein) that in humans, individuals expressing an inactive variant of TYK2 are protected from multiple sclerosis and possibly other autoimmune disorders, and that genome-wide association studies have shown other variants of TYK2 to be associated with autoimmune disorders such as Crohn's Disease, psoriasis, systemic lupus erythematosus, and rheumatoid arthritis, further demonstrating the importance of TYK2 in autoimmunity.

In support of the involvement of TYK2 in immunopathologic disease processes, it has been shown that B10.D1 mice harbouring a missense mutation in the pseudokinase domain of TYK2 that results in the absence of encoded TYK2 protein are resistant to both autoimmune arthritis (CIA) and experimental autoimmune encephalomyelitis (EAE) (Shaw et al, 2003. PNAS 100, 11594-11599; Spach et al, 2009. J. Immunol. 182, 7776-7783). Furthermore, a recent study showed that TYK2[1] mice were completely resistant to MOG-induced EAE (Oyamada et al, 2009. J. Immunol. 183, 7539-7546). In these mice resistance was accompanied by a lack of CD4 T cells infiltrating the spinal cord, a failure to signal through IL-12R and IL-23R and hence the inability to upregulate encephalitogenic levels of IFNy and IL-17.

Overexpression of TYK2 kinase has been implicated in the development of some disease states. For example, elevated levels of TYK2 were found in patients suffering from progressive pulmonary sarcoidosis (Schischmanoff et al., *Sarcoidosis Vasc. Diffuse.*, 2006, 23(2), 101-7).

Thus, the available evidence strongly indicates that TYK2 plays essential roles in both innate and adaptive immunity. A lack of TYK2 expression manifests in the attenuated signalling of multiple proinflammatory cytokines and a profound imbalance in T helper cell differentiation. Furthermore, evidence from genetic association studies supports that TYK2 is a shared autoimmune disease susceptibility gene. Taken together, these reasons suggest TYK2 as a target for the treatment of inflammatory and auto-immune diseases.

Several JAK family inhibitors have been reported in the literature which may be useful in the medical field (Ghoreschi et al, 2009. Immunol Rev, 228:273-287). It has been proposed that a selective TYK2 inhibitor that inhibits TYK2 with greater potency than JAK2 may have advantageous therapeutic properties, because inhibition of JAK2 can cause anemia (Ghoreschi et al, 2009. Nature Immunol. 4, 356-360).

Papp et al. (The New England Journal of Medicine, 12 Sep. 2018, DOI: 10.1056/NEJMoa1806382) disclose the results obtained in Phase II clinical trials of the oral selective TYK2 inhibitor BMS-986165 in treating psoriasis and concluded that the results indicated a therapeutic benefit.

WO2014/074661 (Bristol-Myers Squibb) discloses a class of pyridazine and triazine amides as TYK2 inhibitors that are useful in the modulation of IL-12 IL-23 and/or IFNα. It is suggested that the compounds will be useful in the treatment of various inflammatory and autoimmune diseases.

WO2016/027195 (Pfizer) discloses a series of aminopyrimidinyl compounds having JAK kinase inhibiting activity, including activity against TYK2 kinase.

WO2012/000970 (Cellzome) discloses a series of triazolopyridines as TYK2 kinase inhibitors. WO2011/113802 (Roche) discloses a series of imidazopyridines as TYK2 kinase inhibitors. The properties of JAK kinases and their relevance as therapeutic targets are also disclosed in WO2008/156726, WO2009/155156, WO2010/005841 and WO2010/011375, all in the name of Merck.

WO2010/055304 and EP2634185 (both in the name of Sareum) disclose a family of substituted oxazole carboxamides for use in the prophylaxis or treatment of autoimmune diseases and in particular multiple sclerosis. The compounds disclosed in WO2010/055304 are described as being FLT3 kinase inhibitors. The kinase inhibiting effect of oxazole carboxamides is also disclosed in International patent application WO2008/139161 (Sareum).

WO2015/032423 (Sareum) discloses the use of a subset of oxazole carboxamide compounds as TYK2 kinase inhibitors. The compounds are described as being useful in the treatment of inflammatory and immunological disorders such as autoimmune diseases.

WO2018/073438 (Sareum) discloses the use of a subset of oxazole carboxamide compounds having TYK2 kinase inhibitory activity for use in treating T-cell lymphoblastic leukemias and cancers (such as hematopoietic cancers) which depend on the Janus kinase TYK2 for cancer cell survival.

Our earlier International patent application PCT/EP2019/077118 discloses the compound 2-(2,6-dichlorophenyl)-5-[4-(1,1-dioxo-1,4-thiazinane-4-carbonyl)anilino]oxazole-4-carboxamide as a TYK2 kinase inhibitor having improved potency against TYK2 and improved pharmacokinetic properties.

The Invention

It has now been found that the compound of formula (1), 2-(2,6-dichlorophenyl)-5-[4-(1,1-dioxo-1,4-thiazinane-4-carbonyl)anilino]oxazole-4-carboxamide, can form several different crystalline forms.

Accordingly, in a first embodiment (Embodiment 1.0), the invention provides a substantially crystalline form of a compound having the formula (1):

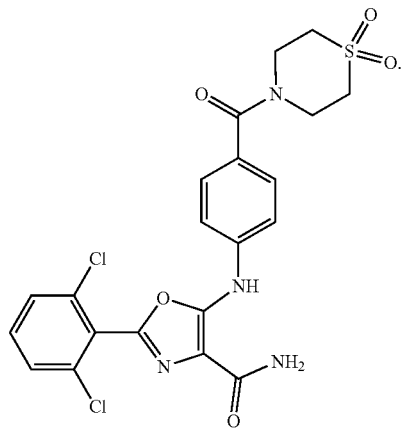 [SMILES: NC(=O)c1nc(-c2c(Cl)cccc2Cl)oc1Nc1ccc(C(=O)N2CCS(=O)(=O)CC2)cc1]

The crystalline form can be, for example, any one of crystalline forms A, B, C and D as defined herein.

The above compound may be referred to herein variously as "a compound having the formula (1)", "the compound of formula (1)", "compound (1)", "compound of the formula (1)", "Compound (1)" or "a compound of the invention", or like terms, and these terms are used herein as synonyms.

In an amorphous solid, the three-dimensional structure that normally exists in a crystalline form does not exist and the positions of the molecules relative to one another in the amorphous form are essentially random, see for example Hancock et al. *J. Pharm. Sci.* (1997), 86, 1).

The term "substantially crystalline" refers to forms of the compound of formula (1) in which it is from 50% to 100% crystalline. Within this range, the compound of formula (1) may be at least 55% crystalline, or at least 60% crystalline, or at least 70% crystalline, or at least 80% crystalline, or at least 90% crystalline, or at least 95% crystalline, or at least 98% crystalline, or at least 99% crystalline, or at least 99.5% crystalline, or at least 99.9% crystalline, for example 100% crystalline.

The crystalline form of the compound of formula (1) is preferably one having a crystalline purity of at least 90%, more preferably at least 95%; i.e. at least 90% (more preferably at least 95%) of the compound is of a single crystalline form (e.g. Form A or Form B).

The crystalline forms of the compound of the invention may be solvated (e.g. hydrated) or non-solvated (e.g. anhydrous).

The term "anhydrous" as used herein does not exclude the possibility of the presence of some water on or in the compound (e.g. a crystal of the compound). For example, there may be some water present on the surface of the compound (e.g. crystal), or minor amounts within the body of the compound (e.g. crystal). Typically, an anhydrous form contains fewer than 0.4 molecules of water per molecule of compound, and more preferably contains fewer than 0.1 molecules of water per molecule of compound, for example 0 molecules of water.

Where the crystalline forms are hydrated, they can contain, for example, up to three molecules of water of crystallisation, more usually up to two molecules of water, e.g. one molecule of water or two molecules of water. Non-stoichiometric hydrates may also be formed in which the number of molecules of water present is less than one or is otherwise a non-integer. For example, where there is less than one molecule of water present, there may be for example 0.4, or 0.5, or 0.6, or 0.7, or 0.8, or 0.9 molecules of water present per molecule of compound (1).

The crystalline forms described herein, crystals thereof and their crystal structure form further aspects of the invention.

The crystalline forms can be characterised using a number of techniques including, X-ray powder diffraction (XRPD), single crystal X-ray diffraction, differential scanning calorimetry (DSC) and thermogravimetric analysis (TGA). The behaviour of the crystals under conditions of varying humidity can be analysed by gravimetric vapour sorption studies (such as dynamic vapour sorption (DVS)).

The crystalline structure of a compound can be analysed by the solid-state technique of X-ray Powder Diffraction (XRPD). XRPD can be carried out according to conventional methods such as those described herein (see the Examples below) and in "Introduction to X-ray Powder Diffraction", Ron Jenkins and Robert L. Snyder (John Wiley & Sons, New York, 1996). The presence of defined peaks (as opposed to random background noise) in an XRPD diffractogram indicates that the compound has a degree of crystallinity. A compound's X-ray powder pattern is characterised by the diffraction angle ($2\theta$) and interplanar spacing (d) parameters of an X-ray diffraction spectrum. These are related by Bragg's equation, $n\lambda = 2d \sin \theta$, (where $n=1$; $\lambda$=wavelength of the X-ray radiation; d=interplanar spacing; and $\theta$=diffraction angle). XRPD data for each of the crystalline Forms A, B, C and D are set out below. The relative intensities given should not be strictly interpreted since they may vary depending on the direction of crystal growth, particle sizes and the measurement conditions. In addition, the diffraction angles usually mean those that coincide in the range of $2\theta \pm 0.2°$.

Form A

Form A is typically formed when the compound is dispersed in an aqueous solvent and conditions are created to allow crystallisation into Form A to take place. For example, Form A can be prepared by dissolving or suspending amorphous compound in an aqueous solvent such as water, 4:1 MeCN/water or 4:1 THF/water, and then subjecting the mixture to one or more (e.g. two) heating and cooling cycles whereby the mixture is heated to a moderately elevated temperature such as 50° C., held at the moderately elevated temperature for a period of time (e.g. at least several hours), cooled to a lower temperature around room temperature (e.g. around 25° C.) and allowed to equilibrate for a period of time at the lower temperature. Form A can also be prepared by dissolving compound (1) in a water miscible solvent such as DMSO and then slowly adding water, e.g, over a period of at least an hour and more usually at least one and a half hours (e.g. approximately two hours).

Further methods of preparing crystalline Form A are set out below and in the Examples.

The XRPD diffractogram for Form A is shown in FIG. 1.

The X-ray diffraction pattern of crystalline Form A of compound (1) exhibits peaks of greatest intensity at the diffraction angles ($2\theta$) set out in Table A-1, i.e. 23.1°, 12.3°, 16.7°, 20.7° and 13.7° ($\pm 0.2°$).

TABLE A-1

| Diffraction Angle (°) | Relative Intensity |
|---|---|
| 23.1 | 100 |
| 12.3 | 89.3 |

TABLE A-1-continued

| Diffraction Angle (°) | Relative Intensity |
|---|---|
| 16.7 | 80.1 |
| 20.7 | 57.6 |
| 13.7 | 51.4 |

Accordingly, in further embodiments, the invention provides:

1.1 A crystalline form according to Embodiment 1.0 which is of Form A as defined herein.

1.2 A substantially crystalline form (Form A) of the compound of formula (1) having an X-ray powder diffraction pattern characterised by the presence of major peaks at the diffraction angles ($2\theta$) 23.1° and/or 12.3° and/or 16.7° and/or 20.7° and/or 13.7°.

1.3 A substantially crystalline form (Form A) of the compound of formula (1) having an X-ray powder diffraction pattern characterised by the presence of a major peak at the diffraction angle ($2\theta$) 23.1° ($\pm 0.2°$).

1.4 A substantially crystalline form (Form A) of the compound of formula (1) having an X-ray powder diffraction pattern characterised by the presence of a major peak at the diffraction angle ($2\theta$) 12.3° ($\pm 0.2°$).

1.5 A substantially crystalline form (Form A) of the compound of formula (1) having an X-ray powder diffraction pattern characterised by the presence of a major peak at the diffraction angle ($2\theta$) 16.7° ($\pm 0.2°$).

1.6 A substantially crystalline form (Form A) of the compound of formula (1) having an X-ray powder diffraction pattern characterised by the presence of a major peak at the diffraction angle ($2\theta$) 20.7° ($\pm 0.2°$).

1.7 A substantially crystalline form (Form A) of the compound of formula (1) having an X-ray powder diffraction pattern characterised by the presence of a major peak at the diffraction angle ($2\theta$) 13.7° ($\pm 0.2°$)

1.8 A substantially crystalline form (Form A) of the compound of formula (1) having an X-ray powder diffraction pattern characterised by the presence of major peaks at two or more, e.g. three or more, or four or more, and in particular five diffraction angles ($2\theta$) selected from 23.1°, 12.3°, 16.7°, 20.7° and 13.7° ($\pm 0.2°$).

The X-ray powder diffraction pattern of Form A of compound (1) may also have lesser peaks present at the diffraction angles ($2\theta$) set out in Table A-2, i.e. 21.9°, 20.8°, 10.7°, 23.6° and 21.4° ($\pm 0.2°$).

TABLE A-2

| Diffraction Angle (°) | Relative Intensity |
|---|---|
| 21.9 | 48.5 |
| 20.8 | 45.2 |
| 10.7 | 43.2 |
| 23.6 | 41.8 |
| 21.4 | 40.1 |

Therefore, in further embodiments, the invention provides:

1.9 A substantially crystalline form (Form A) of the compound of formula (1) having an X-ray powder diffraction pattern characterised by the presence of major peaks at the diffraction angles ($2\theta$) 23.1° and/or 12.3° and/or 16.7° and/or 20.7° and/or 13.7° (e.g. at least four and more particularly at least five of the diffraction angles), and optionally one or more further peaks at diffraction angles (2θ) selected from 21.9°, 20.8°, 10.7°, 23.6° and 21.4° (±0.2°).

1.10 A substantially crystalline form (Form A) of the compound of formula (1) having an X-ray powder diffraction pattern characterised by the presence of major peaks at the diffraction angles (2θ) 23.1° and/or 12.3° and/or 16.7° and/or 20.7° and/or 13.7° (e.g. at least four and more particularly at least five of the diffraction angles), and optionally one or more further peaks at diffraction angles (2θ) selected from 21.9°, 20.8° and 10.7° (±0.2°).

1.11 A substantially crystalline form (Form A) of the compound of formula (1) having an X-ray powder diffraction pattern characterised by the presence of major peaks at the diffraction angles (2θ) 23.1°, 12.3°, 16.7°, 20.7° and 13.7°, and one or more further peaks at diffraction angles (2θ) selected from 21.9°, 20.8° and 10.7° (±0.2°).

The X-ray powder diffraction pattern may be further characterised by the presence of additional peaks at the diffraction angles (2θ) (±0.2°) set out in Table A-3.

TABLE A-3

| Diffraction Angle (°) | Relative Intensity |
| --- | --- |
| 21.1 | 36.7 |
| 26.0 | 29.6 |
| 24.7 | 28.9 |
| 15.9 | 25.8 |
| 17.9 | 25.3 |

Accordingly, in further embodiments, the invention provides:

1.12 A substantially crystalline form (Form A) of the compound of formula (1) having an X-ray powder diffraction pattern characterised by the presence of major peaks at the diffraction angles (2θ) 23.1°, 12.3°, 16.7°, 20.7° and 13.7°; one or more further peaks at diffraction angles (2θ) selected from 21.9°, 20.8°, 10.7°, 23.6° and 21.4° (±0.2°); and optionally one or more further peaks at diffraction angles (2θ) selected from 21.1°, 26.0°, 24.7°, 15.9° and 17.9° (±0.2°).

1.13 A substantially crystalline form (Form A) of compound (1) which exhibits peaks at the diffraction angles set forth in Table 3 in the Examples section herein which have a relative intensity of at least 15%.

1.14 A substantially crystalline form (Form A) of compound (1) which exhibits peaks at the diffraction angles corresponding to those of the X-ray powder diffraction pattern shown in FIG. 3.

1.15 A substantially crystalline form (Form A) of compound (1) having an X-ray powder diffraction pattern substantially as shown in FIG. 3.

The crystalline form of the invention can also be characterised by differential scanning calorimetry (DSC) and has been found to exhibit an endothermic event with an onset temperature of about 182° C. and a peak at about 194° C. as shown in FIG. 4 of the accompanying drawings.

Therefore, in a further embodiment, the invention provides:

1.16 A substantially crystalline form (Form A) of compound (1) according to any one of Embodiments 1.1 to 1.15 which has a DSC thermogram characterized by an endotherm with an onset and maxima at about an onset temperature of about 182° C. and a peak at about 194° C.

1.17 A substantially crystalline form (Form A) of compound (1) according to any one of Embodiments 1.1 to 1.15 which has a DSC thermogram substantially as shown in FIG. 4 of the drawings appended hereto.

The invention also provides methods for making crystalline Form A. Accordingly, in further embodiments, the invention provides:

1.18 A method for the preparation of a substantially crystalline form (Form A) of compound (1) as defined in any one of Embodiments 1.1 to 1.17, which method comprises:
(i) dispersing an amorphous form of compound (1) in an aqueous solvent selected from water, water/acetonitrile (e.g. 4:1 MeCN/water) and water/THF (e.g. 4:1 THF/water) to form a mixture;
(ii) heating the mixture to a moderately elevated temperature in the range from 45-65° C. and holding the mixture at the moderately elevated temperature for a period of at least 10 hours (for example from 10 to 25 hours, e.g. about 17 hours);
(iii) cooling or allowing the cooling of the mixture from the moderately elevated temperature to a lower temperature in the range from 15-30° C. (e.g. 20-30° C. such as approximately 25° C.) and holding the mixture at the lower temperature for a period of at least 2 hours (e.g. 2 to 8 hours such as approximately 4.5 hours); and
(iv) optionally subjecting the mixture to a further heating and cooling cycle comprising heating the mixture to a moderately elevated temperature in the range from 45-65° C. and holding the mixture at the moderately elevated temperature for a period of at least 10 hours (for example from 10 to 25 hours, e.g. about 16 hours); cooling the mixture to a lower temperature in the range from 15-30° C. (e.g. 20-30° C. such as approximately 25° C.) and optionally holding the mixture at the lower temperature for a period of at least half an hour (e.g. up to approximately 1 hour); and
(v) isolating (e.g. by filtration) the crystalline Form A of compound (1) thus formed.

1.19 A method for the preparation of a substantially crystalline form (Form A) of compound (1) as defined in any one of Embodiments 1.1 to 1.17, which method comprises:
(i) dissolving compound (1) in a mixture of a water miscible organic solvent (such as THF or acetonitrile) and water with heating to a moderately elevated temperature (e.g. from 50° C. to 70° C., such as approximately 60° C.);
(ii) adding an antisolvent such as a hydrocarbon or halogenated hydrocarbon (e.g. cyclohexane, heptane, benzotrifluoride and 2-chlorobutane) at the moderately elevated temperature; and
(iii) cooling the resulting mixture over a period of at least one hour (more usually at least two hours, e.g. approximately three hours) to room temperature (e.g. approximately 25° C.); and
(iv) optionally equilibrating the mixture over a further period of at least 2 hours, more usually at least five hours, and more particularly at least ten hours; and
(v) isolating the crystalline Form A.

1.20 A method for the preparation of a substantially crystalline form (Form A) of compound (1) as defined in any one of Embodiments 1.1 to 1.17, which method comprises:

(i) dissolving the compound (1) in a water miscible organic solvent such as DMSO; and
(ii) slowly (e.g. over a period of at least an hour, more usually at least 1.5 hours (e.g. approximately 2 hours) adding water to precipitate the compound (1) as crystalline Form A.

Form B

Form B can be formed by equilibration of amorphous compound in hydrocarbon solvents, some halogenated hydrocarbon solvents (e.g. chlorobenzene, 2-chlorobutane, benzotrifluoride), some alcohols (methanol and IPA), some ketones (MIBK and MEK), some ethers (CPME, TBME, THF) and some aliphatic esters (iPrOAc) following the procedures set out in the Examples.

Form B can also be formed by equilibration of crystalline Form A in methylethylketone (MEK) following the procedures set out in the Examples.

In a further method of preparing Form B, the compound is dissolved in THF, a hydrocarbon or halogenated hydrocarbon anti-solvent (e.g. cyclohexane, heptane, benzotrifluoride or 2-chlorobutane) is added and the mixture is subjected to equilibration as described in the Examples, to give Form B.

The XRPD diffractogram for Form B is shown in FIG. 6.

The X-ray diffraction pattern of crystalline Form B of compound (1) exhibits peaks of greatest intensity at the diffraction angles (2θ) set out in Table B-1, i.e. 23.2°, 16.7°, 22.6°, 26.6° and 12.0° (±0.2°).

TABLE B-1

| Diffraction Angle (°) | Relative Intensity |
|---|---|
| 23.2 | 100 |
| 16.7 | 92.2 |
| 22.6 | 87.6 |
| 26.6 | 64.5 |
| 12.0 | 53.7 |

Accordingly, in further embodiments, the invention provides:

2.1 A crystalline form according to Embodiment 1.0 which is of Form B as defined herein.

2.2 A substantially crystalline form (Form B) of the compound of formula (1) having an X-ray powder diffraction pattern characterised by the presence of major peaks at the diffraction angles (2θ) 23.2° and/or 16.7° and/or 22.6° and/or 26.6° and/or 12.0°.

2.3 A substantially crystalline form (Form B) of the compound of formula (1) having an X-ray powder diffraction pattern characterised by the presence of a major peak at the diffraction angle (2θ) 23.2° (±0.2°).

2.4 A substantially crystalline form (Form B) of the compound of formula (1) having an X-ray powder diffraction pattern characterised by the presence of a major peak at the diffraction angle (2θ) 16.7° (±0.2°).

2.5 A substantially crystalline form (Form B) of the compound of formula (1) having an X-ray powder diffraction pattern characterised by the presence of a major peak at the diffraction angle (2θ) 22.6° (±0.2°).

2.6 A substantially crystalline form (Form B) of the compound of formula (1) having an X-ray powder diffraction pattern characterised by the presence of a major peak at the diffraction angle (2θ) 26.6° (±0.2°).

2.7 A substantially crystalline form (Form B) of the compound of formula (1) having an X-ray powder diffraction pattern characterised by the presence of a major peak at the diffraction angle (2θ) 12.0° (±0.2°)

2.8 A substantially crystalline form (Form B) of the compound of formula (1) having an X-ray powder diffraction pattern characterised by the presence of major peaks at two or more, e.g. three or more, or four or more, and in particular five diffraction angles (2θ) selected from 23.2°, 16.7°, 22.6°, 26.6° and 12.0° (±0.2°).

The X-ray powder diffraction pattern of Form B of compound (1) may also have lesser peaks present at the diffraction angles (2θ) set out in Table B-2, i.e. 23.4°, 25.3°, 7.1°, 19.9° and 27.8° (±0.2°).

TABLE B-2

| Diffraction Angle (°) | Relative Intensity |
|---|---|
| 23.4 | 42.9 |
| 25.3 | 42.6 |
| 7.1 | 30.0 |
| 19.9 | 27.8 |
| 27.8 | 27.4 |

Therefore, in further embodiments, the invention provides:

2.9 A substantially crystalline form (Form B) of the compound of formula (1) having an X-ray powder diffraction pattern characterised by the presence of major peaks at the diffraction angles (2θ) 23.2° and/or 16.7° and/or 22.6° and/or 26.6° and/or 12.0° (e.g. at least four and more particularly at least five of the diffraction angles), and optionally one or more further peaks at diffraction angles (2θ) selected from 23.4°, 25.3°, 7.1°, 19.9° and 27.8° (±0.2°).

2.10 A substantially crystalline form (Form B) of the compound of formula (1) having an X-ray powder diffraction pattern characterised by the presence of major peaks at the diffraction angles (2θ) 23.2° and/or 16.7° and/or 22.6° and/or 26.6° and/or 12.0° (e.g. at least four and more particularly at least five of the diffraction angles), and optionally one or more further peaks at diffraction angles (2θ) selected from 23.4°, 25.3° and 7.1° (±0.2°).

2.11 A substantially crystalline form (Form B) of the compound of formula (1) having an X-ray powder diffraction pattern characterised by the presence of major peaks at the diffraction angles (2θ) 23.2°, 16.7°, 22.6°, 26.6° and 12.0°, and one or more further peaks at diffraction angles (2θ) selected from 23.4°, 25.3° and 7.1° (±0.2°).

The X-ray powder diffraction pattern may be further characterised by the presence of additional peaks at the diffraction angles (2θ) (±0.2°) set out in Table B-3, i.e. 14.2°, 27.0°, 24.1°, 28.9° and 14.5°.

TABLE B-3

| Diffraction Angle (°) | Relative Intensity |
|---|---|
| 14.2 | 25.7 |
| 27.0 | 25.4 |
| 24.1 | 25.2 |
| 28.9 | 24.3 |
| 14.5 | 23.7 |

Accordingly, in further embodiments, the invention provides:

2.12 A substantially crystalline form (Form B) of the compound of formula (1) having an X-ray powder diffraction pattern characterised by the presence of major peaks at the diffraction angles (2θ) 23.2°, 16.7°, 22.6°, 26.6° and 12.0°; one or more further peaks at diffraction angles (2θ) selected from 23.4°, 25.3°, 7.1°, 19.9° and 27.8° (±0.2°); and optionally one or more further peaks at diffraction angles (2θ) selected from 14.2°, 27.0°, 24.1°, 28.9° and 14.5° (±0.2°).

2.13 A substantially crystalline form (Form B) of compound (1) which exhibits peaks at the diffraction angles set forth in Table 4 in the Examples section herein which have a relative intensity of at least 15%.

2.14 A substantially crystalline form (Form B) of compound (1) which exhibits peaks at the diffraction angles corresponding to those of the X-ray powder diffraction pattern shown in FIG. 6.

2.15 A substantially crystalline form (Form B) of compound (1) having an X-ray powder diffraction pattern substantially as shown in FIG. 6.

The crystalline form of the invention can also be characterised by differential scanning calorimetry (DSC). The DSC thermogram of Form B is characterized by an endotherm with an onset and maxima at about 230° C. and about 233° C. as shown in FIG. 7.

Therefore, in a further embodiment, the invention provides:

2.16 A substantially crystalline form (Form B) of compound (1) according to any one of Embodiments 2.1 to 2.15 which has a DSC thermogram characterized by an endotherm with an onset and maxima at about 230° C. and about 233° C.

2.17 A substantially crystalline form (Form B) of compound (1) according to any one of Embodiments 2.1 to 2.15 which has a DSC thermogram substantially as shown in FIG. 7 of the drawings appended hereto.

The invention also provides methods for making crystalline Form B. Accordingly, in further embodiments, the invention provides:

2.18 A method for the preparation of a substantially crystalline form (Form B) of compound (1) as defined in any one of Embodiments 2.1 to 2.17, which method comprises:

(i) dispersing an amorphous form of compound (1) in a solvent selected from hydrocarbon solvents, halogenated hydrocarbon solvents (other than dichloromethane), methanol, isopropyl alcohol, aliphatic ketones (e.g. $C_{1-8}$ ketones), non-aromatic ethers (e.g. $C_{3-6}$ dialkyl and alkylcycloalkyl ethers and THF), and isopropylacetate to form a mixture;

(ii) heating the mixture to a moderately elevated temperature in the range from 45-65° C. and holding the mixture at the moderately elevated temperature for a period of at least 10 hours (for example from 10 to 25 hours, e.g. about 17 hours);

(iii) cooling or allowing the cooling of the mixture from the moderately elevated temperature to a lower temperature in the range from 15-30° C. (e.g. 20-30° C. such as approximately 25° C.) and holding the mixture at the lower temperature for a period of at least 2 hours (e.g. 2 to 8 hours such as approximately 4.5 hours); and (iv) optionally subjecting the mixture to a further heating and cooling cycle comprising heating the mixture to a moderately elevated temperature in the range from 45-65° C. and holding the mixture at the moderately elevated temperature for a period of at least 10 hours (for example from 10 to 25 hours, e.g. about 16 hours); cooling the mixture to a lower temperature in the range from 15-30° C. (e.g. 20-30° C. such as approximately 25° C.) and optionally holding the mixture at the lower temperature for a period of at least half an hour (e.g. up to approximately 1 hour); and (v) isolating (e.g. by filtration) the crystalline Form B of compound (1) thus formed.

2.19 A method for the preparation of a substantially crystalline form (Form B) of compound (1) as defined in any one of Embodiments 2.1 to 2.17, which method comprises:

(i) dispersing crystalline Form A of compound (1) in methylethylketone (MEK) to form a mixture;

(ii) heating the mixture to a moderately elevated temperature in the range from 45-65° C. and holding the mixture at the moderately elevated temperature for a period of at least 10 hours (for example from 10 to 25 hours, e.g. about 21 hours);

(iii) cooling or allowing the cooling of the mixture from the moderately elevated temperature to a lower temperature in the range from 15-30° C. (e.g. 20-30° C. such as approximately 25° C.) and holding the mixture at the lower temperature for a period of at least 2 hours (e.g. 2 to 8 hours such as approximately 4 hours); and (iv) optionally subjecting the mixture to a further heating and cooling cycle comprising heating the mixture to a moderately elevated temperature in the range from 45-65° C. and holding the mixture at the moderately elevated temperature for a period of at least 10 hours (for example from 10 to 25 hours, e.g. about 16 hours); cooling the mixture to a lower temperature in the range from 15-30° C. (e.g. 20-30° C. such as approximately 25° C.) and optionally holding the mixture at the lower temperature for a period of at least half an hour (e.g. up to approximately 1 hour); and (v) isolating (e.g. by filtration) the crystalline Form B of compound (1) thus formed.

2.20 A method for the preparation of a substantially crystalline form (Form B) of compound (1) as defined in any one of Embodiments 2.1 to 2.17, which method comprises:

(i) dispersing a solid form of compound (1) in methylethylketone (MEK) to form a mixture;

(ii) subjecting the mixture to an equilibration procedure comprising periods of heating and cooling the mixture until a suspension of crystalline Form B is formed; and optionally further equilibrating the mixture until a desired level of polymorphic purity is achieved.

2.21 A method according to Embodiment 2.20 wherein the solid form of compound (1) dispersed in MEK is crystalline Form A.

Form C

Crystalline Form C of the compound (1) can be formed by dispersing amorphous compound (1) in a solvent selected from nitromethane, ethanol, dichloromethane and acetonitrile and subjecting the resulting mixture to an equilibration procedure as set out in Example 2.

The XRPD diffractogram for Form C is shown in FIG. 9.

The X-ray diffraction pattern of crystalline Form C of compound (1) exhibits peaks of greatest intensity at the diffraction angles (2θ) set out in Table C-1, i.e. 12.8°, 17.8°, 22.9°, 24.3° and 8.5° (±0.2°).

TABLE C-1

| Diffraction Angle (°) | Relative Intensity |
|---|---|
| 12.8 | 100 |
| 17.8 | 43.4 |
| 22.9 | 41.4 |
| 24.3 | 34.1 |
| 8.5 | 32.7 |

Accordingly, in further embodiments, the invention provides:
  3.1 A crystalline form according to Embodiment 1.0 which is of Form C as defined herein.
  3.2 A substantially crystalline form (Form C) of the compound of formula (1) having an X-ray powder diffraction pattern characterised by the presence of major peaks at the diffraction angles (2θ) 12.8° and/or 17.8° and/or 22.9° and/or 24.3° and/or 8.5°.
  3.3 A substantially crystalline form (Form C) of the compound of formula (1) having an X-ray powder diffraction pattern characterised by the presence of a major peak at the diffraction angle (2θ) 12.8° (±0.2°).
  3.4 A substantially crystalline form (Form C) of the compound of formula (1) having an X-ray powder diffraction pattern characterised by the presence of a major peak at the diffraction angle (2θ) 17.8° (±0.2°).
  3.5 A substantially crystalline form (Form C) of the compound of formula (1) having an X-ray powder diffraction pattern characterised by the presence of a major peak at the diffraction angle (2θ) 22.9° (±0.2°).
  3.6 A substantially crystalline form (Form C) of the compound of formula (1) having an X-ray powder diffraction pattern characterised by the presence of a major peak at the diffraction angle (2θ) 24.3° (±0.2°).
  3.7 A substantially crystalline form (Form C) of the compound of formula (1) having an X-ray powder diffraction pattern characterised by the presence of a major peak at the diffraction angle (2θ) 8.5° (±0.2°)
  3.8 A substantially crystalline form (Form C) of the compound of formula (1) having an X-ray powder diffraction pattern characterised by the presence of major peaks at two or more, e.g. three or more, or four or more, and in particular five diffraction angles (2θ) selected from 12.8°, 17.8°, 22.9°, 24.3° and 8.5° (±0.2°).

The X-ray powder diffraction pattern of Form C of compound (1) may also have lesser peaks present at the diffraction angles (2θ) set out in Table C-2, i.e. 13.0°, 20.1°, 16.5°, 26.1° and 22.4° (±0.2°).

TABLE C-2

| Diffraction Angle (°) | Relative Intensity |
|---|---|
| 13.0 | 31.4 |
| 20.1 | 29.6 |
| 16.5 | 28.2 |
| 26.1 | 25.9 |
| 22.4 | 17.8 |

Therefore, in further embodiments, the invention provides:
  3.9 A substantially crystalline form (Form C) of the compound of formula (1) having an X-ray powder diffraction pattern characterised by the presence of major peaks at the diffraction angles (2θ) 12.8° and/or 17.8° and/or 22.9° and/or 24.3° and/or 8.5° (e.g. at least four and more particularly at least five of the diffraction angles), and optionally one or more further peaks at diffraction angles (2θ) selected from 13.0°, 20.1°, 16.5°, 26.1° and 22.4° (±0.2°).
  3.10 A substantially crystalline form (Form C) of the compound of formula (1) having an X-ray powder diffraction pattern characterised by the presence of major peaks at the diffraction angles (2θ) 12.8° and/or 17.8° and/or 22.9° and/or 24.3° and/or 8.5° (e.g. at least four and more particularly at least five of the diffraction angles), and optionally one or more further peaks at diffraction angles (2θ) selected from 13.0°, 20.1° and 16.5° (±0.2°).
  3.11 A substantially crystalline form (Form C) of the compound of formula (1) having an X-ray powder diffraction pattern characterised by the presence of major peaks at the diffraction angles (2θ) 12.8°, 17.8°, 22.9°, 24.3° and 8.5°, and one or more further peaks at diffraction angles (2θ) selected from 13.0°, 20.1° and 16.5° (±0.2°).

The X-ray powder diffraction pattern may be further characterised by the presence of additional peaks at the diffraction angles (2θ) (±0.2°) set out in Table C-3, i.e. 23.1°, 24.7°, 18.8°, 25.0° and 25.3° (±0.2°).

TABLE C-3

| Diffraction Angle (°) | Relative Intensity |
|---|---|
| 23.1 | 17.1 |
| 24.7 | 16.8 |
| 18.8 | 15.0 |
| 25.0 | 14.9 |
| 25.3 | 14.6 |

Accordingly, in further embodiments, the invention provides:
  3.12 A substantially crystalline form (Form C) of the compound of formula (1) having an X-ray powder diffraction pattern characterised by the presence of major peaks at the diffraction angles (2θ) 12.8°, 17.8°, 22.9°, 24.3° and 8.5°; one or more further peaks at diffraction angles (2θ) selected from 13.0°, 20.1°, 16.5°, 26.1° and 22.4° (±0.2°); and optionally one or more further peaks at diffraction angles (2θ) selected from 23.1°, 24.7°, 18.8°, 25.0° and 25.3° (±0.2°).
  3.13 A substantially crystalline form (Form C) of compound (1) which exhibits peaks at the diffraction angles set forth in Table 5 in the Examples section herein which have a relative intensity of at least 15%.
  3.14 A substantially crystalline form (Form C) of compound (1) which exhibits peaks at the diffraction angles corresponding to those of the X-ray powder diffraction pattern shown in FIG. 9.
  3.15 A substantially crystalline form (Form C) of compound (1) having an X-ray powder diffraction pattern substantially as shown in FIG. 9.

The crystalline form of the invention can also be characterised by differential scanning calorimetry (DSC). Crystalline Form C of compound (1) has been analysed by DSC and has been found to exhibit a thermogram as shown in FIG. 10 of the accompanying drawings.

Form D

Crystalline Form D of the compound (1) can be formed by dispersing amorphous compound (1) in ethyl acetate and subjecting the resulting mixture to an equilibration procedure as set out in Example 2.

The XRPD diffractogram for Form D is shown in FIG. 11.

The X-ray diffraction pattern of crystalline Form D of compound (1) exhibits peaks of greatest intensity at the diffraction angles (2θ) set out in Table D-1, i.e. 13.9°, 21.4°, 21.2°, 23.4° and 16.6° (±0.2°).

TABLE D-1

| Diffraction Angle (°) | Relative Intensity |
|---|---|
| 13.9 | 100 |
| 21.4 | 55.8 |
| 21.2 | 55.1 |
| 23.4 | 49.8 |
| 16.6 | 36.0 |

Accordingly, in further embodiments, the invention provides:
- 4.1 A crystalline form according to Embodiment 1.0 which is of Form D as defined herein.
- 4.2 A substantially crystalline form (Form D) of the compound of formula (1) having an X-ray powder diffraction pattern characterised by the presence of major peaks at the diffraction angles (2θ) 13.9° and/or 21.4° and/or 21.2° and/or 23.4° and/or 16.6°.
- 4.3 A substantially crystalline form (Form D) of the compound of formula (1) having an X-ray powder diffraction pattern characterised by the presence of a major peak at the diffraction angle (2θ) 13.9° (±0.2°).
- 4.4 A substantially crystalline form (Form D) of the compound of formula (1) having an X-ray powder diffraction pattern characterised by the presence of a major peak at the diffraction angle (2θ) 21.4° (±0.2°).
- 4.5 A substantially crystalline form (Form D) of the compound of formula (1) having an X-ray powder diffraction pattern characterised by the presence of a major peak at the diffraction angle (2θ) 21.2° (±0.2°).
- 4.6 A substantially crystalline form (Form D) of the compound of formula (1) having an X-ray powder diffraction pattern characterised by the presence of a major peak at the diffraction angle (2θ) 23.4° (±0.2°).
- 4.7 A substantially crystalline form (Form D) of the compound of formula (1) having an X-ray powder diffraction pattern characterised by the presence of a major peak at the diffraction angle (2θ) 16.6° (±0.2°)
- 4.8 A substantially crystalline form (Form D) of the compound of formula (1) having an X-ray powder diffraction pattern characterised by the presence of major peaks at two or more, e.g. three or more, or four or more, and in particular five diffraction angles (2θ) selected from 13.9°, 21.4°, 21.2°, 23.4° and 16.6° (±0.2°).

The X-ray powder diffraction pattern of Form D of compound (1) may also have lesser peaks present at the diffraction angles (2θ) set out in Table D-2, i.e. 16.1°, 24.1°, 18.0°, 22.5° and 13.0° (±0.2°).

TABLE D-2

| Diffraction Angle (°) | Relative Intensity |
|---|---|
| 16.1 | 21.9 |
| 24.1 | 19.5 |
| 18.0 | 18.1 |
| 22.5 | 15.9 |
| 13.0 | 13.6 |

Therefore, in further embodiments, the invention provides:
- 4.9 A substantially crystalline form (Form D) of the compound of formula (1) having an X-ray powder diffraction pattern characterised by the presence of major peaks at the diffraction angles (2θ) 13.9° and/or 21.4° and/or 21.2° and/or 23.4° and/or 16.6° as defined above (e.g. at least four and more particularly at least five of the diffraction angles), and optionally one or more further peaks at diffraction angles (2θ) selected from 16.1°, 24.1°, 18.0°, 22.5° and 13.0° (±0.2°).
- 4.10 A substantially crystalline form (Form D) of the compound of formula (1) having an X-ray powder diffraction pattern characterised by the presence of major peaks at the diffraction angles (2θ) 13.9° and/or 21.4° and/or 21.2° and/or 23.4° and/or 16.6° as defined above (e.g. at least four and more particularly at least five of the diffraction angles), and optionally one or more further peaks at diffraction angles (2θ) selected from 16.1°, 24.1° and 18.0° (±0.2°).
- 4.11 A substantially crystalline form (Form D) of the compound of formula (1) having an X-ray powder diffraction pattern characterised by the presence of major peaks at the diffraction angles (2θ) 13.9°, 21.4°, 21.2°, 23.4° and 16.6°, and one or more further peaks at diffraction angles (2θ) selected from 16.1°, 24.1° and 18.0° (±0.2°).

The X-ray powder diffraction pattern may be further characterised by the presence of additional peaks at the diffraction angles (2θ) (±0.2°) set out in Table D-3, i.e. 19.9°, 6.9°, 27.7°, 25.2° and 26.4°.

TABLE D-3

| Diffraction Angle (°) | Relative Intensity |
|---|---|
| 19.9 | 13.5 |
| 6.9 | 11.2 |
| 27.7 | 10.7 |
| 25.2 | 10.6 |
| 26.4 | 10.1 |

Accordingly, in further embodiments, the invention provides:
- 4.12 A substantially crystalline form (Form D) of the compound of formula (1) having an X-ray powder diffraction pattern characterised by the presence of major peaks at the diffraction angles (2θ) 13.9°, 21.4°, 21.2°, 23.4° and 16.6°; one or more further peaks at diffraction angles (2θ) selected from 16.1°, 24.1°, 18.0°, 22.5° and 13.0° (±0.2°); and optionally one or more further peaks at diffraction angles (2θ) selected from 19.9°, 6.9°, 27.7°, 25.2° and 26.4° (±0.2°).
- 4.13 A substantially crystalline form (Form D) of compound (1) which exhibits peaks at the diffraction angles set forth in Table 6 in the Examples section herein which have a relative intensity of at least 15%.

4.14 A substantially crystalline form (Form D) of compound (1) which exhibits peaks at the diffraction angles corresponding to those of the X-ray powder diffraction pattern shown in FIG. 11.

4.15 A substantially crystalline form (Form D) of compound (1) having an X-ray powder diffraction pattern substantially as shown in FIG. 11.

Crystalline Form D can also be characterised by differential scanning calorimetry (DSC) and has a thermogram substantially as shown in FIG. 12.

Isotopes

The crystalline forms of the compound of formula (1) as defined in any one of Embodiments 1.0 to 4.15 may contain one or more isotopic substitutions, and a reference to a particular element includes within its scope all isotopes of the element. For example, a reference to hydrogen includes within its scope $^1H$, $^2H$ (D), and $^3H$ (T). Similarly, references to carbon and oxygen include within their scope respectively $^{12}C$, $^{13}C$ and $^{14}C$ and $^{16}O$ and $^{18}O$.

In an analogous manner, a reference to a particular functional group also includes within its scope isotopic variations, unless the context indicates otherwise.

The isotopes may be radioactive or non-radioactive. In one general embodiment of the invention (Embodiment 5.1), the crystalline form of the compound of formula (1) as defined in any one of Embodiments 1.0 to 4.15 contains no radioactive isotopes. Such compounds are preferred for therapeutic use. In another embodiment (Embodiment 5.2), however, the crystalline form of the compound of formula (1) as defined in any one of Embodiments 1.0 to 4.15 may contain one or more radioisotopes. Compounds containing such radioisotopes may be useful in a diagnostic context.

Biological Activity

The crystalline forms of the compound of formula (1) as defined in any one of Embodiments 1.0 to 5.2 are potent and selective inhibitors of TYK2 kinase. The TYK2 kinase-inhibiting activities of the compounds can be determined using the assays described in the Examples below.

Experimental data obtained for compounds (1) demonstrate that the compound has significant advantages over the structurally most similar compound (Compound B) in WO2015/032423. Thus, compound (1) is more active than the closest known compound (Compound B) in the TYK2 kinase inhibition assay and both have greater selectivity for TYK2 versus JAK1, JAK2 and JAK3 kinases than Compound B. Moreover, Compound (1) has a reduced hERG liability compared to prior art comparative Compound B.

Furthermore, in the hepatocyte stability assays, Compound (1) showed a reduced rate of clearance and a consequently longer half-life than comparative Compound B.

Taken together, the data indicate that Compound (1) is not only a more potent and more selective TYK2 kinase inhibitor than comparative Compound B but that, moreover, it has better pharmacokinetic properties than Compound B.

The TYK2 kinase-inhibiting activities of the crystalline forms of the compound of formula (1) can be made use of in various methods of treating diseases where TYK2 plays a part in the development or progression of the disease. The various uses of the compound of formula (1) typically involve bringing the compound into contact with a TYK2 kinase. The inhibition of the TYK2 kinase may take place either in vitro or in vivo.

Accordingly, in further embodiments, the invention provides:

6.1 A crystalline form of the compound of formula (1) as defined in any one of Embodiments 1.0 to 5.2 for use as an inhibitor of TYK2 kinase.

6.2 A crystalline forms of the compound of formula (1) as defined in any one of Embodiments 1.0 to 5.2 for use in medicine.

The inhibition of TYK2 kinase preferably takes place in vivo as part of a therapeutic treatment of a disease or condition in which TYK2 kinase is implicated.

The compound of formula (1) is a selective TYK2 inhibitor and is considerably more active against TYK2 than JAK2 and JAK3 kinases. The compound has relatively poor activity against a wide range of other kinases and, in particular, kinases that are generally recognised as targets for anti-cancer therapy. Thus, for example, the compounds have relatively little activity against Chk1 kinase, Aurora kinases, PKB (Akt) kinase and cyclin dependent kinases (CDK kinases) which are involved in cell cycle progression. A lack of activity against kinases typically considered to be anti-cancer targets is beneficial in compounds that may be used in chronic treatment of inflammatory and autoimmune diseases for example.

It is envisaged on the basis of their TYK2 inhibiting activity that the crystalline forms of the compound of formula (1) as defined in any one of Embodiments 1.0 to 5.2 will be useful in treating at least some of the diseases and disorders discussed below, including inflammatory diseases or conditions, immunological diseases or conditions, autoimmune diseases, allergic diseases or disorders, transplant rejections (allograft transplant rejections); Graft-versus host disease; treating sepsis and septic shock.

In the context of the present invention, an autoimmune disease is a disease which is at least partially provoked by an immune reaction of the body against its own components, for example proteins, lipids or DNA. Examples of organ-specific autoimmune disorders are insulin-dependent diabetes (Type I) which affects the pancreas, Hashimoto's thyroiditis and Graves' disease which affect the thyroid gland, pernicious anemia which affects the stomach, Cushing's disease and Addison's disease which affect the adrenal glands, chronic active hepatitis which affects the liver; polycystic ovary syndrome (PCOS), coeliac disease, psoriasis, inflammatory bowel disease (IBD), lupus nephritis (an inflammation of the kidney) and ankylosing spondylitis. Examples of non-organ-specific autoimmune disorders are rheumatoid arthritis, multiple sclerosis, systemic lupus erythematosus, and myasthenia gravis. Type I diabetes ensues from the selective aggression of autoreactive T-cells against insulin secreting beta-cells of the islets of Langerhans. Other inflammatory or immune diseases and disorders, sufferers from which may benefit from treatment with the compounds of the invention include skin inflammation due to radiation exposure; asthma; allergic inflammation; chronic inflammation; an inflammatory ophthalmic disease; dry eye syndrome (DES, also known as keratoconjunctivitis sicca or dysfunctional tear syndrome); uveitis (e.g. chronic progressive or relapsing forms of non-infectious uveitis); alopecia areata; primary biliary cirrhosis; and systemic sclerosis;

Rheumatoid arthritis (RA) is a chronic progressive, debilitating inflammatory disease that affects approximately 1% of the world's population. RA is a symmetric polyarticular arthritis that primarily affects the small joints of the hands and feet. In addition to inflammation in the synovium, the joint lining, the aggressive front of tissue called pannus invades and destroys local articular structures (Firestein 2003, Nature 423:356-361).

Inflammatory bowel disease (IBD) is characterized by a chronic relapsing intestinal inflammation. IBD is subdivided into Crohn's disease and ulcerative colitis phenotypes. Crohn's disease involves most frequently the terminal ileum and colon, is transmural and discontinuous. In contrast, in ulcerative colitis, the inflammation is continuous and limited to rectal and colonic mucosal layers. In approximately 10% of cases confined to the rectum and colon, definitive classification of Crohn's disease or ulcerative colitis cannot be made and are designated 'indeterminate colitis'. Both diseases include extraintestinal inflammation of the skin, eyes, or joints. Neutrophil-induced injuries may be prevented by the use of neutrophil migration inhibitors (Asakura et al., 2007, World J. Gastroenterol. 13(15):2145-9).

Psoriasis is a chronic inflammatory dermatosis that affects approximately 2% of the population. It is characterized by red, scaly skin patches that are usually found on the scalp, elbows, and knees, and may be associated with severe arthritis. The lesions are caused by abnormal keratinocyte proliferation and infiltration of inflammatory cells into the dermis and epidermis (Schon et al, 2005, New Engl. J. Med. 352: 1899-1912).

Systemic lupus erythematosus (SLE) is a chronic inflammatory disease generated by T cell-mediated B-cell activation, which results in glomerulonephritis and renal failure. Human SLE is characterized at early stages by the expansion of long-lasting autoreactive CD4+ memory cells (D'Cruz et al, 2007, Lancet 369(9561):587-596).

Transplant rejection (allograft transplant rejection) includes, without limitation, acute and chronic allograft rejection following for example transplantation of kidney, heart, liver, lung, bone marrow, skin and cornea. It is known that T cells play a central role in the specific immune response of allograft rejection. Hyperacute, acute and chronic organ transplant rejection may be treated. Hyperacute rejection occurs within minutes of transplantation. Acute rejection generally occurs within six to twelve months of the transplant. Hyperacute and acute rejections are typically reversible where treated with immunosuppressant agents. Chronic rejection, characterized by gradual loss of organ function, is an ongoing concern for transplant recipients because it can occur any time after transplantation.

Graft-versus-host disease (GVDH) is a major complication in allogeneic bone marrow transplantation (BMT). GVDH is caused by donor T cells that recognize and react to recipient differences in the histocompatibility complex system, resulting in significant morbidity and mortality.

Pulmonary sarcoidosis is a relatively rare inflammatory disorder of unknown cause, but which has been shown to be associated with elevated levels of TYK2, and which typically develops in adults of 20 to 50 years of age. Pulmonary sarcoidosis is characterised by small lumps, or granulomas in the lungs, which generally heal and disappear on their own. However, for those granulomas that do not heal, the tissue can remain inflamed and become scarred, or fibrotic. Pulmonary sarcoidosis can develop into pulmonary fibrosis, which distorts the structure of the lungs and can interfere with breathing.

Accordingly, in further embodiments, the invention provides:

6.3 A method of treating a disease or condition in a subject in need thereof, wherein the disease or condition is selected from an autoimmune disease, an inflammatory disease or condition, an immunological disease or condition, an allergic disease or disorder, a transplant rejection and Graft-versus host disease, or a disease or condition selected from sepsis and septic shock, wherein the disease or condition is susceptible to TYK2 inhibition, which method comprises administering to the subject an effective TYK2 inhibiting amount of a crystalline form of the compound of formula (1) as defined in any one of Embodiments 1.0 to 5.2.

6.4 A crystalline form of the compound of formula (1) as defined in any one of Embodiments 1.0 to 5.2 for use in the treatment of a disease or condition wherein the disease or condition is selected from an autoimmune disease, an inflammatory disease or condition, an immunological disease or condition, an allergic disease or disorder, a transplant rejection and Graft-versus host disease; or for use in the treatment of sepsis or septic shock, wherein the disease or condition is susceptible to TYK2 inhibition.

6.5 The use of a crystalline form of the compound of formula (1) as defined in any one of Embodiments 1.0 to 5.2 for the manufacture of a medicament for the treatment of a disease or condition selected from an autoimmune disease, an inflammatory disease or condition, an immunological disease or condition, an allergic disease or disorder, a transplant rejection and Graft-versus host disease; or for use in the treatment of sepsis or septic shock, wherein the disease or condition is susceptible to TYK2 inhibition.

6.6 A method of treating an autoimmune disease in a subject in need thereof, which method comprises administering to the subject an effective TYK2 inhibiting amount of a crystalline form of the compound of formula (1) as defined in any one of Embodiments 1.0 to 5.2, so as to inhibit TYK2 kinase in the subject and thereby block or reduce the extent of an inflammatory process associated with the autoimmune disease.

6.7 A crystalline form of the compound of formula (1) as defined in any one of Embodiments 1.0 to 5.2, for use in a method of treating an autoimmune disease in a subject in need thereof, which method comprises administering to the subject an effective TYK2 inhibiting amount of the said compound, so as to inhibit TYK2 kinase in the subject and thereby block or reduce the extent of an inflammatory process associated with the autoimmune disease.

6.8 The use of a crystalline form of the compound of formula (1) as defined in any one of Embodiments 1.0 to 5.2, for the manufacture of a medicament for treating an autoimmune disease in a subject in need thereof by administering to the subject an effective TYK2 inhibiting amount of the said compound, so as to inhibit TYK2 kinase in the subject and thereby block or reduce the extent of an inflammatory process associated with the autoimmune disease.

6.9 A method of treating a disease or condition in a subject in need thereof, wherein the disease or condition is one which is characterized or caused (at least in part) by or associated with overexpression (elevated expression) of TYK2 kinase, which method comprises administering to the subject an effective TYK2 inhibiting amount of a compound of any one of Embodiments 1.0 to 5.2.

6.10 A crystalline form of the compound of formula (1) as defined in any one of Embodiments 1.0 to 5.2, for use in treating a disease or condition in a subject in need thereof, wherein the disease is one which is characterized or caused (at least in part) by or associated with overexpression (elevated expression) of TYK2 kinase.

6.11 A method, compound for use or use according to any one of Embodiments 6.3 to 6.10 wherein the disease or condition is an autoimmune disease.

6.12 A method, compound for use or use according to any one of Embodiments 6.3 to 6.10 wherein the disease or condition is an autoimmune disease other than multiple sclerosis.

6.13 A method, compound for use or use according to any one of Embodiments 6.3 to 6.10 wherein the disease or condition is psoriasis.

6.14 A method, compound for use or use according to any one of Embodiments 6.3 to 6.10 wherein the disease or condition is psoriatic arthritis.

6.15 A method according to Embodiment 6.3 wherein the disease or condition is multiple sclerosis.

The activity of the compound of the formula (1) and its crystalline forms as TYK2 inhibitors can be measured using the assay set forth in the examples below and the level of activity exhibited by a given compound can be defined in terms of the $IC_{50}$ value. The compound of the formula (1) has an $IC_{50}$ value against TYK2 kinase of 1.9 nanomolar.

An advantage of the compound of the formula (1) is that it exhibits selectivity for TYK2 kinase compared to other kinases of the JAK family.

For example, in biochemical assays, the compound of formula (1) has approximately 25-fold selectivity for TYK2 compared to JAK2 and 110-fold selectivity for TYK2 compared to JAK3.

The suitability of the crystalline forms of the compound of formula (1) as defined in any one of Embodiments 1.0 to 5.2 for use in treating psoriasis can be determined by testing their effect on imiquimod-induced psoriasis-like skin inflammation in mice: see for example Mori et al., Kobe J. Med. Sci., Vol. 62, No. 4, pp. E79-E88, 2016; van der Fits et al., The Journal of Immunology, 2009; 182: 5836-5845; and Lin et al., PLOS ONE|DOI:10.1371/journal.pone.0137890 Sep. 10, 2015. Thus, imiquimod can be applied topically to mice (for example to an ear of a mouse) to induce psoriasis-like inflammation and scaling, and a comparison made between the levels of inflammation and scaling in mice (or areas of the body of mice) that have also been treated with a crystalline form of the compound of formula (1) or a control containing no imiquimod.

Methods for the Preparation of the Compound of Formula (1)

The compound of the formula (1) can be prepared by the methods described in the following paragraphs and in the Examples below.

The compound of formula (1) can be prepared by the sequence of reactions shown in Scheme 1.

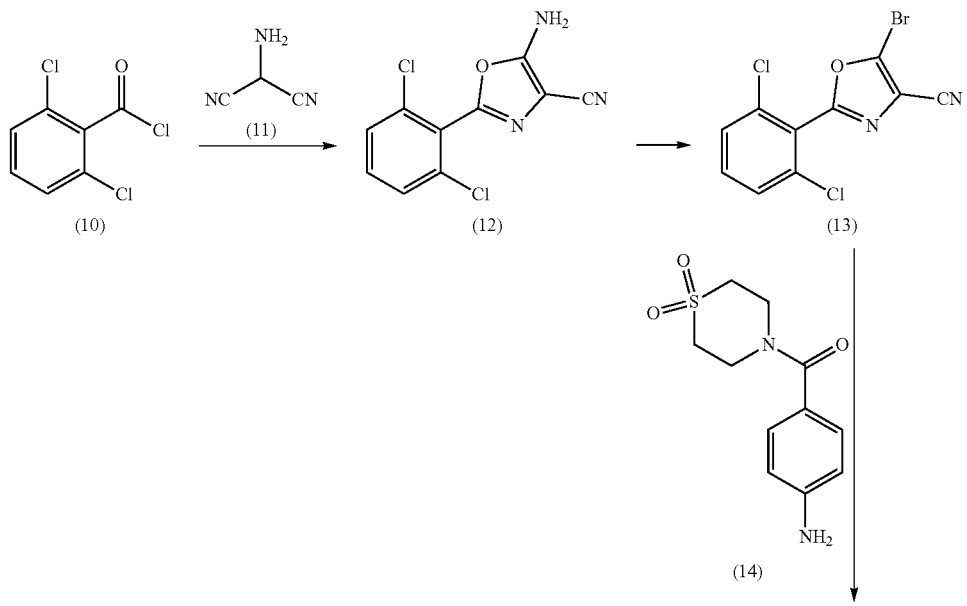

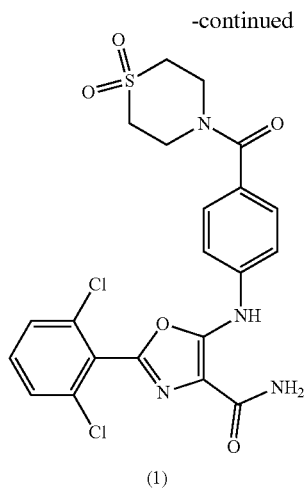

(1)

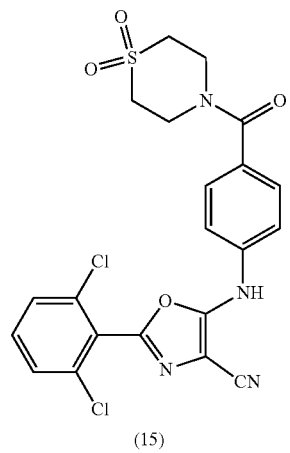

(15)

In the first step of the reaction sequence, 2,6-dichlorobenzoyl chloride (10) is reacted with aminomalononitrile (11) (e.g. the p-toluenesulfonate salt thereof) in a polar aprotic solvent such as N-methylpyrrolidone (NMP) to give the amino-oxazole nitrile (12). The reaction is typically conducted at an elevated temperature, for example in the range from 90° C. to 115° C.

The amino-oxazole nitrile (12) is converted to the corresponding bromo-compound (13) by a metal-free Sandmeyer procedure using tertiary butyl nitrite as a diazotizing agent in the presence of a halogen-donating compound such as bromo-(trimethyl)silane in dibromomethane. The reaction is typically carried out under a protective (e.g. nitrogen) atmosphere at a temperature of about 0° C. Alternatively, instead of using a metal-free Sandmeyer procedure, a copper catalyst can be used. For example, the tertiary butyl nitrite can be used in the presence of $CuBr_2$ instead of bromo-(trimethyl)silane.

The bromo-compound (13) is reacted with the substituted aniline (14) in a Buchwald-Hartwig palladium catalysed amination procedure to give the cyano-intermediate (15).

The reaction makes use of a palladium(0) catalyst such as bis(dibenzylideneacetone)-palladium(0) $(Pd(dba)_2)$ in a polar aprotic solvent such as dioxane in the presence of a suitable phosphine ligand such as 1,1'-ferrocenediyl-bis(diphenyl-phosphine) (dppf) or (5-diphenyl-phosphanyl-9,9-dimethyl-xanthen-4-yl)-diphenyl-phosphane, and a base such as potassium carbonate or caesium carbonate. The reaction is typically carried out at an elevated temperature (for example from 95-125° C.), for example in a sealed tube, using microwave heating.

The cyano-intermediate (15) is hydrolysed under mild acidic conditions (for example using sulphuric acid, or a mixture of trifluoroacetic acid and sulphuric acid, at a temperature of around 0° C. to 20° C.) to give the compound of formula (1).

Pharmaceutical Formulations

While it is possible for the active compound to be administered alone, it is preferable to present it as a pharmaceutical composition (e.g. formulation) comprising at least one active compound of the invention together with one or more pharmaceutically acceptable excipients such as carriers, adjuvants, diluents, fillers, buffers, stabilisers, preservatives, lubricants, or other materials well known to those skilled in the art, and optionally other therapeutic or prophylactic agents.

The term "pharmaceutically acceptable" as used herein refers to compounds, materials, compositions, and/or dosage forms which are, within the scope of sound medical judgment, suitable for use in contact with the tissues of a subject (e.g. human) without excessive toxicity, irritation, allergic response, or other problems or complication, commensurate with a reasonable benefit/risk ratio. Each excipient must also be "acceptable" in the sense of being compatible with the other ingredients of the formulation.

Accordingly, in further embodiments, the invention provides:

7.1 A pharmaceutical composition comprising a crystalline form of the compound of formula (1) as defined in any one of Embodiments 1.0 to 5.2 and a pharmaceutically acceptable excipient.

In further embodiments, there are provided:

7.2 A pharmaceutical composition according to Embodiment 7.1 which comprises from approximately 1% (w/w) to approximately 95% (w/w) of a crystalline form of the compound of formula (1) as defined in any one of Embodiments 1.0 to 5.2 and from 99% (w/w) to 5% (w/w) of a pharmaceutically acceptable excipient or combination of excipients and optionally one or more further therapeutically active ingredients.

7.3 A pharmaceutical composition according to Embodiment 7.2 which comprises from approximately 5% (w/w) to approximately 90% (w/w) of a crystalline form of the compound of formula (1) as defined in any one of Embodiments 1.0 to 5.2 and from 95% (w/w) to 10% (w/w) of a pharmaceutically excipient or combination of excipients and optionally one or more further therapeutically active ingredients.

7.4 A pharmaceutical composition according to Embodiment 7.3 which comprises from approximately 10% (w/w) to approximately 90% (w/w) of a crystalline form of the compound of formula (1) as defined in any one of Embodiments 1.0 to 5.2 and from 90% (w/w) to 10% (w/w) of a pharmaceutically excipient or combination of excipients.

7.5 A pharmaceutical composition according to Embodiment 7.4 which comprises from approximately 20% (w/w) to approximately 90% (w/w) of a crystalline form of the compound of formula (1) as defined in any one of Embodiments 1.0 to 5.2 and from 80% (w/w) to 10% of a pharmaceutically excipient or combination of excipients.

7.6 A pharmaceutical composition according to Embodiment 4.5 which comprises from approximately 25% (w/w) to approximately 80% (w/w) of a crystalline form of the compound of formula (1) as defined in any one of Embodiments 1.0 to 5.2 and from 75% (w/w) to 20% of a pharmaceutically excipient or combination of excipients.

It will be appreciated that pharmaceutical compositions comprising a crystalline form of the compound of formula (1) will typically be solid compositions such as tablets, capsules, caplets, pills, lozenges, sprays, powders, granules, sublingual tablets, wafers or patches and buccal patches, or liquid compositions such as suspensions where the active compound is in solid form.

Accordingly, in further embodiments, the invention provides:

7.7 A pharmaceutical composition according to any one of Embodiments 7.1 to 7.6 which is suitable for oral administration.

7.8 A pharmaceutical composition according to Embodiment 7.7 which is selected from tablets, capsules, caplets, pills, lozenges, powders, granules, suspensions, sublingual tablets, wafers or patches and buccal patches.

7.9 A pharmaceutical composition according to Embodiment 7.8 which is selected from tablets and capsules.

7.10 A pharmaceutical composition according to Embodiment 7.9 wherein the crystalline form of the compound of formula (1) is Form B as defined in any one of Embodiments 2.1 to 2.17.

7.11 A pharmaceutical composition according to any one of Embodiments 7.1 to 7.6 which is suitable for parenteral administration and is in the form of a suspension for injection or infusion.

7.12 A pharmaceutical composition according to Embodiment 7.11 wherein the crystalline form of the compound of formula (1) is Form A as defined in any one of Embodiments 1.1 to 1.17.

Pharmaceutical compositions (e.g. as defined in any one of Embodiments 7.1 to 7.12) containing a crystalline form of the compound of formula (1) as defined in any one of Embodiments 1.0 to 5.2 can be formulated in accordance with known techniques, see for example, Remington's Pharmaceutical Sciences, Mack Publishing Company, Easton, PA, USA.

Thus, tablet compositions (as in Embodiment 7.9) can contain a unit dosage of active compound together with an inert diluent or carrier such as a sugar or sugar alcohol, e.g.; lactose, sucrose, sorbitol or mannitol; and/or a non-sugar derived diluent such as sodium carbonate, calcium phosphate, talc, calcium carbonate, or a cellulose or derivative thereof such as methyl cellulose, ethyl cellulose, hydroxypropyl methyl cellulose, and starches such as corn starch. Tablets may also contain such standard ingredients as binding and granulating agents such as polyvinylpyrrolidone, disintegrants (e.g. swellable crosslinked polymers such as crosslinked carboxymethylcellulose), lubricating agents (e.g. stearates), preservatives (e.g. parabens), antioxidants (e.g. BHT), buffering agents (for example phosphate or citrate buffers), and effervescent agents such as citrate/bicarbonate mixtures. Such excipients are well known and do not need to be discussed in detail here.

Capsule formulations (as in Embodiment 7.9) may be of the hard gelatin or soft gelatin variety and can contain the active component in solid, semi-solid, or liquid form. Gelatin capsules can be formed from animal gelatin or synthetic or plant derived equivalents thereof.

The solid dosage forms (e.g. tablets, capsules etc.) can be coated or un-coated, but typically have a coating, for example a protective film coating (e.g. a wax or varnish) or a release controlling coating. The coating (e.g. a Eudragit™ type polymer) can be designed to release the active component at a desired location within the gastro-intestinal tract. Thus, the coating can be selected so as to degrade under certain pH conditions within the gastrointestinal tract, thereby selectively releasing the compound in the stomach or in the ileum or duodenum.

Instead of, or in addition to, a coating, the drug can be presented in a solid matrix comprising a release controlling agent, for example a release delaying agent which may be adapted to selectively release the compound under conditions of varying acidity or alkalinity in the gastrointestinal tract. Alternatively, the matrix material or release retarding coating can take the form of an erodible polymer (e.g. a maleic anhydride polymer) which is substantially continuously eroded as the dosage form passes through the gastro-intestinal tract.

Compositions for topical use include ointments, creams, sprays, patches, gels, liquid drops and inserts (for example intraocular inserts). Such compositions can be formulated in accordance with known methods.

Compositions for parenteral administration (as in Embodiments 7.11 to 7.12) are typically presented as sterile aqueous or oily fine suspensions, or may be provided in finely divided sterile powder form for making up extemporaneously with sterile water for injection.

Examples of formulations for rectal or intra-vaginal administration include pessaries and suppositories which may be, for example, formed from a shaped mouldable or waxy material containing the active compound.

Compositions for administration by inhalation may take the form of inhalable powder compositions or powder sprays, and can be administered in standard form using powder inhaler devices or aerosol dispensing devices. Such devices are well known. For administration by inhalation, the powdered formulations typically comprise the active compound together with an inert solid powdered diluent such as lactose.

The crystalline forms of the compound of formula (1) as defined in any one of Embodiments 1.0 to 5.2 will generally be presented in unit dosage form and, as such, will typically contain sufficient compound to provide a desired level of biological activity. For example, according to any one of Embodiments 7.7 to 7.10), a composition intended for oral administration may contain from 2 milligrams to 200 milligrams of active ingredient, more usually from 10 milligrams to 100 milligrams, for example, 12.5 milligrams, 25 milligrams and 50 milligrams.

Methods of Treatment

It is envisaged that the crystalline forms of the compound of formula (1) as defined in any one of Embodiments 1.0 to 5.2 will be useful in the prophylaxis or treatment of inflammatory diseases or conditions, immunological diseases or conditions, allergic diseases or disorders, transplant rejections and Graft-versus host disease. Examples of such disease states and conditions are set out above.

The crystalline forms of the compound of formula (1) will typically be administered in amounts that are therapeutically or prophylactically useful and which generally are non-toxic. However, in certain situations (for example in the case of life threatening diseases), the benefits of administering a crystalline form of the compound of formula (1) may outweigh the disadvantages of any toxic effects or side effects, in which case it may be considered desirable to administer compounds in amounts that are associated with a degree of toxicity.

The crystalline forms of the compound of formula (1) may be administered over a prolonged term to maintain beneficial therapeutic effects or may be administered for a short period only. Alternatively, they may be administered in a pulsatile or continuous manner.

The crystalline form of the compound of formula (1) as defined in any one of Embodiments 1.0 to 5.2 will generally be administered to a subject in need of such administration, for example a human patient.

A typical daily dose of the crystalline form of the compound of formula (1) can be up to 1000 mg per day, for example in the range from 0.01 milligrams to 10 milligrams per kilogram of body weight, more usually from 0.025 milligrams to 5 milligrams per kilogram of body weight, for example up to 3 milligrams per kilogram of bodyweight, and more typically 0.15 milligrams to 5 milligrams per kilogram of bodyweight although higher or lower doses may be administered where required.

By way of example, an initial starting dose of 12.5 mg may be administered 2 to 3 times a day. The dosage can be increased by 12.5 mg a day every 3 to 5 days until the maximal tolerated and effective dose is reached for the individual as determined by the physician.

Ultimately, the quantity of compound administered will be commensurate with the nature of the disease or physiological condition being treated and the therapeutic benefits and the presence or absence of side effects produced by a given dosage regimen, and will be at the discretion of the physician.

The crystalline form of the compound of formula (1) can be administered as the sole therapeutic agent or they can be administered in combination therapy with one or more other compounds such as steroids, interferons, apremilast (for psoriasis) or methotrexate (for rheumatoid arthritis).

Methods of Diagnosis

Prior to administration of a compound of the invention, a patient may be screened to determine whether a disease or condition from which the patient is or may be suffering is one which would be susceptible to treatment with a compound having activity against TYK2.

Accordingly, in further embodiments (8.1 to 8.3), the invention provides:

8.1 A crystalline form of the compound of formula (1) as defined in any one of Embodiments 1.0 to 5.2 for use in the treatment or prophylaxis of a disease state or condition in a patient who has been screened and has been determined as suffering from, or being at risk of suffering from, a disease or condition which would be susceptible to treatment with a compound having activity against a TYK2 kinase.

8.2 The use of a crystalline form of the compound of formula (1) as defined in any one of Embodiments 1.0 to 5.2 for the manufacture of a medicament for the treatment or prophylaxis of a disease state or condition in a patient who has been screened and has been determined as suffering from, or being at risk of suffering from, a disease or condition which would be susceptible to treatment with a compound having activity against TYK2 kinase.

8.3 A method for the diagnosis and treatment of a disease state or condition mediated by TYK2 kinase, which method comprises (i) screening a patient to determine whether a disease or condition from which the patient is or may be suffering is one which would be susceptible to treatment with a compound having activity against the kinase; and (ii) where it is indicated that the disease or condition from which the patient is thus susceptible, thereafter administering to the patient an effective TYK2 inhibiting amount of a crystalline form of the compound of formula (1) as defined in any one of Embodiments 1.0 to 5.2.

A subject (e.g. patient) may be subjected to a diagnostic test to detect a marker indicative of the presence of a disease or condition in which TYK2 is implicated, or a marker indicative of susceptibility to the said disease or condition. For example, subjects may be screened for genetic markers indicative of a susceptibility to develop an autoimmune or inflammatory disease.

The genetic marker can comprise a particular allele or single nucleotide polymorphism of the TYK2 gene which is indicative of susceptibility to an autoimmune disease such as multiple sclerosis (see for example Ban et al., *European Journal of Human Genetics* (2009), 17, 1309-1313) or an inflammatory bowel disease such as Crohn's disease (see Sato et al., *J. Clin. Immunol.* (2009), 29:815-825). The genetic marker can, for example, be a single nucleotide polymorphism in the TYK2 gene, or it can be a haplotype comprising a single nucleotide polymorphism in the TYK2 gene and a polymorphism in another gene.

The diagnostic tests are typically conducted on a biological sample selected from blood samples, biopsy samples, stool biopsies, sputum, chromosome analysis, pleural fluid, peritoneal fluid, or urine.

Methods of identifying genetic markers such as single nucleotide polymorphisms are well known. Examples of suitable methods for identifying such markers are described in Ban et al. and Sato et al. above.

EXAMPLES

Figure 1:
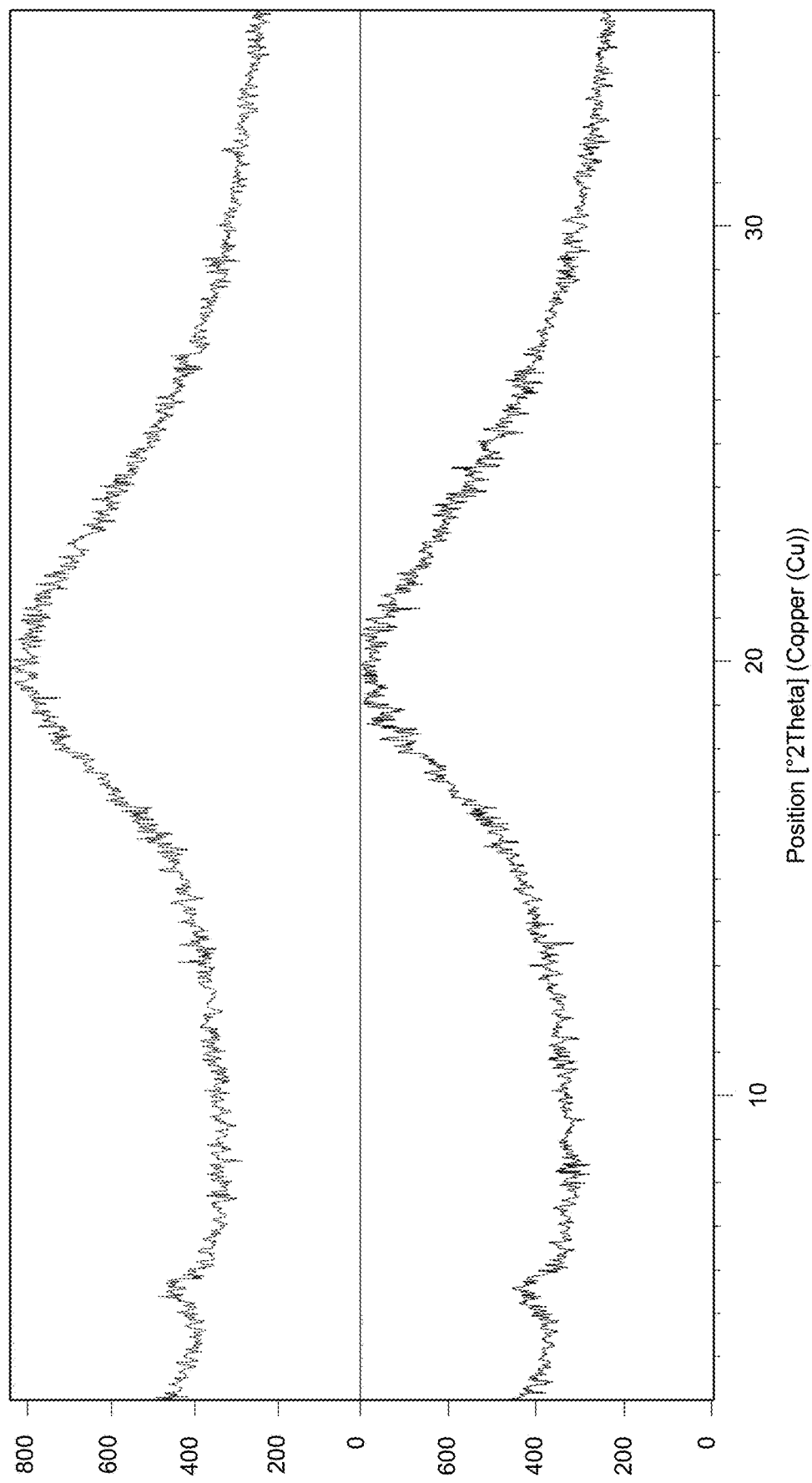
FIG. 1 shows XRPD patterns for amorphous (2,6-dichlorophenyl)-5-[4-(1,1-dioxo-1,4-thiazinane-4-carbonyl)-anilino]oxazole-4-carboxamide. The upper trace is that of amorphous compound formed after drying in vacuo for an hour 45° C. and the lower trace is that of amorphous compound subjected to drying in vacuo at 45° C. for about another 19¼ hours.

The invention will now be illustrated, but not limited, by reference to the specific embodiments described in the following examples.

Abbreviations

In the Examples below, the following abbreviations are used:
ACN acetonitrile
DCM dichloromethane
DMF dimethylformamide
DPPF 1,1'-bis(diphenylphosphino)ferrocene
EDCl N-ethyl-N'-(3-dimethylaminopropyl)carbodiimide
$Et_3N$ triethylamine
EtOAc ethyl acetate
HOBt hydroxybenzotriazole
HPLC high performance liquid chromatography
LCMS liquid chromatography—mass spectrometry
MeCN acetonitrile
MeOH methanol
mL millilitres
mmol millimoles
NMP N-methylpyrrolidone
$Pd(dba)_2$ bis(dibenzylideneacetone)palladium(0)
$SiO_2$ silica
tert-BuONO tertiary butyl nitrite
TFA trifluoroacetic acid
TLC thin layer chromatography Analytical Conditions NMR spectra were recorded on a Bruker 400 MHz instrument or on a JEOL ECX 400 MHz spectrometer equipped with an auto-sampler. In Example 1, the NMR spectra were recorded on the Bruker instrument unless indicated otherwise.

HPLC separations were carried out using Phenomenex LUNA-C18(2) 5μ particle size, 2×50 mm columns.

X-Ray Powder Diffraction (XRPD)

X-Ray Powder Diffraction patterns were collected on a PANalytical diffractometer using Cu Kα radiation (45 kV, 40 mA), θ-θ goniometer, focusing mirror, divergence slit (½"), soller slits at both incident and divergent beam (4 mm) and a PIXcel detector. The software used for data collection was X'Pert Data Collector, version 2.2f and the data were presented using X'Pert Data Viewer, version 1.2d. XRPD patterns were acquired under ambient conditions via a transmission foil sample stage (polyimide—Kapton, 12.7 μm thickness film) under ambient conditions using a PANalytical X'Pert PRO. The data collection range was 2.994-35°2θ with a continuous scan speed of 0.202004° s-1.

Differential Scanning Calorimetry (DSC)

DSC data were collected on a PerkinElmer Pyris 6000 DSC equipped with a 45-position sample holder. The instrument was verified for energy and temperature calibration using certified indium. A predefined amount of the sample, 0.5-3.0 mg, was placed in a pin holed aluminium pan and heated at 20° C. $min^{-1}$ from 30 to 350° C., or varied as experimentation dictated. A purge of dry nitrogen at 20 ml $min^{-1}$ was maintained over the sample. The instrument control, data acquisition and analysis were performed with Pyris Software v11.1.1 revision H.

Thermo-Gravimetric Analysis (TGA)

TGA data were collected on a PerkinElmer Pyris 1 TGA equipped with a 20-position auto-sampler. The instrument was calibrated using a certified weight and certified Alumel and Perkalloy for temperature. A predefined amount of the sample, 1-5 mg, was loaded onto a pre-tared aluminium crucible and was heated at 20° C. $min^{-1}$ from ambient temperature to 400° C. A nitrogen purge at 20 ml·$min^{-1}$ was maintained over the sample. Instrument control, data acquisition and analysis were performed with Pyris Software v11.1.1 revision H.

Optical Microscopy

Optical microscopy examination was undertaken using a Leica DME polarised light microscope and an Infinity 1 digital video camera for image capture. A small amount of each sample was placed onto a glass slide and dispersed as best as possible. The samples were viewed with appropriate magnification and various images recorded. The image scale bar was calibrated against an external graticule, 0.1 mm/0.002 mm DIV.

Hot Stage Microscopy (HSM)

Hot Stage Microscopy was undertaken using a Leica DME polarised light microscope combined with a Mettler-Toledo MTFP82HT hot-stage and a digital video camera for image capture. A small amount of each sample was placed onto a glass slide with individual particles separated as best as possible. The sample was viewed with appropriate magnification and partially polarised light, whilst being heated from ambient temperature typically at 20° C. $min^{-1}$ unless an alternate heating rate is stated.

Dynamic Vapour Sorption

Sorption isotherms were obtained using a Hiden Isochema moisture sorption analyser (model IGAsorp), controlled by IGAsorp Systems Software V6.50.48. The sample was maintained at a constant temperature (25° C.) by the instrument controls. The humidity was controlled by mixing streams of dry and wet nitrogen, with a total flow of 250 ml·$min^{-1}$. The instrument was verified for relative humidity content by measuring three calibrated Rotronic salt solutions (10-50-88%). The weight change of the sample was monitored as a function of humidity by a microbalance (accuracy +/−0.005 mg). A defined amount of sample was placed in a tared mesh stainless steel basket under ambient conditions. A full experimental cycle typically consisted of three scans (sorption, desorption and sorption) at a constant temperature (25° C.) and 10% RH intervals over a 0-90% range (60 minutes for each humidity level). This type of experiment should demonstrate the ability of samples studied to absorb moisture (or not) over a set of well-determined humidity ranges.

Karl Fischer Titration

Water content in a sample was determined using a Mettler Toledo Volumetric Karl Fischer Titrator. The titrant was HYDRANAL composite 5 and the solvent was HYDRANAL Methanol dry. A sample mass of ca. 0.2 g was charged and mixed for 600 seconds.

Mya4 Reaction Station

Equilibrations or crystallisations that require temperature control and/or defined heating/cooling profiles are performed in the Radley's Mya4 Reaction Station; a 4-zone reaction station with magnetic and overhead stirring capabilities and a temperature range of −30 to 180° C. on 2 to 400 ml scale mixtures. The reaction conditions required are programmed via the Mya 4 Control Pad. The temperature control is verified semi-annually in-house.

Example 1

2-(2,6-dichlorophenyl)-5-[4-(1,1-dioxo-1,4-thiazinane-4-carbonyl)anilino]-oxazole-4-carboxamide

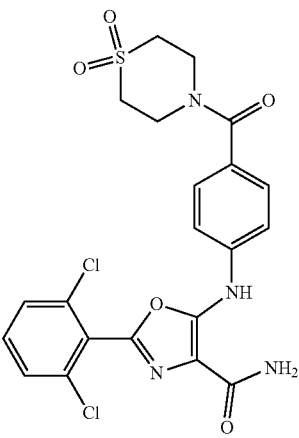 [SMILES: NC(=O)c1nc(-c2c(Cl)cccc2Cl)oc1Nc1ccc(C(=O)N2CCS(=O)(=O)CC2)cc1]

1A. Preparation of 5-amino-2-(2,6-dichlorophenyl)-oxazole-4-carbonitrile

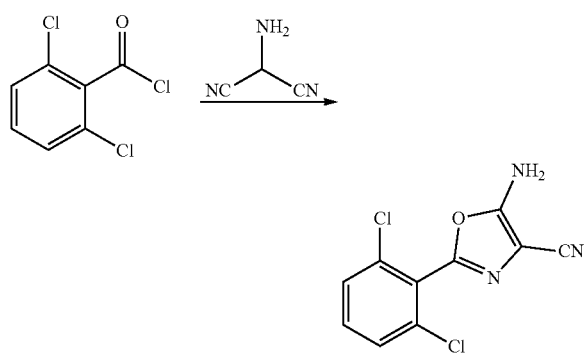

2,6-Dichlorobenzoyl chloride (10 g, 47.74 mmol) was added slowly to a solution of aminomalononitrile p-toluenesulfonate (13.3 g, 52.51 mmol) in NMP (50 mL). The reaction mixture was heated at 110° C. for 14 hours before quenching with water (100 mL) and the resulting solid was collected by filtration. The crude product was dissolved in ethyl acetate (100 mL) and washed with water (40 mL×2), and the organic layer was dried over $Na_2SO_4$. The solvent was removed to give the title compound (19 g, crude) as a white solid.

$^1$H NMR (400 MHz, $CDCl_3$): δ: 7.37-7.35 (m, 2H), 7.29-7.26 (m, 1H), 6.19 (s, 2H).

1B. Preparation of 5-bromo-2-(2,6-dichlorophenyl)-oxazole-4-carbonitrile

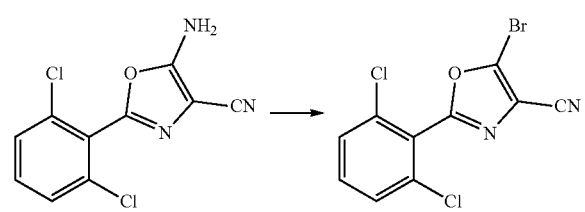 [SMILES: N#Cc1nc(-c2c(Cl)cccc2Cl)oc1N ; N#Cc1nc(-c2c(Cl)cccc2Cl)oc1Br]

To a solution of 5-amino-4-cyano-2-(2,6-dichlorophenyl)-oxazole (9.0 g, 35.42 mmol) in $CH_2Br_2$ (50 mL) was added bromo(trimethyl)silane (13.56 g, 88.55 mmol). tert-BuONO (36.53 g, 354.20 mmol) was then added very slowly at 0° C. under a protective $N_2$ atmosphere and the mixture was stirred at 0° C. for 2.5 hour. The reaction mixture was then concentrated under reduced pressure to remove $CH_2Br_2$, water ($H_2O$ 100 mL) was added and the resulting mixture was extracted with DCM (100 mL×3). The combined organic layers were dried over $Na_2SO_4$, filtered and concentrated under reduced pressure to give a residue which was purified by column chromatography ($SiO_2$, petroleum ether/ethyl acetate=50/1 to 10:1). The title compound (8 g, 71.03% yield) was obtained as a white solid.

1B(a). Alternative Preparation of 5-bromo-2-(2,6-dichlorophenyl)-oxazole-4-carbonitrile To $CuBr_2$ (880 g, 3.94 mol) in a flask at room temperature under $N_2$ was added MeCN (7.5 L) and the resulting mixture was cooled to 0-4° C. tBuONO (90% active, 475 mL, 5.68 mol) was added followed by a solution of 5-amino-4-cyano-2-(2,6-dichlorophenyl)-oxazole (500 g, 1.97 mol) in MeCN (2.5 L) at 0-4° C. The reaction mixture was stirred at 5° C. for 30 minutes and then allowed to warm to 10° C. over 1 hour, after which time LC showed the reaction to be complete. The reaction mixture was split into two equal portions (~5.5 L) for work-up. The first portion was quenched with 1 M HCl (aq) (7.5 L) [exotherm 20-27° C.] and was extracted with EtOAc (2×6.0 L). The extraction procedure was repeated on the second portion and the organic phases were combined (~24 L) and dried over $MgSO_4$, reduced in vacuo and then azeotroped with IPA (4.8 L) to give 711 g of crude material. The crude material was slurried in IPA (0.63 L) at room temperature for 2 hours under $N_2$, filtered, washed (cold IPA, 2×0.1 L) and the resulting pale yellow solid was dried at 40° C. in vacuo for 18 hours to give 390 g (62% yield) at 87% by LC.

1C. Preparation of 4-(4-nitrobenzoyl)-1,1-dioxo-1,4-thiazinane

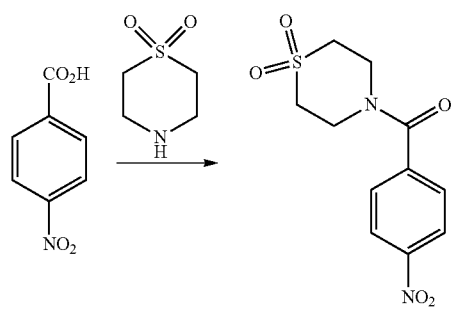

To a mixture of 4-nitrobenzoic acid (5 g, 29.92 mmol) and 1,4-thiazinane 1,1-dioxide hydrochloride (5.1 g, 29.92 mmol) in DMF (50 mL) was added HOBt (6.1 g, 44.88 mmol), EDCI (8.6 g, 44.88 mmol), $Et_3N$ (6.1 g, 59.84 mmol) in one portion at 15° C. under $N_2$. The mixture was stirred at 15° C. for 14 hours. The reaction mixture was diluted with saturated $Na_2CO_3$ (300 mL) and extracted with EtOAc (150 mL×3). The combined organic layers were dried over $Na_2SO_4$, filtered and concentrated under reduced pressure to give the title compound (6.5 g, crude) as a white solid.

¹H NMR (400 MHz, CDCl₃): δ: 8.27 (d, J=8.8 Hz, 2H), 7.55 (d, J=8.8 Hz, 2H), 4.33-3.75 (m, 4H), 3.22-2.75 (m, 4H).

1D. Preparation of 4-(4-aminobenzoyl)-1,1-dioxo-1,4-thiazinane

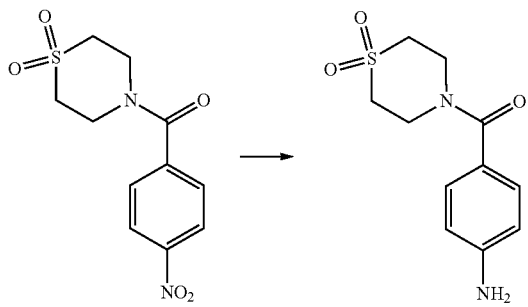 [SMILES: O=C(c1ccc([N+](=O)[O-])cc1)N1CCS(=O)(=O)CC1 ; Nc1ccc(C(=O)N2CCS(=O)(=O)CC2)cc1]

To a solution of 4-(4-nitrobenzoyl)-1,1-dioxo-1,4-thiazinane (5.5 g, 19.35 mmol) in MeOH (100 mL) was added Pd/C (1.0 g, 19.35 mmol) under N₂. The suspension was degassed under vacuum and purged with H₂ several times, and then stirred under H₂ (15 psi) at 15° C. for 14 hours. The reaction mixture was filtered and the filtrate was concentrated to give the title compound (4.5 g, 91.45% yield) as a white solid.

¹H NMR (400 MHz, (CDCl3): δ: 7.36-7.26 (m, 2H), 6.80-6.61 (m, 2H), 4.26-4.08 (m, 4H), 4.06-3.88 (m, 2H), 3.21-2.95 (m, 4H)

1E. Preparation of 2-(2,6-dichlorophenyl)-5-[4-(1,1-dioxo-1,4-thiazinane-4-carbonyl)anilino]oxazole-4-carbonitrile

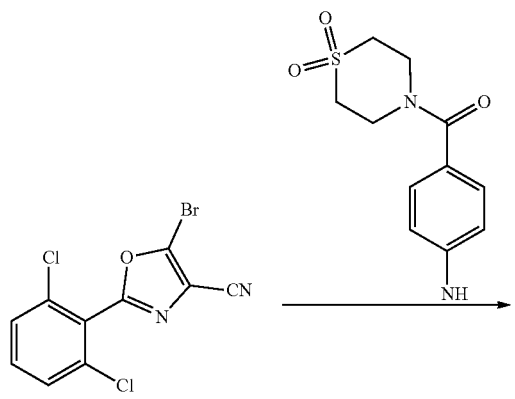

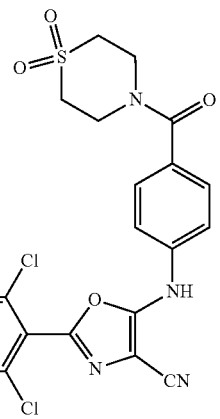

1,4-Dioxane (13 mL) was added to a mixture of 5-bromo-4-cyano-2-(2,6-dichlorophenyl)-oxazole (500 mg, 1.57 mmol), 4-(4-aminobenzoyl)-1,1-dioxo-1,4-thiazinane (399.25 mg, 1.57 mmol) and Pd(dba)₂ (90.28 mg, 157 μmol), DPPF (130.56 mg, 235.5 μmol), K₂CO₃ (976.45 mg, 7.07 mmol) in a reaction tube which was sealed and subjected to microwave heating at 120° C. for 4 hours. The resulting reaction mixture was filtered and concentrated in vacuum, and water (30 mL) was added before extracting with DCM (50 mL×3). The combined organic phases were dried over Na₂SO₄, filtered and concentrated under reduced pressure to give a residue which was purified by column chromatography (SiO₂, petroleum ether/ethyl acetate=10/1 to 2/3). The title compound (110 mg, 14.26% yield) was obtained as a brown solid.

1F. Preparation of 2-(2,6-dichlorophenyl)-5-[4-(1,1-dioxo-1,4-thiazinane-4-carbonyl)anilino]oxazole-4-carboxamide

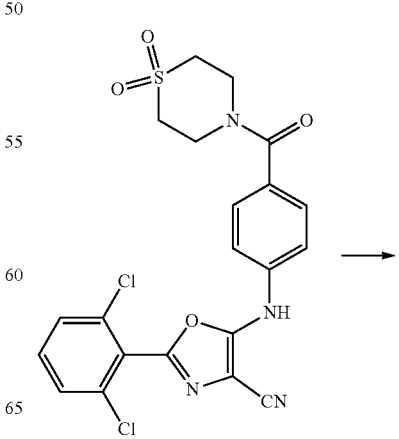

-continued

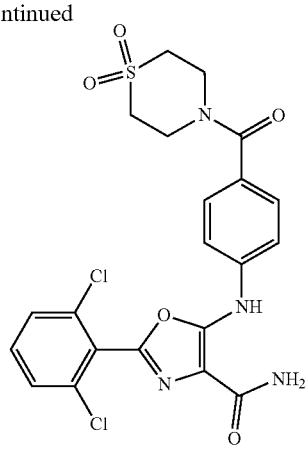

A mixture of 2-(2,6-dichlorophenyl)-5-[4-(1,1-dioxo-1,4-thiazinane-4-carbonyl)anilino]oxazole-4-carbonitrile (100 mg, 203.52 µmol) in $H_2SO_4$ (1 mL) at 0° C. was stirred at 15° C. for 2 hours under an $N_2$ atmosphere. LCMS analysis after this time indicated that the reaction had gone to completion and so the reaction mixture was quenched with ice at 0° C., and then filtered. The filtrate was extracted with EtOAc (30 mL: 10 mL×3), and the combined organic layers were dried over $Na_2SO_4$, filtered and concentrated under reduced pressure to give a residue which was purified by preparative HPLC (TFA conditions). The title compound, 2-(2,6-dichlorophenyl)-5-[4-(1,1-dioxo-1,4-thiazinane-4-carbonyl)-anilino]oxazole-4-carboxamide (25 mg, 24% yield, 99.61% purity), was obtained as a yellow solid.

$^1$H NMR (400 MHz, (CDCl$_3$): δ: 9.05 (s, 1H), 7.50-7.48 (m, 2H), 7.46-7.44 (m, 3H), 7.41-7.38 (m, 2H), 6.50 (s, 1H), 5.38 (s, 1H), 4.12 (s, 4H), 3.07 (s, 4H).

MS (ESI): mass calc'd. for $C_{21}H_{18}Cl_2N_4O_5S$ 508.0408.04, m/z found, 509.0 [M+H]+.

1G. Preparation of Amorphous 2-(2,6-dichlorophenyl)-5-[4-(1,1-dioxo-1,4-thiazinane-4-carbonyl)anilino]oxazole-4-carboxamide HPLC purification of 2-(2,6-dichlorophenyl)-5-[4-(1,1-dioxo-1,4-thiazinane-4-carbonyl)-anilino]oxazole-4-carboxamide and subsequent rapid evaporation (e.g. by rotary evaporation) of solvent from eluent containing the compound gives rise to an amorphous form of the compound.

A larger scale preparation of amorphous compound was carried out by dissolving 2-(2,6-dichlorophenyl)-5-[4-(1,1-dioxo-1,4-thiazinane-4-carbonyl)-anilino]oxazole-4-carboxamide (1.436 g) in 20 volumes of THF and swirling the mixture at 25° C. to form a solution within 15 minutes. The solution was clarified (0.45 µm nylon filter) to afford a clear, yellow solution, leaving dark residue on the filter surface. The solution was reduced in vacuo at 40° C. to a yellow foamy solid within 2 minutes and dried in vacuo at 45° C. on a rotary evaporator for a further 1 hour.

A portion of the solid was sampled (Batch 1) and the bulk (Batch 2) was dried in vacuo at 45° C. for ca. 19¼ hours to afford 1.15 g of yellow, brittle solid out of the vessel.

XRPD examination (FIG. 1) revealed both the damp (Batch 1) and dry (Batch 2) lots to be amorphous.

Figure 2:
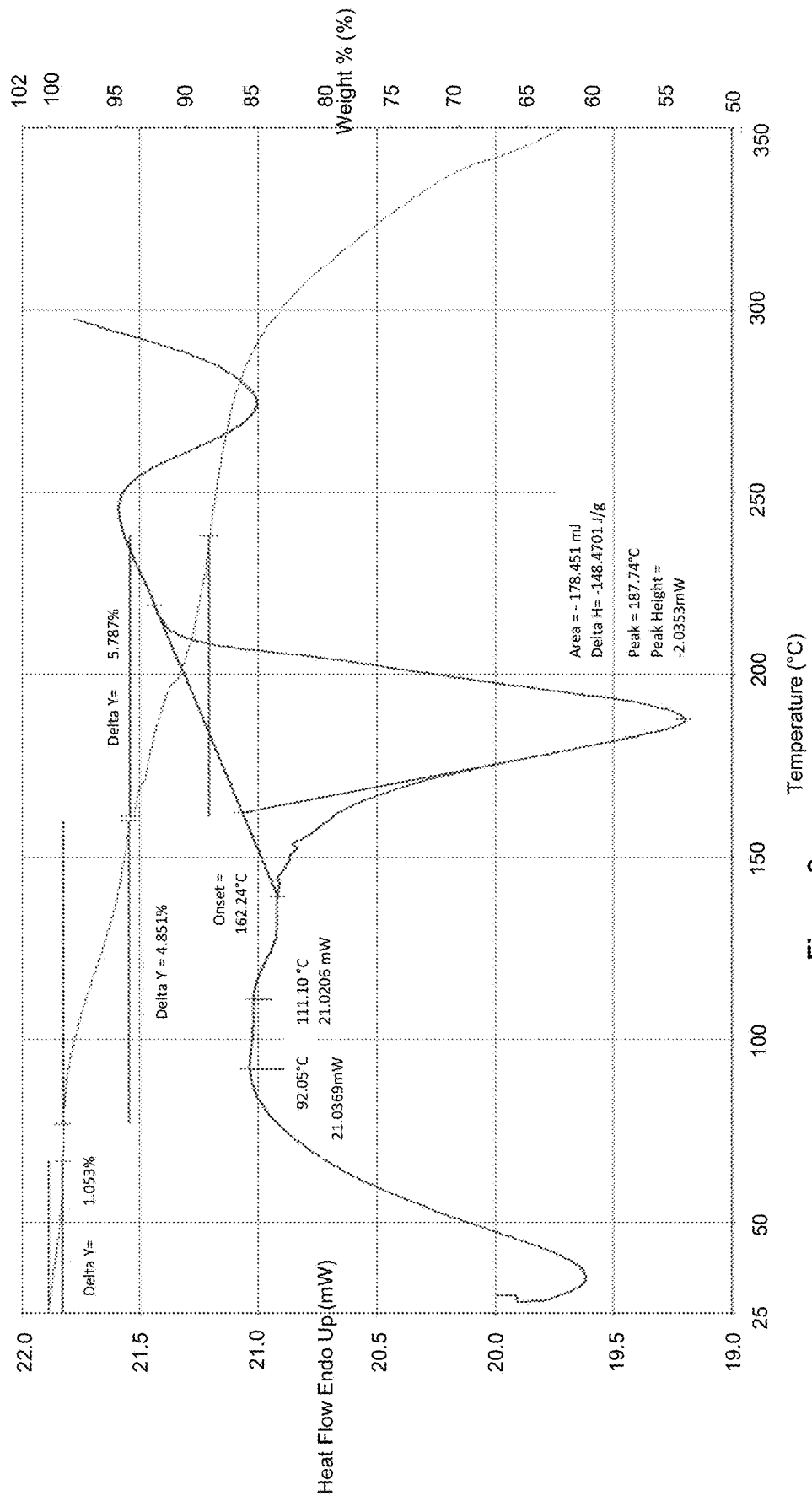
FIG. 2 is a DSC and TGA thermograph overlay for the amorphous compound after initial drying in vacuo for an hour at 45° C. followed by further drying in vacuo at 45° C. for about another 19¼ hours. The upper line is the TGA thermograph and the lower line containing the peak is the DSC thermograph.

Thermal examination (FIG. 2) of Batch 2 revealed evidence of minor endotherms in the DSC thermograph at ca. 92° C. and 111° C. leading into a significant exotherm with an onset and peak minimum at ca. 162° C. and 188° C. respectively. The TGA thermograph demonstrated a distinct, initial mass loss of 1.052 wt % from ca. 25-70° C. and a broader mass loss of 4.851 wt % from ca. 78-160° C. leading into a third, broad mass loss of 5.787 wt % from ca. 160-240° C. before the onset of decomposition.

Examination of Batch 2 by hot stage microscopy (HSM) revealed particle movement and solid contraction from ca. 83° C., leading into the onset of melting by ca. 102° C. and melt completion by ca. 145° C. with no evidence of crystallisation from the melt. Increased discolouration in the melt was evident by ca. 175° C.

$^1$H NMR spectroscopy (Jeol) of Batch 1 revealed a residual THF and DMSO content of 7.19 and 0.50 wt % respectively. $^1$H NMR spectroscopy of Batch 2 revealed a slightly reduced residual THF and DMSO content of 4.90 and 0.36 wt % respectively. A stochiometric THF solvate would require ca. 12.4 wt % THF present.

The total solvent content (and potentially residual water) is considered to correspond to the first two mass loss steps from 25-70° C. and 78-160° C. in the TGA thermograph with the remaining mass loss due to decomposition in the melt.

Example 2

Conversion of Amorphous 2-(2,6-dichlorophenyl)-5-[4-(1,1-dioxo-1,4-thiazinane-4-carbonyl)anilino]oxazole-4-carboxamide into Crystalline Forms Amorphous compound (Batch 2), 24×ca. 40±2 mg, was weighed into 24 crystallisation tubes. A selection of 24 solvents, 5 vol., were charged to the solids at 25° C. and observations made. A significant number of mixtures demonstrated dissolution upon solvent addition before affording a suspension within 10-15 minutes which was considered to be a consequence of the residual THF content and/or potentially indicative of form change and crystallisation. Where suspensions remained, additional solvent, 5 vol., was charged (10 vol. total) and observations made. The mixtures were heated to 50° C. (38° C. for DCM) and immediate observations noted. The mixtures were equilibrated at temperature for ca. 17 hours and observations noted. The mixtures were cooled to 25° C. over ca. 2¼ hours, equilibrated for ca. 4½ hours and observations noted. The mixtures were heated to temperature, equilibrated for ca. 16 hours and observations noted. The mixtures were cooled to 25° C. over ca. 2¼ hours, equilibrated for ca. 1 hour, observations noted and the solids isolated.

Upon isolation, all solids were dried in vacuo under air for ca. 10 to 20 minutes and then dried in vacuo at 45° C. for 68 hours.

Observations during the solvent addition and thermal modulation are summarised in Table 1. The crystal forms resulting from the different conditions are summarised in Table 2.

TABLE 1

| ID | Solvent | 25° C., 5 vol. Immediate | 25° C., 10-15 mins | 1st 50° C.*1, 10 vol | 1st 50° C.*1, T = 15 mins | 1st 25° C. T = 17 Hrs | 2nd 50° C.*1, post-cool | 2nd 50° C.*1, T = 16 Hrs | 2nd 25° C. post-cool |
|---|---|---|---|---|---|---|---|---|---|
| A | Cyclohexane | Susp. | Susp. | Susp. | Susp. | Susp. + YS | Susp. + YS | Susp. + YS | Susp. + YS |
| B | Chlorobenzene | Haze | Gum | Susp. | Susp. | Susp. + YS | Susp. + YS | Susp. + YS | Susp. + YS |
| C | 2-Chlorobutane | Susp. | Susp. | Susp. | Susp. | Susp. + YS | Susp. + YS | Susp. + YS | Susp. + YS |
| D | Benzotrifluoride | Susp. | Susp. | Susp. | Susp. | Susp. + YS | Susp. + YS | Susp. + YS | Susp. + YS |
| E | Anisole | Dissolved | Susp. | Susp. | Susp. | Susp. | Susp. | Susp. | Susp. |
| F | Nitromethane | Dissolved | Susp. | Susp. | Susp. | Susp. | Susp. | Susp. | Susp. |
| G | CPME | Susp. | Susp. | Susp. | Susp. | Susp. | Susp. + YS | Susp. + YS | Susp. + YS |
| H | Heptane | Susp. | Susp. | Susp. | Susp. | Susp. + YS | Susp. + YS | Susp. + YS | Susp. + YS |
| I | TBME | Susp. | Susp. | Susp. | Susp. | Susp. | Susp. | Susp. | Susp. |
| J | MIBK | Haze | Susp. | Susp. | Susp. | Susp. | Susp. | Susp. | Susp, |
| K | MEK | Dissolved | Susp. | Susp. | Susp. | Susp. | Susp. | Susp. | Susp. |
| L | IPrOAc | Susp. | Susp. | Susp. | Susp. | Susp. | Susp. | Susp. | Susp. |
| M | EtOAc | Dissolved | Susp. | Susp. | Susp. | Susp. | Susp. | Susp. | Susp. |
| N | Toluene | Haze | Susp. | Susp. | Susp. | Susp. + YS | Susp. + YS | Susp. + YS | Susp. + YS |
| O | THF | Dissolved | Solution | N/A | Susp.*2 | Susp. | Susp. | Susp. | Susp. |
| P | DCM (*1 38° C.) | Dissolved | Susp. | Susp. | Susp. | Susp. | Susp. | Susp. | Susp. |
| Q | MeOH | Gum | Susp. | Susp. | Susp. | Susp. | Susp. | Susp. | Susp. |
| R | EtOH | Susp. | Susp. | Susp. | Susp. | Susp. | Susp. | Susp. | Susp. |
| S | IPA | Susp. | Susp. | Susp. | Susp. | Susp. | Susp. + YS | Susp. + YS | Susp. + YS |
| T | MeCN | Dissolved | Susp. | Susp. | Susp. | Susp. | Susp. | Susp. | Susp. |
| U | Water | Immiscible | Susp. | Susp. | Susp. | Susp. | Susp. | Susp. | Susp. |
| V | 4:1 MeCN/water | Dissolved | Susp. | Susp. | Susp. | Susp. | Susp. | Susp. | Susp. |
| W | 4:1 THF/water | Dissolved | Solution | N/A | Solution | Susp. | Susp. | Susp. | Susp. |
| X | 4:1 IPA/water | Gum | Gum | N/A | Gum | Susp. | Susp. | Susp. | Susp. |

In Table 1:
*1Charged additional solvent up to 10 vol.
Susp. = Suspension
Haze = Predominantly dissolved
YS = Yellow solid deposit above the mixture level

TABLE 2

Form fate after equilibrations of amorphous compound at 25° C.

| ID | Solvent | Form fate from amorphous at 25° C. |
|---|---|---|
| A | Cyclohexane | Low cryst. Form B |
| B | Chlorobenzene | Low cryst. Form B |
| C | 2-Chlorobutane | Low cryst. Form B |
| D | Benzotrifluoride | Low cryst. Form B |
| E | Anisole | Form E |
| F | Nitromethane | Form C |
| G | CPME | Low cryst. Form B |
| H | Heptane | Low cryst. Form B |
| I | TBME | Low cryst. Form B |
| J | MIBK | Low cryst. Form B |
| K | MEK | Low cryst. Form B |
| L | iPrOAc | Low cryst. Form B |
| M | EtOAc | Form D |
| N | Toluene | Form B |
| O | THF | Low cryst. Form B |
| P | DCM (*38° C.) | Form C |
| Q | MeOH | Low cryst. Form B |
| R | EtOH | Form C |
| S | IPA | Low cryst. Form B |
| T | MeCN | Form C |
| U | Water | Form A |
| V | 4:1 MeCN/water | Form A |
| W | 4:1 THF/water | Form A |
| X | 4:1 IPA/water | Form A + evidence of B |

Of the twenty four solvents/solvent mixtures assessed, the amorphous compound demonstrated complete/significant dissolution upon addition of fifteen solvents, 5 vol. However, within 10-15 minutes, twelve of these mixtures gave suspensions. Following extended equilibration at 50° C., suspensions were afforded from all mixtures.

The predominant XRPD pattern of the dried solids was Form B (14 hits).

Form A was isolated only from the aqueous solvent mixtures.

Form C was isolated from nitromethane, DCM, EtOH and MeCN.

Equilibration in anisole afforded a new form, identified arbitrarily as Form E.

$^1$H NMR spectroscopy (Jeol) of Form E demonstrated residual anisole, THF and DMSO contents of 1.14, 0.86 and 0.52 wt % respectively (17.5 wt % Anisole required for 1:1 solvate).

Thermal examination of Form E revealed two endotherms peaking at 187 and 226° C., not too dissimilar to main endotherms for Form A and Form B respectively.

Thermal manipulation by heating Form E to 200° C., past the first endotherm, and then cooling, demonstrated removal of the first endotherm upon reheating. Insufficient solid remaining for XRPD examination of the thermally manipulated material.

HSM of Form E revealed particle excitement at 170° C. leading into contraction from 179° C. into a melt by 192° C. Gradual crystallisation was observed in the melt from 192° C. until the crystals melted from 224 to 230° C.

Equilibration of the amorphous compound in EtOAc afforded a new form, labelled as Form D.

$^1$H NMR spectroscopy of Form D demonstrated a residual EtOAc and DMSO content of 4.30 and 0.15 wt % respectively (14.7 wt % EtOAc required for 1:1 solvate). There was no detectable THF observed.

Thermal examination of Form D (see FIG. 12) revealed a complex DSC thermograph, with a broad endotherm-exotherm peaking at 171° C. and 179° C. respectively (the endotherm of which was similar to Form C) before two sharper endotherms peaking at 209° C. and 229° C. (the latter of which is similar to Form B).

Thermal manipulation by heating the solid to 180° C., past the endo-exo, and then cooling, demonstrated removal of the endo-exo event upon reheating. The solid was heated to 215° C., past the second endotherm, and then cooled before reheating, demonstrating a minor endotherm at ca. 145° C. but no other events until the Form B endotherm. Insufficient solid remained for XRPD examination of the thermally manipulated material.

HSM of Form D revealed particle excitement at 162° C. leading into contraction from 168° C. into a melt by 182° C. Solids persisted and potentially crystallised within the melt until the crystals melted from 226° C. to 231° C., similar to Form E.

Example 3

Alternative Hydrolysis Conditions for Converting 2-(2,6-dichlorophenyl)-5-[4-(1,1-dioxo-1,4-thiazinane-4-carbonyl)anilino]oxazole-4-carbonitrile to 2-(2,6-dichlorophenyl)-5-[4-(1,1-dioxo-1,4-thiazinane-4-carbonyl)anilino]oxazole-4-carboxamide In step 1F of Example 1, the partial hydrolysis of the nitrile to the carboxamide is carried out using sulphuric acid. In an alternative method, the partial hydrolysis step can be carried out using a mixture of trifluoroacetic acid (TFA) and sulphuric acid.

Accordingly, TFA (1166 mL) was added to 2-(2,6-dichlorophenyl)-5-[4-(1,1-dioxo-1,4-thiazinane-4-carbonyl)anilino]oxazole-4-carbonitrile (350 g, 7.12 mmol) and the mixture was stirred at room temperature for 30 minutes and then cooled to 0-10° C.

Concentrated $H_2SO_4$ (584 mL) was added to the mixture over 30 minutes [an exothermic process] during which time the temperature was maintained in the range 0-20° C. After addition of the $H_2SO_4$ was complete, the reaction mixture was warmed to 15-25° C. and stirred for 5 hours at room temperature, after which liquid chromatography showed 3% remaining starting material. The reaction was quenched [exothermic] by addition to a mixture of c·$NH_3$ (3.0 L) and ice (4.0 Kg) over 30 minutes, keeping the temperature under 25° C. [pH shown to be >10 after addition]. The resulting slurry was stirred for 15 minutes and then filtered, washed ($H_2O$, 1.0 L) and pulled dry. The wet filtercake was reslurried in water (3.5 L) for 3 hours and re-filtered, washed ($H_2O$, 1.8 L) and dried in vacuo at 50° C. overnight to give (2,6-dichlorophenyl)-5-[4-(1,1-dioxo-1,4-thiazinane-4-carbonyl)anilino]-oxazole-4-carboxamide (402 g) at a purity of 93.2% with residual starting material at a level of 0.97% (by LC). The partially purified material was slurried in MeCN (1.5 L) for 1 hour at room temperature, filtered, washed (MeCN 0.5 L) and dried in vacuo at 50° C. overnight to afford 195 g of product. The product was further purified by dissolving in DMSO (500 mL) at room temperature, polish filtering and washing (DMSO, 80 mL), and then adding to $H_2O$ (3.8 L) over 2 hours keeping the temperature under 25° C. The resulting slurry was stirred for 30 minutes and then filtered, washed ($H_2O$, 2×900 mL) and dried in vacuo at 50° C. to give 170.8 g (44% yield) of (2,6-dichlorophenyl)-5-[4-(1,1-dioxo-1,4-thiazinane-4-carbonyl)anilino]oxazole-4-carboxamide at an activity of 95% by $^1H$ NMR assay and a purity of 97.1% by LC, 2.3% $H_2O$ by KF. Additionally, the MeCN liquors (80.9% by LC) were reworked using column chromatography to give 61.1 g of product at 93.9% by L and at 79% activity by C NMR assay.

The aqueous work-up used in this method of preparing 2-(2,6-dichlorophenyl)-5-[4-(1,1-dioxo-1,4-thiazinane-4-carbonyl)anilino]oxazole-4-carboxamide gives the compound in crystalline Form A.

Characterising Data for Crystalline Forms a, B, C and D

Form A

Figure 3:
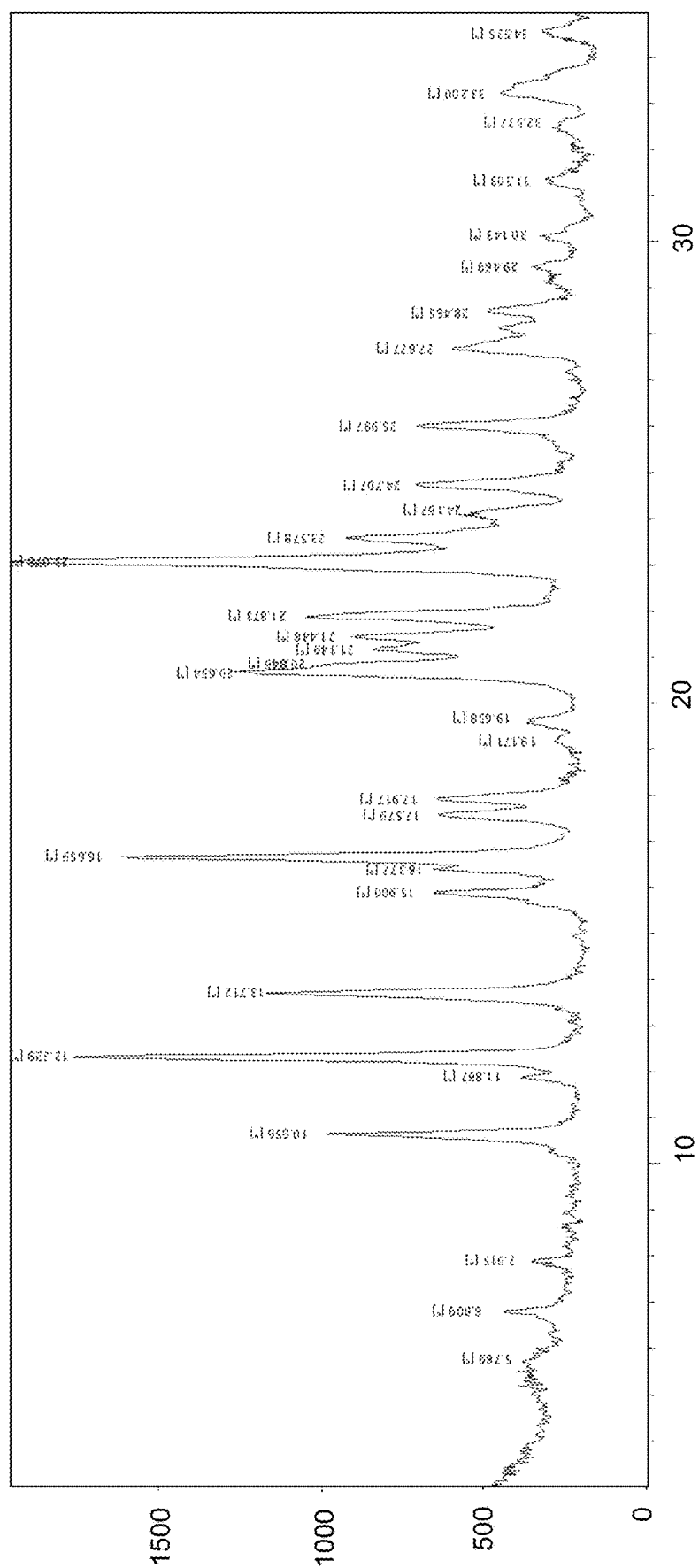
FIG. 3 shows an XRPD pattern for crystalline Form A.

The XRPD pattern for crystalline Form A is shown in FIG. 3.

The dataset for the XRPD pattern for Form A is set out in Table 3 below.

TABLE 3

Diffraction list for crystalline Form A

| Pos. [°2 Th.] | Height [cts] | FWHM [°2 Th.] | d-spacing [Å] | Rel. Int. [%] |
|---|---|---|---|---|
| 5.7688 | 68.62 | 0.8187 | 15.32049 | 3.88 |
| 6.8092 | 183.13 | 0.0768 | 12.98161 | 10.35 |
| 7.9153 | 104.54 | 0.1791 | 11.16996 | 5.91 |
| 10.6555 | 764.11 | 0.1023 | 8.30278 | 43.20 |
| 11.8866 | 174.60 | 0.1023 | 7.44547 | 9.87 |
| 12.3287 | 1580.11 | 0.1279 | 7.17948 | 89.33 |
| 13.7120 | 908.80 | 0.1791 | 6.45812 | 51.38 |
| 15.8998 | 455.66 | 0.1279 | 5.57408 | 25.76 |
| 16.3772 | 430.47 | 0.1023 | 5.41267 | 24.34 |
| 16.6586 | 1416.08 | 0.1279 | 5.32185 | 80.06 |
| 17.5788 | 439.57 | 0.1535 | 5.04531 | 24.85 |
| 17.9168 | 448.44 | 0.1535 | 4.95088 | 25.35 |
| 19.1711 | 84.18 | 0.1535 | 4.62969 | 4.76 |
| 19.6584 | 164.13 | 0.1791 | 4.51602 | 9.28 |
| 20.6540 | 1018.69 | 0.1535 | 4.30053 | 57.59 |
| 20.8459 | 798.79 | 0.0768 | 4.26137 | 45.16 |
| 21.1486 | 649.42 | 0.1279 | 4.20105 | 36.72 |
| 21.4463 | 708.71 | 0.1279 | 4.14340 | 40.07 |
| 21.8734 | 858.65 | 0.1791 | 4.06346 | 48.54 |
| 23.0784 | 1768.78 | 0.1791 | 3.85394 | 100.00 |
| 23.5779 | 740.25 | 0.1279 | 3.77341 | 41.85 |
| 24.1669 | 323.97 | 0.1791 | 3.68277 | 18.32 |
| 24.7073 | 512.14 | 0.1791 | 3.60344 | 28.95 |
| 25.9969 | 523.29 | 0.1791 | 3.42754 | 29.58 |
| 27.6769 | 413.00 | 0.1791 | 3.22318 | 23.35 |
| 28.4649 | 305.91 | 0.1535 | 3.13573 | 17.29 |
| 29.4695 | 152.94 | 0.1535 | 3.03107 | 8.65 |
| 30.1433 | 127.27 | 0.1791 | 2.96483 | 7.20 |
| 31.3029 | 117.38 | 0.2558 | 2.85760 | 6.64 |
| 32.5765 | 88.11 | 0.2558 | 2.74873 | 4.98 |
| 33.1996 | 261.01 | 0.1279 | 2.69856 | 14.76 |
| 34.5246 | 128.01 | 0.2558 | 2.59796 | 7.24 |

Thermal examination (FIG. 4) revealed a distinct endotherm in the DSC thermograph with an onset and maxima at 181.72 and 193.65° C. respectively. Prior to the main endotherm, there was a broad endotherm peaking at ca. 100° C. This broad endotherm corresponded to a mass loss of 2.582 wt % from 30 to 150° C. in the TGA thermograph and was therefore most likely water loss. A minor weight reduction of 0.148 wt % was coincident with the main endotherm. The onset of decomposition was observed from ca. 258° C.

Figure 4:
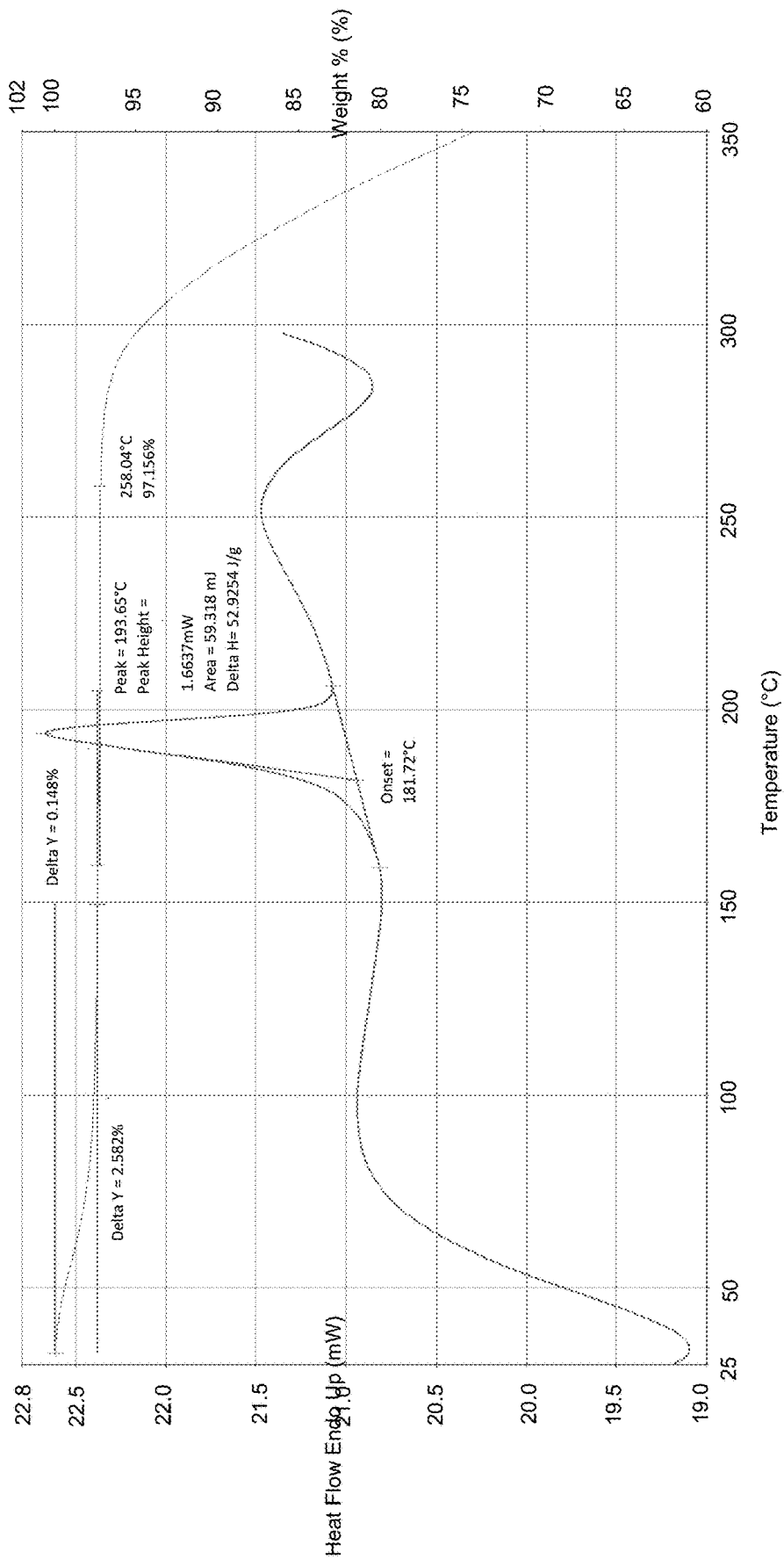
FIG. 4 is an overlay of the DSC and TGA thermographs for crystalline Form A. The upper line is the TGA thermograph and the lower line containing the peak is the DSC thermograph.

Thermal manipulation by holding at 150° C. for 1 minute, past the broad endotherm and mass loss, revealed a DSC thermograph that was similar to the input with little evidence of the broad endotherm shown in FIG. 4. The thermal manipulation was considered to have annealed the material. The thermal manipulation had no clear impact on the XPRD diffraction pattern of the solid.

Figure 5:
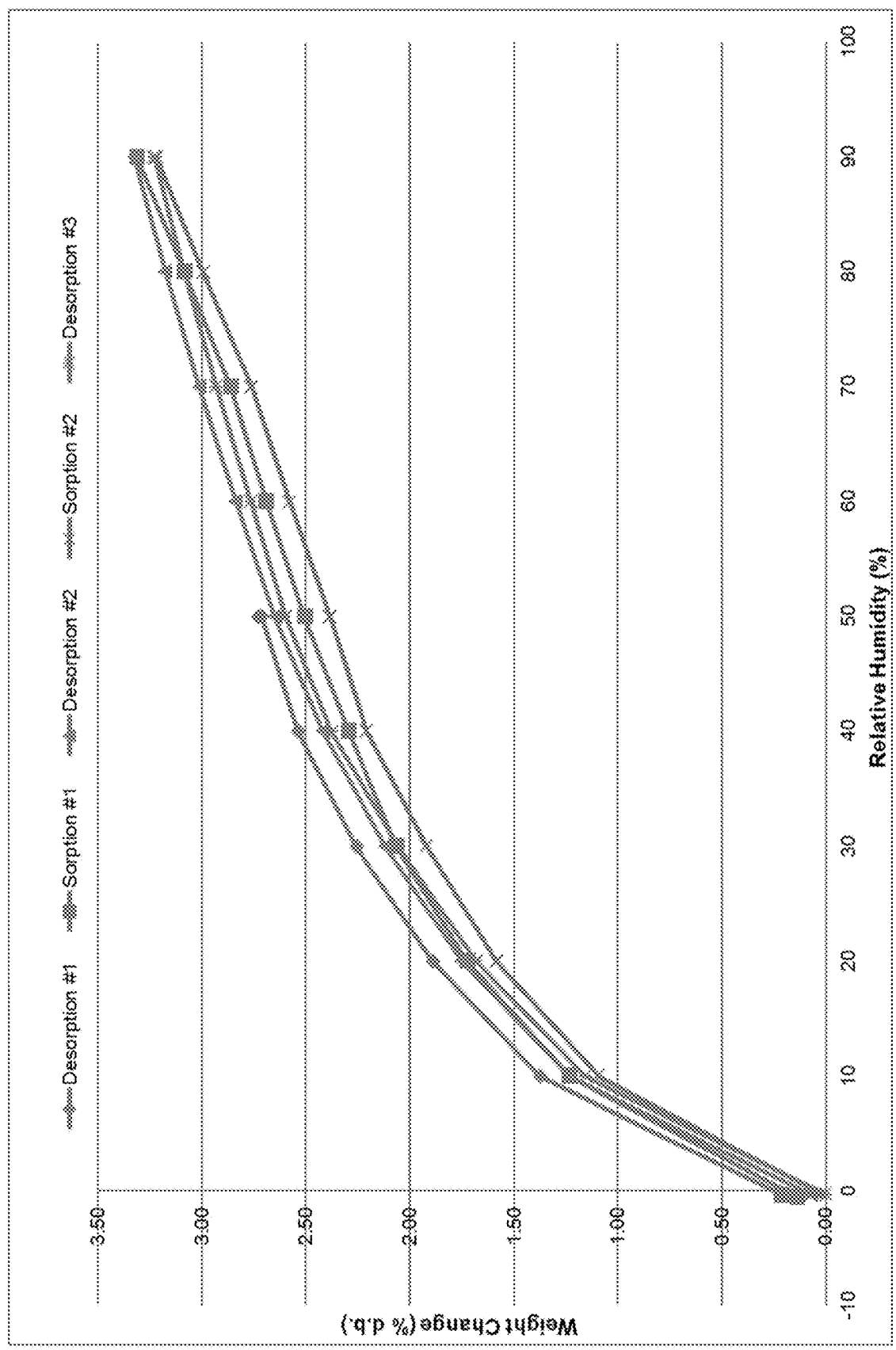
FIG. 5 is a DVS isotherm profile for crystalline Form A.

DVS examination of crystalline Form A (FIG. 5) revealed a weight reduction of ca. 2.75 wt % upon the first desorption from 50 to 0% RH and a total weight gain of ca. 3.25 wt % upon sorption from 0 to 90% RH. Repeat desorption and sorption was similar to the first steps with little evidence of hysteresis. Weight change was relatively steady between 20 and 90% RH but increased significantly between 0 and 20% RH.

Form B

Figure 6:
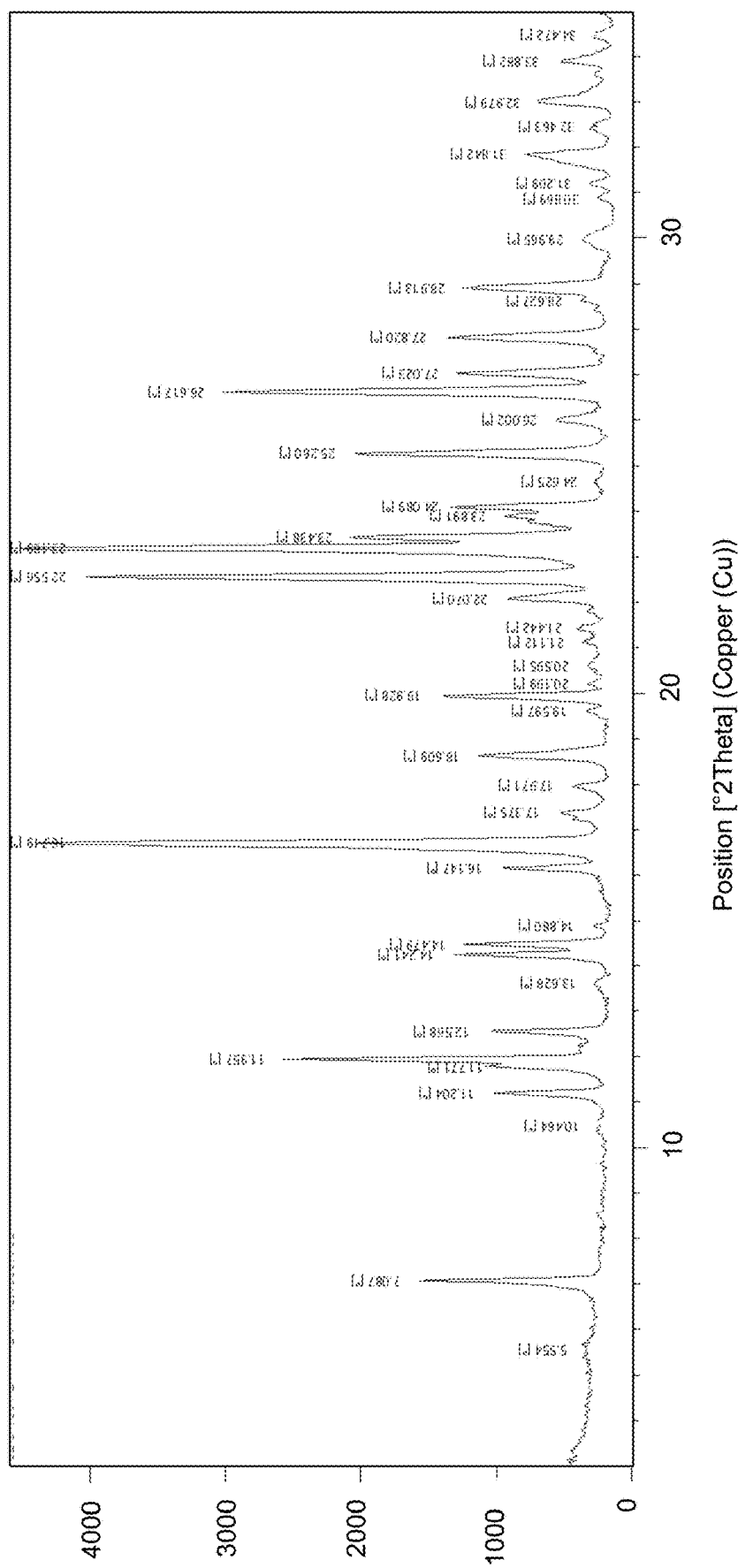
FIG. 6 shows an XRPD pattern for crystalline Form B.

The XRPD pattern for crystalline Form B is shown in FIG. 6.

The dataset for the XRPD pattern for Form B is set out in Table 4 below.

TABLE 4

Diffraction list for crystalline Form B

| Pos. [°2 Th.] | Height [cts] | FWHM [°2 Th.] | d-spacing [Å] | Rel. Int. [%] |
|---|---|---|---|---|
| 5.5536 | 51.16 | 0.4093 | 15.91347 | 1.16 |
| 7.0873 | 1325.52 | 0.1023 | 12.47286 | 29.97 |
| 10.4640 | 43.68 | 0.3070 | 8.45431 | 0.99 |
| 11.2039 | 822.74 | 0.1023 | 7.89756 | 18.60 |
| 11.7715 | 761.48 | 0.0512 | 7.51803 | 17.21 |
| 11.9570 | 2374.37 | 0.1023 | 7.40181 | 53.68 |
| 12.5675 | 866.40 | 0.0768 | 7.04357 | 19.59 |
| 13.6281 | 81.45 | 0.2558 | 6.49769 | 1.84 |
| 14.2410 | 1135.66 | 0.1023 | 6.21941 | 25.67 |
| 14.4789 | 1048.35 | 0.1023 | 6.11774 | 23.70 |
| 14.8804 | 94.58 | 0.0768 | 5.95358 | 2.14 |
| 16.1468 | 782.83 | 0.0768 | 5.48940 | 17.70 |
| 16.7188 | 4080.27 | 0.1535 | 5.30285 | 92.24 |
| 17.3746 | 353.00 | 0.0768 | 5.10415 | 7.98 |
| 17.9708 | 250.49 | 0.1279 | 4.93611 | 5.66 |
| 18.6086 | 949.61 | 0.1279 | 4.76835 | 21.47 |
| 19.5972 | 161.12 | 0.1023 | 4.52999 | 3.64 |
| 19.9280 | 1231.16 | 0.1279 | 4.45552 | 27.83 |
| 20.1989 | 148.01 | 0.0768 | 4.39638 | 3.35 |
| 20.5954 | 146.21 | 0.1535 | 4.31262 | 3.31 |
| 21.1125 | 186.10 | 0.0768 | 4.20816 | 4.21 |
| 21.4420 | 200.12 | 0.1279 | 4.14422 | 4.52 |
| 22.0703 | 750.73 | 0.1279 | 4.02765 | 16.97 |
| 22.5561 | 3876.39 | 0.1279 | 3.94200 | 87.63 |
| 23.1885 | 4423.53 | 0.1279 | 3.83589 | 100.00 |
| 23.4376 | 1897.41 | 0.1023 | 3.79569 | 42.89 |
| 23.8914 | 771.49 | 0.0512 | 3.72461 | 17.44 |
| 24.0891 | 1116.32 | 0.1023 | 3.69449 | 25.24 |
| 24.6251 | 94.22 | 0.2047 | 3.61527 | 2.13 |
| 25.2600 | 1882.59 | 0.1535 | 3.52583 | 42.56 |
| 26.0016 | 388.63 | 0.1535 | 3.42692 | 8.79 |
| 26.6169 | 2851.42 | 0.1279 | 3.34909 | 64.46 |
| 27.0229 | 1125.13 | 0.1535 | 3.29968 | 25.44 |
| 27.8202 | 1212.70 | 0.1279 | 3.20691 | 27.41 |
| 28.6270 | 210.92 | 0.0768 | 3.11833 | 4.77 |
| 28.9129 | 1077.05 | 0.1791 | 3.08814 | 24.35 |
| 29.9652 | 206.97 | 0.1535 | 2.98206 | 4.68 |
| 30.8688 | 89.74 | 0.1279 | 2.89679 | 2.03 |
| 31.2086 | 146.41 | 0.1279 | 2.86602 | 3.31 |
| 31.8422 | 627.56 | 0.1279 | 2.81043 | 14.19 |
| 32.4630 | 121.11 | 0.2047 | 2.75809 | 2.74 |
| 32.9792 | 523.67 | 0.1535 | 2.71609 | 11.84 |
| 33.8821 | 381.43 | 0.1279 | 2.64575 | 8.62 |
| 34.4717 | 110.96 | 0.2047 | 2.60183 | 2.51 |

Figure 7:
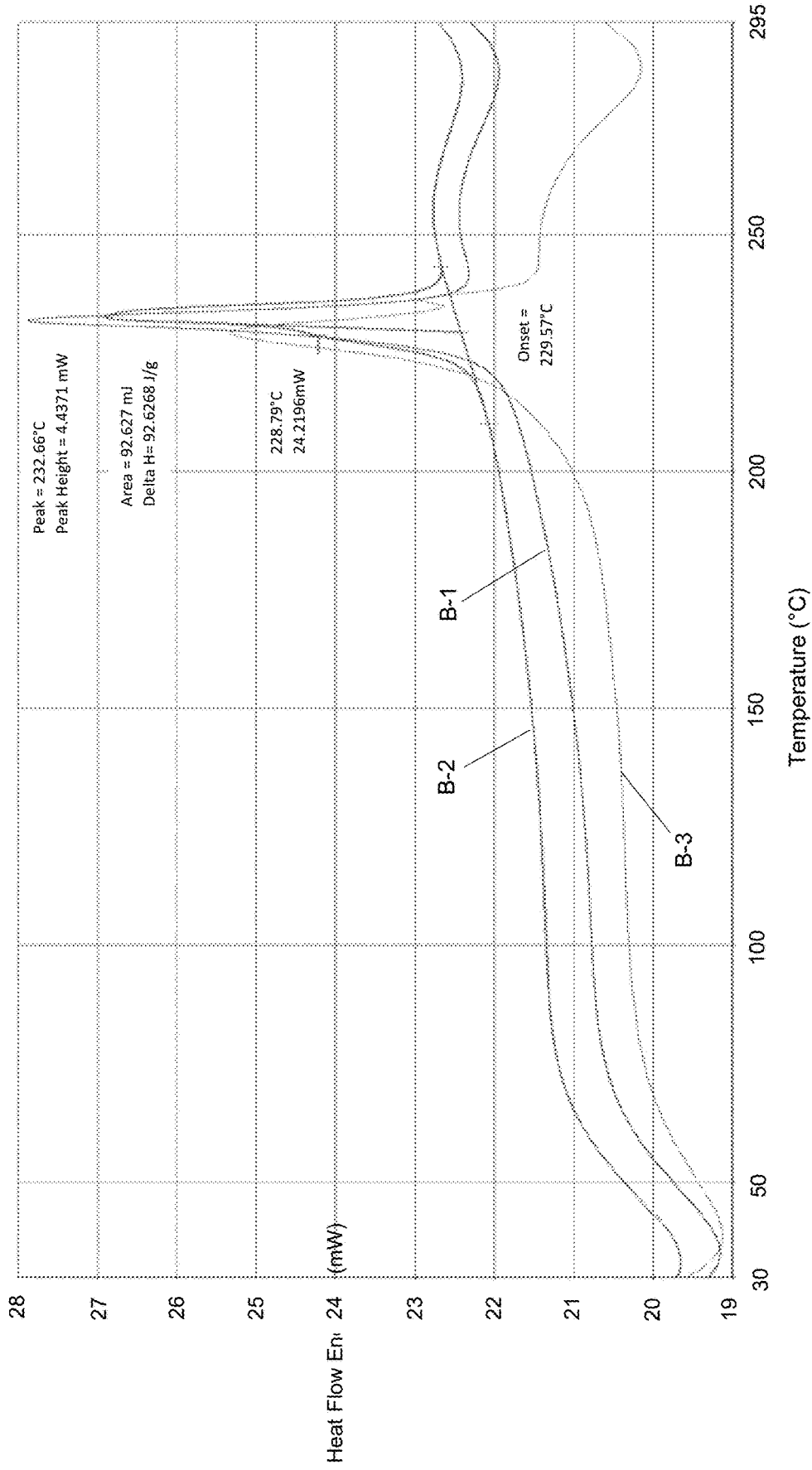
FIG. 7 shows DSC thermographs of three samples of crystalline Form B, denoted by lines B-1, B-2 and B-3.

FIG. 7 shows the DSC profiles of three samples of Form B prepared by different methods.

The DSC profile of a sample of crystalline Form B prepared by equilibration of Form A in nitromethane is represented by line B-1 in FIG. 7. This Form, although predominantly Form B was shown by XRPD (diffractogram not shown) to contain some Form A. DSC examination of this crystalline form shows a single endotherm with an onset and maxima at 228° C. and 232° C. respectively.

The DSC profile of a sample of crystalline Form B prepared by equilibration in MEK is represented by line B-2 in FIG. 7. The DSC thermograph shows an endotherm with an onset and maxima at 230° C. and 233° C. respectively with a preceding shoulder at 229° C. Apart from the shoulder, the profile is similar to B-1.

The DSC profile of a third sample of Form B is shown by line B-3 and features an endotherm with an onset and maxima at similar temperatures as B-1 but with a bimodal peak at 236° C.

Figure 8:
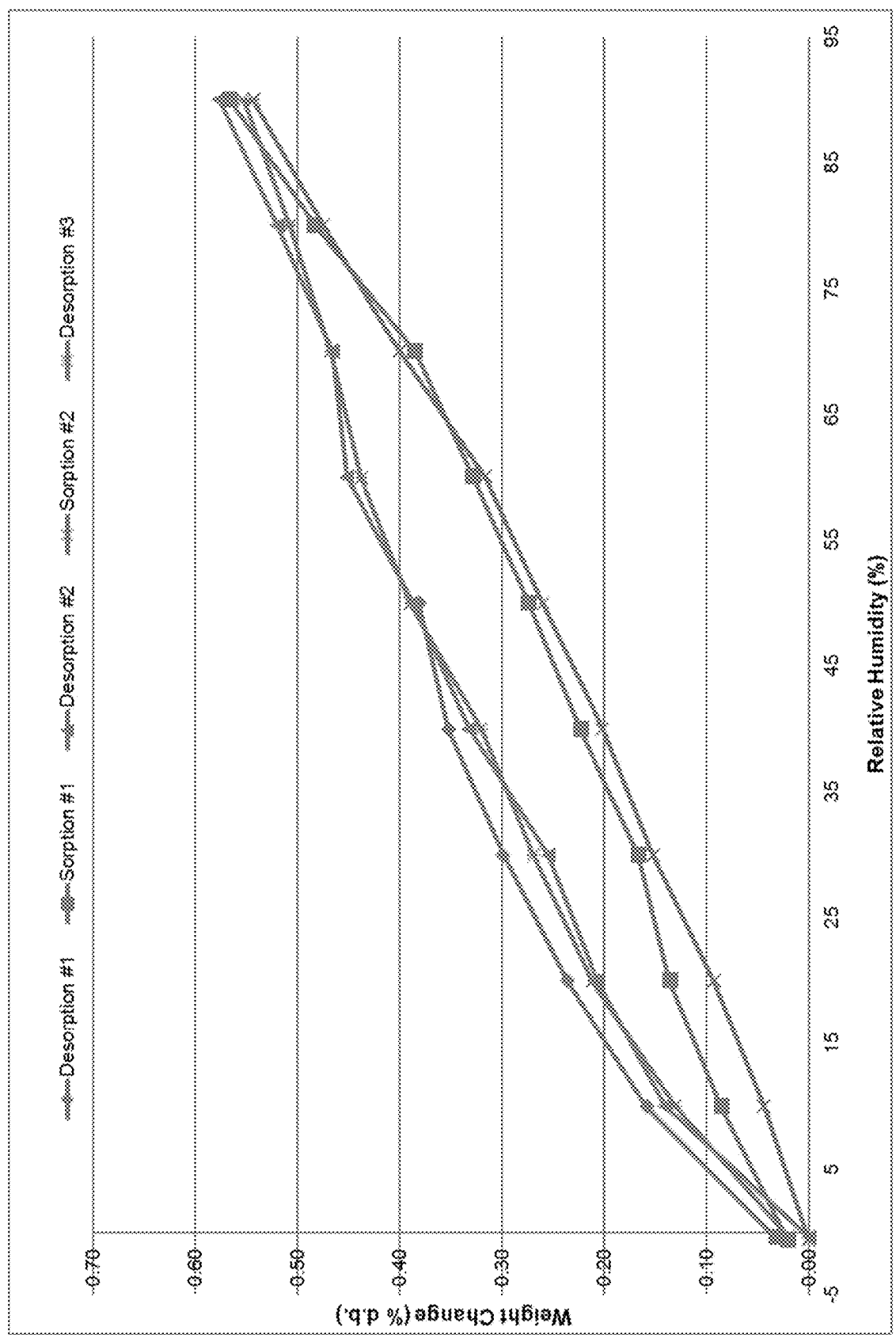
FIG. 8 is a DVS isotherm profile for crystalline Form B.

DVS examination of Form B (see FIG. 8) demonstrated a weight reduction of ca. 0.38 wt % upon the first desorption from 50 to 0% RH and a total weight gain of ca. 0.57 wt % upon sorption from 0 to 90% RH. Repeat desorption and sorption was similar to the first steps with hysteresis of ca. 0.11 wt %, most evident between 10 and 60% RH. Weight change was relatively steady between 0 and 90% RH. XRPD examination (diffractogram not shown) of the solid isolated post-DVS at 0 and 90% RH demonstrated no clear evidence of form modification from the input version.

Form C

Figure 9:
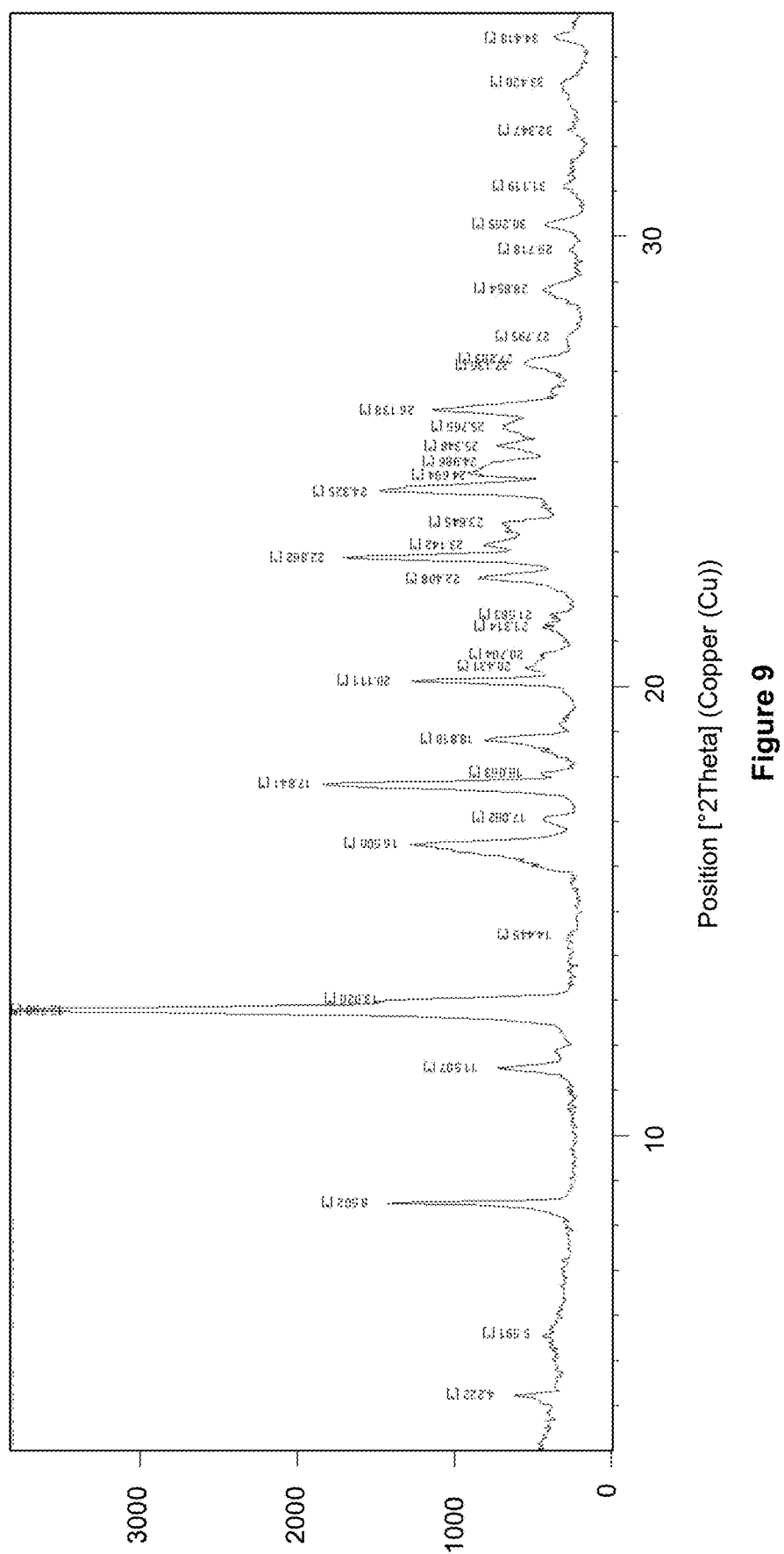
FIG. 9 shows an XRPD pattern for crystalline Form C.

The XRPD pattern for crystalline Form C is shown in FIG. 9.

The dataset for the XRPD pattern for Form C is set out in Table 5 below.

TABLE 5

| Pos. [°2 Th.] | Height [cts] | FWHM [°2 Th.] | d-spacing [Å] | Rel. Int. [%] |
|---|---|---|---|---|
| 4.2224 | 394.34 | 0.0768 | 20.92706 | 10.84 |
| 5.5915 | 165.56 | 0.3070 | 15.80584 | 4.55 |
| 8.5015 | 1191.88 | 0.1023 | 10.40094 | 32.75 |
| 11.5069 | 503.74 | 0.1279 | 7.69028 | 13.84 |
| 12.7898 | 3639.38 | 0.1535 | 6.92167 | 100.00 |
| 13.0197 | 1142.87 | 0.0768 | 6.79993 | 31.40 |
| 14.4454 | 46.19 | 0.3070 | 6.13187 | 1.27 |
| 16.4998 | 1027.50 | 0.1279 | 5.37272 | 28.23 |
| 17.0824 | 215.07 | 0.2047 | 5.19077 | 5.91 |
| 17.8408 | 1579.57 | 0.1535 | 4.97180 | 43.40 |
| 18.0631 | 238.70 | 0.0768 | 4.91110 | 6.56 |
| 18.8181 | 546.23 | 0.1535 | 4.71573 | 15.01 |
| 20.1113 | 1078.39 | 0.1279 | 4.41533 | 29.63 |
| 20.4314 | 313.82 | 0.1023 | 4.34687 | 8.62 |
| 20.7041 | 233.04 | 0.1535 | 4.29023 | 6.40 |
| 21.3136 | 206.18 | 0.1535 | 4.16889 | 5.67 |
| 21.5831 | 176.93 | 0.0768 | 4.11744 | 4.86 |
| 22.4078 | 648.46 | 0.1279 | 3.96774 | 17.82 |
| 22.8623 | 1508.30 | 0.1279 | 3.88989 | 41.44 |
| 23.1421 | 622.67 | 0.1023 | 3.84348 | 17.11 |
| 23.6446 | 497.31 | 0.1023 | 3.76293 | 13.66 |
| 24.3253 | 1242.33 | 0.1279 | 3.65914 | 34.14 |
| 24.6942 | 611.51 | 0.0768 | 3.60531 | 16.80 |
| 24.9864 | 541.61 | 0.1023 | 3.56381 | 14.88 |
| 25.3479 | 531.15 | 0.1023 | 3.51380 | 14.59 |
| 25.7650 | 491.05 | 0.2047 | 3.45785 | 13.49 |
| 26.1378 | 943.67 | 0.1535 | 3.40938 | 25.93 |
| 27.1360 | 338.98 | 0.1279 | 3.28619 | 9.31 |
| 27.2833 | 314.48 | 0.0768 | 3.26878 | 8.64 |
| 27.7947 | 81.32 | 0.2047 | 3.20979 | 2.23 |
| 28.8544 | 220.37 | 0.3582 | 3.09427 | 6.06 |
| 29.7177 | 63.98 | 0.2047 | 3.00632 | 1.76 |
| 30.2648 | 230.51 | 0.1791 | 2.95321 | 6.33 |
| 31.1192 | 108.33 | 0.1535 | 2.87405 | 2.98 |
| 32.3467 | 66.62 | 0.1535 | 2.76773 | 1.83 |
| 33.4199 | 123.26 | 0.2558 | 2.68127 | 3.39 |
| 34.4181 | 156.93 | 0.1791 | 2.60576 | 4.31 |

Figure 10:
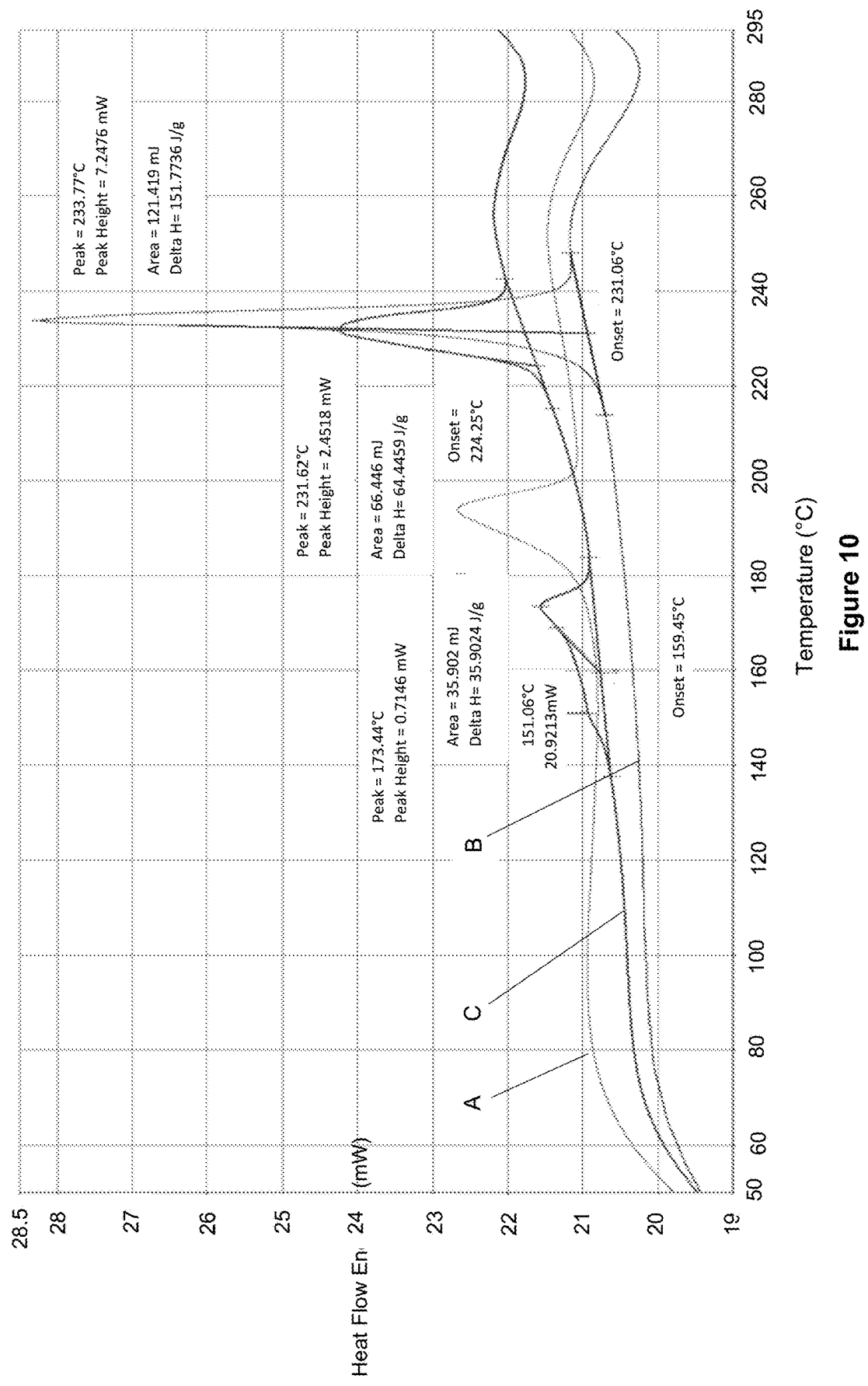
FIG. 10 shows a DSC thermograph comparison between crystalline Form A (line A), crystalline Form B (line B) and crystalline Form C (line C).

FIG. 10 shows a comparison of the DSC profiles of Forms A, B and C, represented respectively by lines A, B and C.

The Form C used in this DSC study was prepared by equilibration in THF at 25° C. using Form A as the starting material.

The profile of Form C features a broad endotherm from 140 to 180° C. with a peak maximum at 173° C. before a Form B-similar endotherm with an onset at 224° C. and maximum at 232° C.

HSM of Form C revealed particle excitement from ca. 147° C., leading into a partial melt by 187° C. Minor crystallisation was observed in the melt until ca. 210° C. Contraction was observed from ca. 220° C. into melt completion by 237° C.

The Form C sample was thermally manipulated by holding at 180° C. on the TGA. This revealed a mass loss of 0.42 and 2.08 wt % at 25-68° C. and 86-185° C. DSC assessment of the manipulated material revealed a thermograph that was characteristic of Form B. XRPD examination (diffractogram not shown) revealed form conversion from Form C to Form B.

Form D

Figure 11:
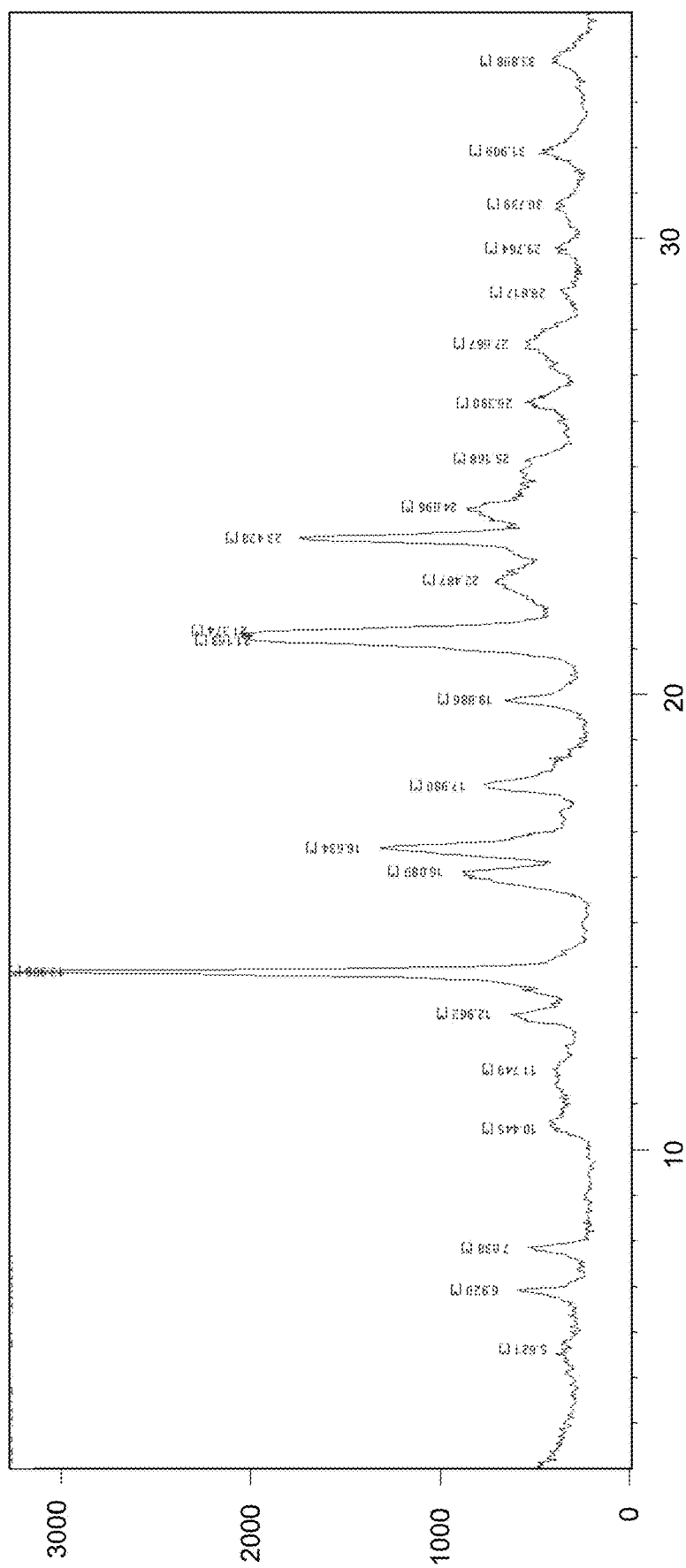
FIG. 11 shows an XRPD pattern for crystalline Form D.

The XRPD pattern for crystalline Form D is shown in FIG. 11.

The dataset for the XRPD pattern for Form D is set out in Table 6 below.

TABLE 6

| Pos. [°2 Th.] | Height [cts] | FWHM [°2 Th.] | d-spacing [Å] | Rel. Int. [%] |
| --- | --- | --- | --- | --- |
| 5.6206 | 64.42 | 0.6140 | 15.72399 | 2.10 |
| 6.9197 | 343.25 | 0.0768 | 12.77463 | 11.20 |
| 7.8376 | 303.12 | 0.1279 | 11.28042 | 9.89 |
| 10.4454 | 174.63 | 0.3070 | 8.46928 | 5.70 |
| 11.7494 | 175.66 | 0.6140 | 7.53214 | 5.73 |
| 12.9620 | 416.52 | 0.1023 | 6.83009 | 13.59 |
| 13.9079 | 3064.71 | 0.1023 | 6.36760 | 100.00 |
| 16.0891 | 670.11 | 0.2303 | 5.50894 | 21.87 |
| 16.6344 | 1104.35 | 0.1535 | 5.32955 | 36.03 |
| 17.9803 | 555.02 | 0.2303 | 4.93353 | 18.11 |
| 19.8856 | 413.47 | 0.1279 | 4.46494 | 13.49 |
| 21.1635 | 1689.30 | 0.1535 | 4.19813 | 55.12 |
| 21.3741 | 1708.82 | 0.1535 | 4.15724 | 55.76 |
| 22.4874 | 486.56 | 0.4093 | 3.95388 | 15.88 |
| 23.4275 | 1525.54 | 0.1535 | 3.79730 | 49.78 |
| 24.0956 | 598.82 | 0.3070 | 3.69351 | 19.54 |
| 25.1684 | 323.67 | 0.1535 | 3.53846 | 10.56 |
| 26.3897 | 310.41 | 0.2558 | 3.37740 | 10.13 |
| 27.6672 | 329.24 | 0.2558 | 3.22429 | 10.74 |
| 28.8165 | 131.44 | 0.1535 | 3.09825 | 4.29 |
| 29.7643 | 157.37 | 0.2558 | 3.00172 | 5.13 |
| 30.7387 | 148.30 | 0.3070 | 2.90875 | 4.84 |
| 31.9093 | 239.42 | 0.2558 | 2.80467 | 7.81 |
| 33.8982 | 184.26 | 0.3070 | 2.64453 | 6.01 |

Figure 12:
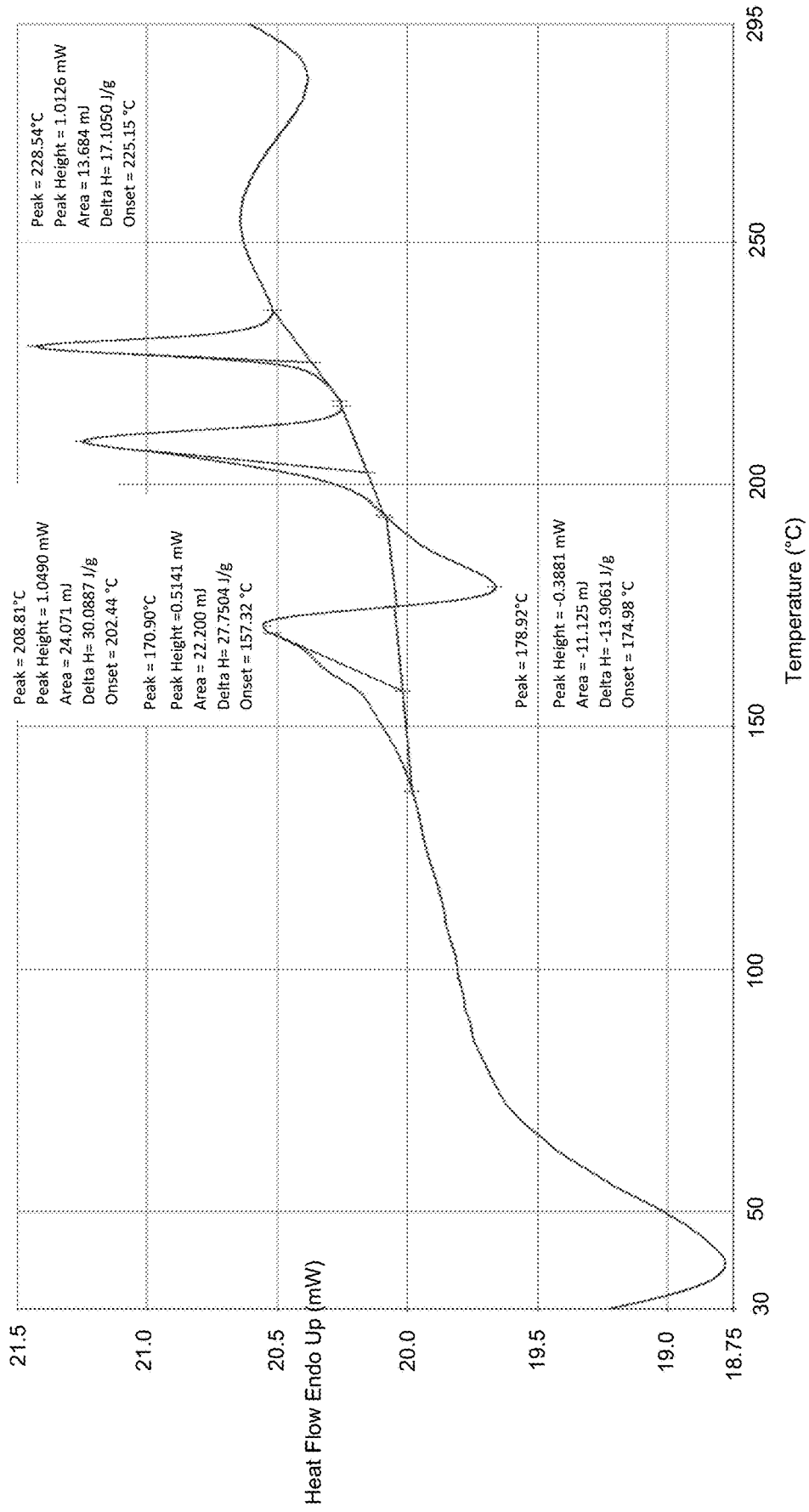
FIG. 12 shows a DSC thermograph for crystalline form D.

FIG. 12 shows a DSC thermograph of Form D. The Form D was prepared by equilibration of amorphous compound in ethyl acetate at 25° C.

$^1$H NMR spectroscopy (JEOL—spectrum not shown) of Form D demonstrated a residual EtOAc and DMSO content of 4.30 and 0.15 wt % respectively (14.7 wt % EtOAc required for 1:1 solvate).

Thermal examination (FIG. 12) revealed a complex DSC thermograph, with a broad endotherm-exotherm peaking at 171° C. and 179° C. respectively (the endotherm of which was similar to Form C) before two sharper endotherms peaking at 209° C. and 229° C. (the latter of which is similar to Form B).

Thermal manipulation (DSC trace not shown) by heating the solid to 180° C., past the endo-exo, and then cooling demonstrated removal of the endo-exo event upon reheating. The solid was heated to 215° C., past the second endotherm, and then cooled before reheating, demonstrating a minor endotherm at ca. 145° C. but no other events occurred until the Form B endotherm. Insufficient solid remained for XRPD examination of the thermally manipulated material.

HSM revealed particle excitement at 162° C. leading into contraction from 168° C. into a melt by 182° C. Solids persisted and potentially crystallised within the melt until the crystals melted from 226° C. to 231° C.

Example 4

Conversion of 2-(2,6-dichlorophenyl)-5-[4-(1,1-dioxo-1,4-thiazinane-4-carbonyl)anilino]oxazole-4-carboxamide Form a into Other Crystalline Forms Equilibration of Form A in various solvents gives very different outcomes from equilibration of amorphous compound in the same range of solvents.

Samples of crystalline Form A, 24×ca. 50±2 mg, were weighed into 24 crystallisation tubes. A selection of 24 solvents, 0.25 ml, 5 vol., were charged to the solids at 25° C. and observations made. Where suspensions remained, additional solvent, 0.25 ml, 5 vol., was charged up to 1 ml (20 vol.) total with ca. 30 minutes to equilibrate between each solvent charge. The mixtures were heated to 50° C. (38° C. for DCM) and immediate observations noted. The mixtures were equilibrated at temperature for ca. 21 hours and observations noted. The mixtures were cooled to 25° C. over ca. 2½ hours, equilibrated for ca. 4 hours and observations noted. The mixtures were heated to temperature and equilibrated for ca. 16½ hours. Observations were noted and, where suspensions held, samples were taken. The mixtures were cooled to 25° C. over ca. 1½ hours, equilibrated for ca. 1 hour, observations noted and the solids isolated.

Upon isolation, all solids were dried in vacuo under air for ca. 10 to 20 minutes and then dried in vacuo at 45° C. for ca. 17 hours. Upon isolation at 25° C., the filtrates were retained for compound solubility which was determined by HPLC.

Observations during the solvent addition and thermal modulation are summarised in Table 7. The form fate by XRPD at temperature and 25° C., solubility and overall CP (at 25° C.) of the solids are summarised in Table 8.

Of the 24 solvents/solvent mixtures assessed, the compound remained as a suspension upon addition of 21 solvents. Of the 3 solvents where complete/partial dissolution occurred, CPME and THF gave suspensions following extended equilibration at 50° C., leaving only THF/water, 4:1, as a solution that failed to return solid from 15 vol.

Moderate compound solubility (1 to 10 mg ml$^{-1}$) was observed in half of the solvents with poor compound solubility (<1 mg ml$^{-1}$) observed in cyclohexane, 2-chlorobutane, heptane, TBME and water. Significant compound solubility (>10 mg ml$^{-1}$) was observed in anisole, nitromethane, THF, DCM and THF/water, 4:1.

The predominant XRPD pattern of the dried solids was Form A, the input version.

Equilibration in MEK gave Form B.

Nitromethane returned predominantly Form B with very minor evidence of Form A. Equilibration in EtOAc and MeCN returned Form A/B mixed versions.

The crystalline forms produced by equilibration in THF and DCM were found to be dependent on the temperatures. The use THF as an equilibration solvent at 50° C. afforded Form B but, upon cooling to 25° C., afforded Form C. Conversely, DCM at 38° C. afforded Form C but, upon cooling to 25° C., afforded Form B.

TABLE 7

Solvents used during the equilibration of Form A and observations throughout

| ID | Solvent | 25° C., 5 vol. | 25° C., 10 vol. | 25° C., 15 vol. | 25° C., 20 vol. | 1st 50° C.*, T = 15 mins | 1st 50° C.*, T = 17 Hrs | 1st 25° C. post-cool | 2nd 50° C.*, T = 16½ Hrs | 2nd 25° C. post-cool |
|---|---|---|---|---|---|---|---|---|---|---|
| A | Cyclohexane | Susp. | Susp. | Susp. | Susp. | Susp. | Susp. | Susp. | Susp. | Susp. |
| B | Chlorobenzene | Susp. | Susp. | Susp. | Susp. | Susp. | Susp. | Susp. | Susp. + YS | Susp. + YS |
| C | 2-Chlorobutane | Susp. | Susp. | Susp. | Susp. | Susp. | Susp. | Susp. | Susp. | Susp. |
| D | Benzotrifluoride | Susp. | Susp. | Susp. | Susp. | Susp. | Susp. | Susp. | Susp. | Susp. |
| E | Anisole | Susp. | Susp. | Susp. | Susp. | Susp. | Susp. | Susp. | Susp. | Susp. |
| F | Nitromethane | Susp. | Susp. | Susp. | Susp. | Susp. | Susp. + YS | Susp. + YS | Susp. + YS | Susp. + YS |
| G | CPME | Susp. | Susp. | Susp. | Susp. | Dissolved | Susp. | Susp. | Susp. | Susp. |
| H | Heptane | Susp. | Susp. | Susp. | Susp. | Susp. | Susp. | Susp. | Susp. | Susp. |
| I | TBME | Susp. | Susp. | Susp. | Susp. | Susp. | Susp. | Susp. | Susp. + YS | Susp. + YS |
| J | MIBK | Susp. | Susp. | Susp. | Susp. | Susp. | Susp. + YS | Susp. + YS | Susp. + YS | Susp. + YS |
| K | MEK | Susp. | Susp. | Susp. | Susp. | Susp. | Susp. + YS | Susp. + YS | Susp. + YS | Susp. + YS |
| L | iPrOAc | Susp. | Susp. | Susp. | Susp. | Susp. | Susp. + YS | Susp. + YS | Susp. + YS | Susp. + YS |
| M | EtOAc | Susp. | Susp. | Susp. | Susp. | Susp. | Susp. + YS | Susp. + YS | Susp. + YS | Susp. + YS |
| N | Toluene | Susp. | Susp. | Susp. | Susp. | Susp. | Susp. + YS | Susp. + YS | Susp. + YS | Susp. + YS |
| O | THF | Susp. | Susp. | Susp. | Dissolved | Solution | Haze + YS | Susp. + YS | Susp. + YS | Susp. + YS |
| P | DCM (*38° C.) | Susp. | Susp. | Susp. | Susp. | Susp. | Susp. | Susp. | Susp. | Susp. |
| Q | MeOH | Susp. | Susp. | Susp. | Susp. | Susp. | Susp. | Susp. | Susp. + YS | Susp. + YS |
| R | EtOH | Susp. | Susp. | Susp. | Susp. | Susp. | Susp. + YS | Susp. + YS | Susp. + YS | Susp. + YS |
| S | IPA | Susp. | Susp. | Susp. | Susp. | Susp. | Susp. + YS | Susp. + YS | Susp. + YS | Susp. + YS |
| T | MeCN | Susp. | Susp. | Susp. | Susp. | Susp. | Susp. + YS | Susp. + YS | Susp. + YS | Susp. + YS |
| U | Water | Susp. | Susp. | Susp. | Susp. | Susp. | Susp. | Susp. | Susp. | Susp. |
| V | 4:1 MeCN/water | Susp. | Susp. | Susp. | Susp. | Susp. | Susp. | Susp. | Susp. | Susp. |
| W | 4:1 THF/water | Susp. | Haze | Dissolved | N/A | Solution | Solution | Solution | Solution | Solution |
| X | 4:1 IPA/water | Susp. | Susp. | Susp. | Susp. | Susp. | Susp. + YS | Susp. + YS | Susp. + YS | Susp. + YS |

Susp. = Suspension
Haze = Predominantly dissolved mixture
YS = Yellow solid deposit observed above the mixture level

TABLE 7

Form fate, solubility and CP summary of Form A following equilibration of Form A in various solvents with thermal modulation

| ID | Solvent | Form fate by XRPD at: 25° C. | Form fate by XRPD at: 50° C.* | Solubility at 25° C. (mg/ml) | CP by HPLC at 25° C. (%) |
|---|---|---|---|---|---|
| A | Cyclohexane | Form A | Form A | 0.01 | 97.25 |
| B | Chlorobenzene | Form A | Form A | 1.87 | 97.63 |
| C | 2-Chlorobutane | Form A | Form A | 0.29 | 97.26 |
| D | Benzotrifluoride | Form A | Form A | 0.16 | 96.81 |
| E | Anisole | Form A | Form A | 10.61 | 98.28 |
| F | Nitromethane | Form B + evidence of A | Form B + evidence of A | 20.52 | 98.42 |
| G | CPME | Form A | Form A | 1.87 | 97.81 |
| H | Heptane | Form A | Form A | 0* | 97.06 |
| I | TBME | Form A | Form A | 0.70 | 97.52 |
| J | MIBK | Form A | Form A | 7.40 | 98.50 |
| K | MEK | Form B | Form B | 6.08 | 98.09 |
| L | iPrOAc | Form A | Form A | 6.96 | 98.57 |
| M | EtOAc | Form A/B Mix | Form A/B Mix | 6.64 | 97.90 |
| N | Toluene | Form A | Form A | 1.12 | 96.34 |
| O | THF | Form C | Form B | 33.30 | 98.54 |
| P | DCM (*38° C.) | Form B | Form C | 22.83 | 98.26 |
| Q | MeOH | Form A | Form A | 2.52 | 98.26 |
| R | EtOH | Form A | Form A | 5.20 | 98.27 |
| S | IPA | Form A | Form A | 2.45 | 97.98 |
| T | MeCN | Form A/B Mix | Form A/B Mix | 9.16 | 97.55 |
| U | Water | Form A | Form A | 0.06 | 97.11 |
| V | 4:1 MeCN/water | Form A | Form A | 19.78 | 99.24 |

TABLE 7-continued

Form fate, solubility and CP summary of Form A following
equilibration of Form A in various solvents with thermal modulation

| ID | Solvent | Form fate by XRPD at: 25° C. | Form fate by XRPD at: 50° C.* | Solubility at 25° C. (mg/ml) | CP by HPLC at 25° C. (%) |
|---|---|---|---|---|---|
| W | 4:1 THF/water | No solid isolated | | >67 | N/A |
| X | 4:1 IPA/water | Form A | Form A | 7.65 | 98.90 |

*There was no peak detected in the chromatogram for the filtrate (×100 dilution)

the solutions were clarified and aliquots containing ca. 30 mg of the compound were charged to four crystallisation tubes.

To each of the four aliquots was charged an anti-solvent (see Table 8), ca. 5 vol., at 60° C. and immediate observations were made. Observations were made after equilibration for 1 hour before additional anti-solvent, 5 vol., was charged to all mixtures. Where suspensions or immiscible mixtures had formed, no further anti-solvent was charged. To all solutions and hazes, additional anti-solvent up to 20 vol. total charge was added.

The mixtures were equilibrated at 60° C. for another hour before cooling to 25° C. over ca. 3 hours and equilibrated for ca. 14½ hours. Most mixtures were observed to have afforded suspensions. Upon isolation, all solids were dried in vacuo under air for ca. 1 hour and then dried in the oven in vacuo at 45° C. for 70 hours.

Observations made during the anti-solvent addition and subsequent cooling operation are summarised in Table 8.

TABLE 8

Solvents used and observations on outcome

| ID | Solvent | Anti-solvent | 60° C., 5 vol, anti-solvent Immediate | 60° C., 5 vol, anti-solvent 1 Hr | 60° C., 10 vol. anti-solvent | 60° C., 15 vol. anti-solvent | 60° C., 20 vol. anti-solvent | 25° C., 20 vol, 19 Hrs |
|---|---|---|---|---|---|---|---|---|
| A1 | THF/water, 4:1 | Cyclohexane | Gum | Susp. | Susp. | N/A | N/A | Susp. |
| A2 | 10 vol. | Heptane | Gum | Susp. | Susp. | N/A | N/A | Gummy Susp. |
| A3 | | Benzotrifluoride | Susp. | Susp. | Susp. | N/A | N/A | Susp. |
| A4 | | 2-Chlorobutane | Susp. | Susp. | Susp. | N/A | N/A | Susp. |
| B1 | THF | Cyclohexane | Gum→Soln. | Susp. | Susp. | N/A | N/A | Susp. |
| B2 | 25 vol. | Heptane | Gum→Soln. | Susp. | Susp. | N/A | N/A | Susp. |
| B3 | | Benzotrifluoride | Soln. | Susp. | Susp. | N/A | N/A | Susp. |
| B4 | | 2-Chlorobutane | Soln. | Susp. | Susp. | N/A | N/A | Susp. |
| C1 | Nitromethane | Cyclohexane | Immiscible | Immiscible | Immiscible | N/A | N/A | Bi. Susp. |
| C2 | 50 vol. | Heptane | Soln. | Soln. | Soln. | Soln. | Soln. | Bi. Susp. |
| C3 | | Benzotrifluoride | Soln. | Soln. | Soln. | Soln. | Soln. | Susp. |
| C4 | | 2-Chlorobutane | Soln. | Soln. | Soln. | Soln. | Soln. | Susp. |
| D1 | MeCN/water, 4:1 | Cyclohexane | Immiscible | Immiscible | Immiscible | N/A | N/A | Immiscible |
| D2 | 55 vol. | Heptane | Immiscible | Immiscible | Immiscible | N/A | N/A | Bi. Susp. |
| D3 | | Benzotrifluoride | Soln. | Soln. | Haze | Immiscible | Immiscible | Susp. |
| D4 | | 2-Chlorobutane | Soln. | Soln. | Haze | Haze | Haze | Bi. Susp. |

Example 5

Conversion of 2-(2,6-dichlorophenyl)-5-[4-(1,1-dioxo-1,4-thiazinane-4-carbonyl)anilino]oxazole-4-carboxamide Form a into Other Crystalline Forms by Dissolution/Anti-Solvent Method The equilibration of Form A in a range of solvents with thermal modulation indicated a range of suitable solvents and anti-solvents. Consequently, Form A was dissolved in a range of four solvents at an elevated temperature, clarified and charged with anti-solvent at the elevated temperature to assess the propensity of the compound towards anti-solvent-driven crystallisation.

2-(2,6-dichlorophenyl)-5-[4-(1,1-dioxo-1,4-thiazinane-4-carbonyl)anilino]oxazole-4-carboxamide Form A, 4×150-152 mg, was weighed into four crystallisation tubes. Four different solvents (see Table 8) were then charged to the solids and the resulting mixtures heated to 60° C. Where suspensions persisted, additional solvent was charged to achieve dissolution. Upon dissolution of the four mixtures, The forms produced by each of the sixteen solvent-antisolvent combinations are shown in Table 9 below. The forms were identified by their XRPD diffraction patterns.

TABLE 9

Forms isolated after anti-solvent addition at temperature to solutions of the compound

| ID | Solvent | Anti-solvent | Form fate by XRPD |
|---|---|---|---|
| A1 | THF/water, 4:1 | Cyclohexane | Form A |
| A2 | 10 vol. | Heptane | N/A - insufficient solid afforded |
| A3 | | Benzotrifluoride | Form A |
| A4 | | 2-Chlorobutane | Form A |
| B1 | THF | Cyclohexane | Form B |
| B2 | 25 vol. | Heptane | Form B |
| B3 | | Benzotrifluoride | Form B |
| B4 | | 2-Chlorobutane | Form B |
| C1 | Nitromethane | Cyclohexane | Form B + evidence of C |
| C2 | 50 vol. | Heptane | Form B |
| C3 | | Benzotrifluoride | Form B |
| C4 | | 2-Chlorobutane | Form C + evidence of B |
| D1 | MeCN/water, 4:1 | Cyclohexane | N/A - no solid afforded |

TABLE 9-continued

Forms isolated after anti-solvent addition at temperature to solutions of the compound

| ID | Solvent | Anti-solvent | Form fate by XRPD |
|---|---|---|---|
| D2 | 55 vol. | Heptane | Form A |
| D3 | | Benzotrifluoride | Form A |
| D4 | | 2-Chlorobutane | Form A |

Form A was generated from the aqueous-based solvent mixtures whereas Form B was predominantly generated by non-aqueous mixtures with the exception of the nitromethane/cyclohexane solvent/anti-solvent combination (which produced Form B with evidence of Form C) and nitromethane/2-chlorobutane (which produced Form C with evidence of Form B).

Rapidly Cooled, Reverse Anti-Solvent Addition Crystallisation

Anti-solvent crystallisation was carried out by dissolving 2-(2,6-dichlorophenyl)-5-[4-(1,1-dioxo-1,4-thiazinane-4-carbonyl)anilino]oxazole-4-carboxamide in a solvent with heating, clarifying the solution and adding cold anti-solvent using the following method.

2-(2,6-dichlorophenyl)-5-[4-(1,1-dioxo-1,4-thiazinane-4-carbonyl)anilino]oxazole-4-carboxamide, 4×153-155 mg, was weighed into four crystallisation tubes and a different solvent (see Table 10) was charged into each. The mixtures were heated to 60° C. to achieve dissolution and then clarified.

Three anti-solvents (see Table 10), 1.5 ml, were each charged to four crystallisation tubes and cooled to −10° C.

The clarified solutions of 2-(2,6-dichlorophenyl)-5-[4-(1,1-dioxo-1,4-thiazinane-4-carbonyl)anilino]oxazole-4-carboxamide at 60° C. were charged to the cold anti-solvents in aliquots containing ca. 50 mg of the compound (into ca. 30 vol. anti-solvent) and immediate observations were noted.

The resulting mixtures were equilibrated at −10° C. for ca. 22 hours, observations were made and the solids were isolated. All isolated solids were dried in vacuo under air for ca. 20 minutes and then dried in vacuo at 45° C. for 23½ hours.

Observations made during the anti-solvent addition and subsequent cooling operation are summarised in Table 10. The crystalline forms (as determined by XRPD) arising from each solvent-anti-solvent combination are set out in in Table 11. For comparison purposes, the crystalline forms produced by addition of anti-solvent at 60° C. (see Table 10 above) are also included in Table 11.

TABLE 10

Solvents and anti-solvents used during the rapidly cooled, reverse addition to anti-solvent at −10° C. and observations throughout

| | | | −10° C., 30 vol. anti-solvent | | |
|---|---|---|---|---|---|
| ID | Solvent | Anti-solvent | Immediate | 5 Hrs | 22 Hrs |
| A1 | THF/water, | Heptane | Gum | Suspension | Suspension |
| A2 | 4:1 10 vol. | Benzotrifluoride | Suspension | Suspension | Suspension |
| A3 | | 2-Chlorobutane | Suspension | Suspension | Suspension |
| B1 | THF | Heptane | Suspension | Suspension | Suspension |
| B2 | 25 vol. | Benzotrifluoride | Suspension | Suspension | Suspension |
| B3 | | 2-Chlorobutane | Suspension | Suspension | Suspension |
| C1 | Nitromethane | Heptane | Immiscible | Bi. Susp. | Bi. Susp. |

TABLE 10-continued

Solvents and anti-solvents used during the rapidly cooled, reverse addition to anti-solvent at −10° C. and observations throughout

| | | | −10° C., 30 vol. anti-solvent | | |
|---|---|---|---|---|---|
| ID | Solvent | Anti-solvent | Immediate | 5 Hrs | 22 Hrs |
| C2 | 50 vol. | Benzotrifluoride | Solution | Solution | Suspension |
| C3 | | 2-Chlorobutane | Solution | Solution | Haze |
| D1 | MeCN/water, | Heptane | Immiscible | Bi. Susp. | Bi. Susp. |
| D2 | 4:1 55 vol. | Benzotrifluoride | Haze | Suspension | Suspension |
| D3 | | 2-Chlorobutane | Haze | Suspension | Suspension |

Haze = Predominantly solution
Bi. Susp. = Biphasic with a susp. and clear solution layer

TABLE 11

Comparison of crystalline forms of solids arising from anti-solvent addition at 60° C. (See also Table 10) and reverse addition to anti-solvent at −10 °C

| | | Crystalline Form fate by XRPD | |
|---|---|---|---|
| Solvent | Anti-solvent | Addition at 60° C. | Reverse addition to anti-solvent at −10° C. |
| THF/water, 4:1 10 vol. | Heptane | N/A - insufficient solid | Low cryst. Form B |
| | Benzotrifluoride | Form A | Low cryst. Form B |
| | 2-Chlorobutane | Form A | Low cryst. Form B |
| THF 25 vol. | Heptane | Form B | Low cryst. Form B + evidence of C |
| | Benzotrifluoride | Form B | Low cryst. Form B |
| | 2-Chlorobutane | Form B | Low cryst. Form C |
| Nitromethane 50 vol. | Heptane | Form B | Form C |
| | Benzotrifluoride | Form B | Form C |
| | 2-Chlorobutane | Form C + evidence of B | Form B/C mix |
| MeCN/water, 4:1 55 vol. | Heptane | Form A | Form A |
| | Benzotrifluoride | Form A | Form B |
| | 2-Chlorobutane | Form A | Form B |

Rapidly cooled, reverse anti-solvent addition and subsequent equilibration at −10° C. for ca. 22 hours predominantly resulted in the formation of Form B, but with some instances of Form C or Form B/C mixed versions and only one instance of Form A.

The results demonstrate that the crystalline forms of 2-(2,6-dichlorophenyl)-5-[4-(1,1-dioxo-1,4-thiazinane-4-carbonyl)anilino]oxazole-4-carboxamide arising from solvent/anti-solvent crystallisations depends not only on the natures of the solvents but also on the temperatures at which the crystallisations are carried out.

Example 5

Conversion of Form A to Form B by Equilibration in Methylethylketone (MEK)

Crude crystalline Form A, 2.992 g (2.84 g active), and a crystalline Form B seed, ca. 3 mg, ca. 0.1 wt %, were weighed into a vessel. MEK, 6 vol., was charged into the vessel and the mixture warmed to 50° C. The resulting suspension was equilibrated at this temperature for ca. 19 hours and then cooled to 25° C. over 1½ hours. The solid was isolated via filtration followed by an MEK, 1 vol., vessel and filter wash. The washed solid was dried in vacuo under air for 1 hour and in vacuo at 45° C. for 19½ hours to afford 2.639 g of pale yellow solid, (88.2% mass recovery).

XRPD examination (diffractogram not shown) of the dried compound showed revealed a Form B diffraction pattern.

Thus, equilibration of crude crystalline Form A in MEK, 6 vol., at 50° C. successfully afforded Form B with a recovery of 88.2%, an increased active content of 97% (from 95%) and an improved CP of 98.85% (from 97.14%) on a 3 g scale.

The purity of the crystalline Form B can be improved still further by first equilibrating the Form A starting material in MeCN/water, 4:1, 4 vol., at 50° C., isolating and drying the purified Form A and then equilibrating the Form A in MEK as described above. In this way, crystalline Form B with an improved CP of 98.64%, and an active content of 99% can be obtained.

Example 6

Comparison of the Compression Stabilities of Crystalline Form a and Crystalline Form B Compression stability tests were carried out on samples from two batches of crystalline Form A and samples from two batches of Crystalline Form B. One pair of samples of Form A and Form B was subjected to compression under $10 \times 10^4 N$ force for 23 and 23¾ hours respectively to assess the impact upon form fate and chemical stability.

The other pair of samples of Form A and Form B was subjected to similar compression pressures over an extended duration of 7 days to assess the impact of prolonged compression force upon form fate and chemical stability.

XRPD examination of the Form A solids isolated post-compression demonstrated a diffraction pattern matching the input Form A but of reduced diffraction resolution following compression for both ca. 1 and 7 days, possibly due to limited sample or a reduction in the order of the solid.

XRPD examination of the Form B solids isolated post-compression demonstrated a diffraction pattern matching the input Pattern B but of reduced diffraction resolution following compression for both ca. 1 and 7 days, similar to Form A, possibly due to limited sample or a reduction in the order of the solid.

HPLC assessment of Form A, post-compression for 7 days, revealed significant chemical degradation. However, compression for ca. 1 day demonstrated no discernible chemical degradation, within experimental error.

HPLC assessment of Form B, post-compression for both ca. 1 and 7 days, revealed no change to the impurity profile of Pattern B, within experimental error.

The results of the tests showed that crystalline Form A was stable to relatively brief compression force, demonstrating no discernible chemical degradation but slightly reduced crystallinity by XRPD and DSC after 23 hours. However, compression for 7 days afforded significant chemical degradation.

On the other hand, crystalline Form B was stable to brief and prolonged compression force, demonstrating no discernible chemical degradation but slightly reduced crystallinity by XRPD and DSC.

Thus, Form B demonstrates improved stability to compression over Form A.

On the basis of the test results, it is considered that crystalline Form B would be better suited for solid formulations, and particularly those (such as tablets) that are prepared by processes involving compression steps.

Form A on the other hand may be better suited to the preparation of formulations that do not involve a compression step.

Example 7

Biological Activities (i) TYK2 and JAK Kinase Inhibition Assays

The compound of the formula (1) was assayed for its ability to inhibit TYK2 kinase and other JAK kinases. The activity of the compound was compared with the activities of Compound A (2-(2-chloro-6-fluoro-phenyl)-5-[4-(morpholine-4-carbonyl)-phenylamino]-oxazole-4-carboxylic acid amide) and Compound B (2-(2,6-dichloro-phenyl)-5-[4-(morpholine-4-carbonyl)-phenylamino]-oxazole-4-carboxylic acid amide):

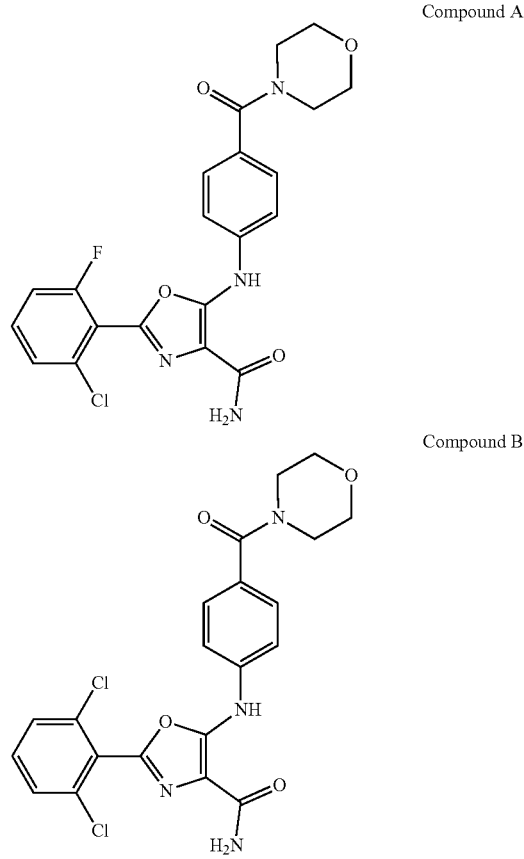

which are the compounds of Examples 25 and 29 respectively in each of WO 2015/032423 and WO2018/073438.

Substrates and kinases used in the assays are identified in Table 12 below.

Kinase assays were performed at Reaction Biology Corp., Malvern, Pennsylvania, USA, using the general procedure set out below. In the assays, the ATP concentration was 100 μM and the top compound concentrations were 10 μM.

Note that the TYK2 and JAK kinase data in Table 7 on page 61 of WO 2015/032423 were generated using an assay in which the ATP concentration was 10 μM whereas, as indicated above, the assay described in the protocol below used an ATP concentration of 100 μM.

Assay:

1) Prepare indicated substrate in freshly prepared Base Reaction Buffer (20 mM Hepes pH 7.5, 10 mM MgCl$_2$, 1 mM EGTA, 0.02% Brij35, 0.02 mg/ml BSA, 0.1 mM Na$_3$VO$_4$, 2 mM DTT, 1% DMSO).
2) Deliver cofactors (1.5 mM CaCl$_2$, 16 ug/mL Calmodulin, 2 mM MnCl$_2$) to the substrate solution above
3) Deliver indicated kinase into the substrate solution and gently mix
4) Deliver varying concentrations of test compound in DMSO into the kinase reaction mixture
5) Deliver $^{33}$P-ATP (specific activity 0.01 µCi/µL final) into the reaction mixture to initiate the reaction
6) Incubate kinase reaction for 120 min at room temperature
7) Reactions are spotted onto P81 ion exchange filter paper (Whatman #3698-915)
8) Unbound phosphate is removed by washing filters extensively in 0.75% Phosphoric acid.
9) $^{33}$P signal was determined using Typhoon phosphorimagers (GE Healthcare). After subtraction of background derived from control reactions containing inactive enzyme, IC$_{50}$ values were determined using the nonlinear regression function in Prism (Graphpad software).

(ii) Cytochrome P450 Inhibition Assays

The susceptibility of Compound (1) to potential drug-drug interactions was tested by assaying their abilities to inhibit various cytochrome P450 isoforms. Prior art Compound B (see Example 7(i) above) was also tested as a comparative example.

Test compounds, prepared and serially diluted in DMSO, were incubated at six concentrations (1% DMSO final) with pooled human liver microsomes in the presence of probe substrate for each isoform, and their effects on the metabolism of probe substrates determined. Incubations (in 96-well plates) were carried out at 37° C. in 0.1 M Tris buffer, pH 7.4, with reactions initiated by the addition of cofactor, NADPH (1 mM final concentration).

At the specified times, reactions were terminated with acetonitrile containing an analytical internal standard, samples were centrifuged and the supernatant fractions were analysed for probe substrate metabolites by mass spectrometry (LC-MS/MS). The instrument responses were normalised to internal standard and compared to the appropriate solvent controls to determine the amount of metabolite formed from the probe substrates relative to these "uninhibited" controls.

The results are reported as percentage inhibition and IC$_{50}$ values (concentration resulting in a 50% reduction in probe

TABLE 12

| Protein Name | HUGO symbol | Substrate | Genbank Accession # | Protein Accession # | Clone | Expression | Tag |
|---|---|---|---|---|---|---|---|
| JAK1 | JAK1 | pEY | NP_002218.2 | P23458 | aa 866-1154 | Baculovirus in Sf21 insect cells | N-terminal GST tag |
| JAK2 | JAK2 | pEY | NP_004963 | O60674 | aa 809-1132 + g | Baculovirus in Sf21 insect cells | N-terminal GST tag |
| JAK3 | JAK3 | JAK3tide | NP_000206 | P52333 | aa 781-1124 | Baculovirus in Sf21 insect cells | N-terminal GST tag |
| TYK2 | TYK2 | AXLtide | NP_003322.2 | P29597 | Aa 833-1187 | Baculovirus in Sf21 insect cells | N-terminal GST tag |

Substrates:
AXLtide = [KKSRGDYMTMQIG]
JAK3tide = [Ac-GEEEEYFELVKKKK-NH$_2$]
pEY = poly Glu-Tyr [Glu:Tyr (4:1), M.W. = 5,000-20,000]

The results are shown in Table 3 below.

TABLE 13

| | IC$_{50}$ (nM) | | | | Selectivity v TYK2 | | | |
|---|---|---|---|---|---|---|---|---|
| | TYK2 | JAK1 | JAK2 | JAK3 | TYK2 | JAK1 | JAK2 | JAK3 |
| Comparative Compound A | 10 | 49 | 87 | 290 | 1 | 4.9 | 8.7 | 29 |
| Comparative Compound B | 5.1 | 26 | 77 | 271 | 1 | 5.1 | 15.1 | 53.1 |
| Compound (1)-Example 1 | 1.9 | 20 | 50 | 212 | 1 | 10.5 | 26.3 | 111.6 |

Although all tested compounds were shown to possess good TYK2 inhibitory activity, the data illustrate that the compound of the formula (1) is both more potent and more selective with respect to TYK2 (particularly towards TYK2 over JAK2 and JAK3) than the prior art compounds A and B.

metabolite formation) were calculated using a non-linear sigmoidal dose response equation (BioBook):

% inhibition=lowest value+(highest value−lowest value)/(1+10^((Log IC$_{50}$−X)*HillSlope))

where X=Log concentration.

The CYP450 isoforms studied, and their respective probe substrates are shown in Table 14.

TABLE 14

| CYP450 isoform | Substrate |
|---|---|
| CYP1A2 | Phenacetin |
| CYP2B6 | Bupropion |
| CYP2C8 | Amodiaquine |
| CYP2C9 | Diclofenac |

TABLE 14-continued

| CYP450 isoform | Substrate |
|---|---|
| CYP2C19 | S-(+)-Mephenytoin |
| CYP2D6 | Dextromethorphan |
| CYP3A4 | Midazolam |
| CYP3A4 | Testosterone |

The assay results are shown in Table 15.

TABLE 15

| Compound | CYP 1A2 | CYP 2B6 | CYP 2C8 | CYP 2C19 | CYP 2C9 | CYP 2D6 | CYP 3A4 (MID) | CYP 3A4 (Test) |
|---|---|---|---|---|---|---|---|---|
| Comparative Compound B | >30 | >30 | >8.2 | >30 | 4.4 | >30 | >30 | >30 |
| Compound (1) | >30 | >30 | >30 | >30 | 26 | >30 | >30 | >30 |

Although all tested compounds show good CYP inhibition profiles, the data illustrate that the compound of the formula (1) has better CYP inhibition profiles (i.e. inhibit the CYP isoforms tested to a lesser extent) than the Comparative Compound B, particularly with respect to CYP2C8 and CYP2D6.

(iii) hERG Channel Inhibition Assay

The potential for compounds to inhibit the hERG potassium channel was determined using a hERG-HEK stably transfected cell line on the Sophion Qube automated electrophysiology platform. The assay was performed at room temperature and recordings of the hERG tail current from individual cells was made using single-hole QChips.

The potency ($IC_{50}$) of test compounds to inhibit the hERG channel was determined from a concentration-response curve generated from 8 test compound concentrations with up to 4 replicates per concentration.

The compound concentration was added to the test well twice to ensure complete exchange of the external buffer with the test compound. In total, compound was applied to the well for >7 minutes.

Results are shown in Table 16 below.

TABLE 16

| Compound | $IC_{50}$ (uM) | Max Conc. (uM) | % inhibition at Max. Conc. |
|---|---|---|---|
| Comparative Compound B | ~30 | 30 | 50.5 |
| Compound (1) | >30 | 30 | 38.6 |

All three tested compounds show relatively low hERG activity, but the results demonstrate that the compound of the formula (1) has an even lower hERG liability compared to prior art comparative Compound B.

(iv) Hepatocyte Stability Assay

The compound (1) and prior art comparative Compound B were tested in hepatocyte stability assays which were performed using pooled hepatocytes from mouse (male CD-1), rat (male Sprague-Dawley), dog (male Beagle) and human (mixed gender). Test and control compounds were incubated with hepatocytes at 37° C. Aliquots were removed at 6 timepoints over a one hour period. Samples were centrifuged and the supernatant fractions analysed for parent compound by mass spectrometry (LC-MS/MS).

The amount of compound remaining (expressed as %) was determined from the MS response in each sample relative to that in the T=0 samples, and used to determine the half-life and intrinsic clearance of the compound.

Results are shown in Table 17 below.

TABLE 17

| | Mouse | | Rat | | Dog | | Human | |
|---|---|---|---|---|---|---|---|---|
| Compound | $CL_{int}$ µL/min/ $10^6$ cells | $T_{1/2}$ mins. | $CL_{int}$ µL/min/ $10^6$ cells | $T_{1/2}$ mins. | $CL_{int}$ µL/min/ $10^6$ cells | $T_{1/2}$ mins. | $CL_{int}$ µL/min/ $10^6$ cells | $T_{1/2}$ mins. |
| Comparative Compound B | 40.5 | 27 | 103.7 | 14.8 | 29.8 | 53.5 | 9.0 | 124 |
| Compound (1) | 16.8 | 65.3 | 50.0 | 30.6 | <3.0 | >460 | <3.0 | >460 |

While comparative Compound B exhibits a good half-life in humans (over 2 hours), the data in Table 7 indicate that compound (1) has a significantly reduced rate of clearance in all four hepatocyte stability assays compared to prior art comparative Compound B and that, consequently, the half life ($T_{1/2}$) of the compound of the formula (1) is even longer in all four assays than the half life of the comparative Compound B.

(v) pSTAT3 Inhibition

The compound (1) and prior art comparative Compounds A and B were tested for pSTAT3 inhibition in response to IL-22 stimulation in serum starved HT29 cells.

HT29 cells were serum starved overnight before the four test compounds were diluted to generate a 9-point semi-log dose dilution with a top concentration of 10 µM, plus vehicle control. HT29 cells were incubated with the test compounds for 20 minutes at 37° C. HT29 cells were incubated for a further 15 minutes with 10 ng/ml human IL-22 before cells were fixed with 4% PFA for 10 minutes, and 90% methanol for 30 minutes before being labelled with a phospho-STAT3Y705 antibody (CST #9145). Cells were rinsed three times using 0.5% BSA/PBS solution before being incubated with Alexa-488 anti-rabbit secondary antibodies.

Mean fluorescence intensity of phospho-STAT3 in single cells was analysed by flow cytometry using an Intellicyt iQue instrument and FlowJo software. The $IC_{50}$ was determined using a four-parameter analysis following removal of background signal and normalisation to the DMSO control.

Results are shown in Table 18 below.

TABLE 18

| Test Compound | $IC_{50}$ (nM) | % pSTAT3 inhibition at 10 µM |
|---|---|---|
| Comparative Compound A | 170 | 96.9 |
| Comparative Compound B | 53 | 97.9 |
| Compound (1) | 16 | 95.9 |

While both comparative Compound B and Compound (1) were shown to have $IC_{50}$ values against pSTAT3 inhibition of less than 100 nM, the $IC_{50}$ value for Compound (1) was significantly lower than for comparative Compound B.

(vi) Human Primary CD4CD45RO+ Cells Assay

Inhibition of IL-17F production and STAT3 phosphorylation by Compound (1) and Comparative Compound B were measured in Th17 cells derived from human peripheral blood CD4CD45RO+ cells.

Fresh human Peripheral blood CD4CD45RO+ cells were purchased commercially (Generon, UK); 3 separate vials from 3 different volunteers for experimental replicates. Cells were grown in T-cell medium (Thermo Fisher) containing 10 ng/ml recombinant human IL-1B (R&D Systems), IL-23 (R&D Systems), TGF-B1 (R&D Systems) and 50 ng/ml IL-6 (R&D Systems) together with anti-CD3/CD28 magnetic Dynabeads (Thermo Fisher). These were grown for 11 days to induce expansion of Th17 cells. Prior to plating for assays cells were grown overnight in T-cell medium supplemented with human serum (1%) overnight. Media was removed and replaced with unsupplemented RPMI for 4 h prior to assay.

To measure IL-17F levels, 200,000 cells were plated into a 96 well plate and preincubated with compounds for 30 minutes followed by stimulation with recombinant IL-23 at 6.25 ng/ml and recombinant human IL-1B at 0.1 ng/ml for 48 h. Supernatants were removed and IL-17F levels measured using a commercially available ELISA kit (Thermo Fisher; BMS2037-2).

To measure pSTAT3 levels, 200,000 cells were plated into a 96 well plate and preincubated with compounds for 30 minutes followed by stimulation with recombinant IL-23 at 12.5 ng/ml for 15 minutes then lysed using cell lysis buffer. pSTAT3 levels in the lysates were measured using a commercially available ELISA kit (Thermo Fisher; 85-86102-11).

ELISAs were carried out according to manufacturers' instructions and absorbance read using a microplate reader (Thermo Fisher; Varioskan). Data were normalised to the response in untreated samples using the formula:

% of control=((Stimulated sample Conc.−unstimulated sample Conc.)×100)/(Control stimulated Conc.−control unstimulated Conc.)

Graphpad Prism 8.1.0 was used to calculate $IC_{50}$ values using a Nonlinear 4 parameter logistic regression model (4PL).

The results are shown in Tables 19A and 19B below:

TABLE 19A

IL17-F Production Inhibition

| Compound | Donor 1 | Donor 2 | Donor 3 | Average (nM) | SD |
| --- | --- | --- | --- | --- | --- |
| Comparative Compound B | 243 | 217 | 148 | 203 | 49 |
| Compound (1) | 117 | 134 | 64 | 105 | 37 |

TABLE 19B

Inhibition of STAT3 phosphorylation

| Compound | Donor 1 | Donor 2 | Donor 3 | Average (nM) | SD |
| --- | --- | --- | --- | --- | --- |
| Comparative Compound B | 111 | 17 | 54 | 61 | 47 |
| Compound (1) | 69 | 29 | 55 | 51 | 20 |

While all tested compounds showed inhibition of IL17-F production and STAT3 phosphorylation, in both assays Compound (1) was shown to be more active than comparative Compound B.

Comparative Data—Conclusions

The data obtained from assays (i) to (vi) above indicate that the compound of the formula (1) has significant advantages over the structurally most similar compound (Compound B) in WO2015/032423.

Thus, compound (1) is more active than Compound B in the TYK2 kinase inhibition assay and has greater selectivity for TYK2 versus JAK1, JAK2 and JAK3 kinases than Compound B.

Compound (1) has slightly advantageous properties compared to prior art comparative Compound B in the cytochrome P450 assays, notably in the CYP2C8 and CYP2C9 assays.

Compound (1) has a reduced hERG liability compared to prior art comparative Compound B.

In the hepatocyte stability assays, Compound (1) showed a reduced rate of clearance and a consequently longer half life than comparative Compound B.

In addition, Compound (1) is more potent in inhibiting phosphorylation of STAT3 in IL-22 stimulated HT29 cells and Th17 cells compared to comparative Compound B.

Finally, Compound (1) shows a greater inhibition of IL-17F production in Th17 cells compared to comparative Compound B.

Taken together, the data indicate that Compound (1) is a highly potent and selective TYK2 kinase inhibitors and has excellent pharmacokinetic properties.

Example 7

Pharmaceutical Formulations (i) Tablet Formulation

A tablet composition containing a crystalline form of the compound of the formula (1) as defined herein is prepared by mixing 50 mg of the compound with 197 mg of lactose (BP) as diluent, and 3 mg magnesium stearate as a lubricant and compressing to form a tablet in a known manner.

(ii) Capsule Formulation

A capsule formulation is prepared by mixing 100 mg of a crystalline form of the compound of the formula (1) as defined herein with 100 mg lactose and filling the resulting mixture into standard opaque hard gelatin capsules.

(iii) Sub-Cutaneous Injection Formulation

A composition for sub-cutaneous administration is prepared by mixing a crystalline form of the compound of the formula (1) as defined herein with pharmaceutical grade corn oil to give a concentration of 5 mg/mL. The composition is sterilised and filled into a suitable container.

EQUIVALENTS

The foregoing examples are presented for the purpose of illustrating the invention and should not be construed as imposing any limitation on the scope of the invention. It will readily be apparent that numerous modifications and alterations may be made to the specific embodiments of the invention described above and illustrated in the examples without departing from the principles underlying the invention. All such modifications and alterations are intended to be embraced by this application.

The invention claimed is:

1. A substantially crystalline form (Form B) of a compound of formula (1):

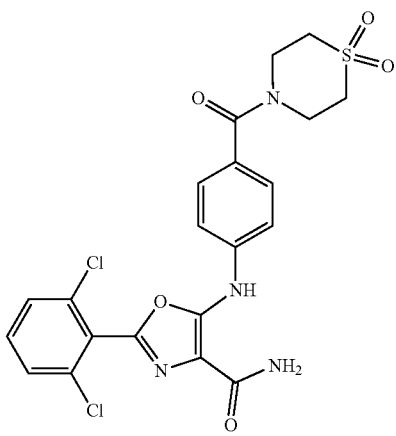 [SMILES: NC(=O)c1nc(-c2c(Cl)cccc2Cl)oc1Nc1ccc(C(=O)N2CCS(=O)(=O)CC2)cc1]

having an X-ray powder diffraction pattern characterised by the presence of major peaks at the diffraction angles (2θ) 23.2° and/or 16.7° and/or 22.6° and/or 26.6° and/or 12.0° (±0.2°).

2. A substantially crystalline form (Form B) of the compound of formula (1) according to claim 1 having an X-ray powder diffraction pattern characterised by the presence of major peaks at two or more diffraction angles (2θ) selected from 23.2°, 16.7°, 22.6°, 26.6° and 12.0° (±0.2°).

3. A substantially crystalline form (Form B) of the compound of formula (1) according to claim 1 having an X-ray powder diffraction pattern characterised by the presence of major peaks at the diffraction angles (2θ) 23.2° and/or 16.7° and/or 22.6° and/or 26.6° and/or 12.0° (±0.2°), and one or more further peaks at diffraction angles (2θ) selected from 23.4°, 25.3°, 7.1°, 19.9° and 27.8° (±0.2°).

4. A method for the preparation of a substantially crystalline form (Form B) of compound (1) as defined in claim 1, which method comprises:

(i) dispersing an amorphous form of compound (1) in a solvent selected from hydrocarbon solvents, halogenated hydrocarbon solvents, methanol, isopropyl alcohol, aliphatic ketones, non-aromatic ethers, and isopropylacetate, wherein the solvent is not dichloromethane, to form a mixture;

(ii) heating the mixture to a moderately elevated temperature in the range from 45-65° C. and holding the mixture at the moderately elevated temperature for a period of at least 10 hours;

(iii) cooling or allowing the cooling of the mixture from the moderately elevated temperature to a lower temperature in the range from 15-30° C. and holding the mixture at the lower temperature for a period of at least 2 hours; and (iv) optionally subjecting the mixture to a further heating and cooling cycle comprising heating the mixture to a moderately elevated temperature in the range from 45-65° C. and holding the mixture at the moderately elevated temperature for a period of at least 10 hours; cooling the mixture to a lower temperature in the range from 15-30° C. and optionally holding the mixture at the lower temperature for a period of at least half an hour; and (v) isolating the crystalline Form B of compound (1) thus formed.

5. A method for the preparation of a substantially crystalline form (Form B) of compound (1) as defined in claim 1, which method comprises:

(i) dispersing a solid form of compound (1) in methylethylketone (MEK) to form a mixture;

(ii) subjecting the mixture to an equilibration procedure comprising periods of heating and cooling the mixture until a suspension of crystalline Form B is formed; and optionally further equilibrating the mixture until a desired level of polymorphic purity is achieved.

6. A pharmaceutical composition comprising a crystalline form of a compound having the formula (1) as defined in claim 1 and a pharmaceutically acceptable excipient.

7. A pharmaceutical composition comprising a crystalline form of a compound having the formula (1) as defined in claim 2 and a pharmaceutically acceptable excipient.

8. A pharmaceutical composition comprising a crystalline form of a compound having the formula (1) as defined in claim 3 and a pharmaceutically acceptable excipient.

9. A substantially crystalline form (Form B) of the compound of formula (1) according to claim 8 having an X-ray powder diffraction pattern characterized by the presence of major peaks at the diffraction angles (2θ) 23.2°, 16.7°, 22.6°, 26.6° and 12.0° (±0.2°), and one or more further peaks at diffraction angles (2θ) selected from 23.4°, 25.3°, 7.1°, 19.9° and 27.8° (±0.2°), and one or more further peaks at diffraction angles (2θ) selected from 14.2°, 27.0°, 24.1°, 28.9° and 14.5° (±0.2°).

10. A substantially crystalline form (Form B) of the compound of formula (1) according to claim 1 having a DSC thermogram characterized by an endotherm with an onset and maxima at about 230° C. and about 233° C.

11. A substantially crystalline form (Form B) of the compound of formula (1) according to claim 1 having a crystalline purity of at least 90%.

12. A substantially crystalline form (Form B) of the compound of formula (1) according to claim 2 having a crystalline purity of at least 90%.

13. A substantially crystalline form (Form B) of the compound of formula (1) according to claim 1 having a crystalline purity of at least 95%.

14. A method for the preparation of a substantially crystalline form (Form B) of compound (1) as defined in claim 2, which method comprises:
(i) dispersing an amorphous form of compound (1) in a solvent selected from hydrocarbon solvents, halogenated hydrocarbon solvents, methanol, isopropyl alcohol, aliphatic ketones, non-aromatic ethers, and isopropylacetate, wherein the solvent is not dichloromethane, to form a mixture;
(ii) heating the mixture to a moderately elevated temperature in the range from 45-65° C. and holding the mixture at the moderately elevated temperature for a period of at least 10 hours;
(iii) cooling or allowing the cooling of the mixture from the moderately elevated temperature to a lower temperature in the range from 15-30° C. and holding the mixture at the lower temperature for a period of at least 2 hours; and
(iv) optionally subjecting the mixture to a further heating and cooling cycle comprising heating the mixture to a moderately elevated temperature in the range from 45-65° C. and holding the mixture at the moderately elevated temperature for a period of at least 10 hours; cooling the mixture to a lower temperature in the range from 15-30° C. and optionally holding the mixture at the lower temperature for a period of at least half an hour; and
(v) isolating the crystalline Form B of compound (1) thus formed.

15. A method for the preparation of a substantially crystalline form (Form B) of compound (1) as defined in claim 3, which method comprises:
(i) dispersing an amorphous form of compound (1) in a solvent selected from hydrocarbon solvents, halogenated hydrocarbon solvents, methanol, isopropyl alcohol, aliphatic ketones, non-aromatic ethers, and isopropylacetate, wherein the solvent is not dichloromethane, to form a mixture;
(ii) heating the mixture to a moderately elevated temperature in the range from 45-65° C. and holding the mixture at the moderately elevated temperature for a period of at least 10 hours;
(iii) cooling or allowing the cooling of the mixture from the moderately elevated temperature to a lower temperature in the range from 15-30° C. and holding the mixture at the lower temperature for a period of at least 2 hours; and
(iv) optionally subjecting the mixture to a further heating and cooling cycle comprising heating the mixture to a moderately elevated temperature in the range from 45-65° C. and holding the mixture at the moderately elevated temperature for a period of at least 10 hours; cooling the mixture to a lower temperature in the range from 15-30° C. and optionally holding the mixture at the lower temperature for a period of at least half an hour; and
(v) isolating the crystalline Form B of compound (1) thus formed.

16. A method for the preparation of a substantially crystalline form (Form B) of compound (1) as defined in claim 2, which method comprises:
(i) dispersing a solid form of compound (1) in methylethylketone (MEK) to form a mixture;
(ii) subjecting the mixture to an equilibration procedure comprising periods of heating and cooling the mixture until a suspension of crystalline Form B is formed; and optionally further equilibrating the mixture until a desired level of polymorphic purity is achieved.

17. A method for the preparation of a substantially crystalline form (Form B) of compound (1) as defined in claim 3, which method comprises:
(i) dispersing a solid form of compound (1) in methylethylketone (MEK) to form a mixture;
(ii) subjecting the mixture to an equilibration procedure comprising periods of heating and cooling the mixture until a suspension of crystalline Form B is formed; and optionally further equilibrating the mixture until a desired level of polymorphic purity is achieved.

18. A substantially crystalline form (Form B) of the compound of formula (1) according to claim 1 having an X-ray powder diffraction pattern characterised by the presence of major peaks at three or more diffraction angles (2θ) selected from 23.2°, 16.7°, 22.6°, 26.6° and 12.0° (±0.2°).

19. A substantially crystalline form (Form B) of the compound of formula (1) according to claim 1 having an X-ray powder diffraction pattern characterised by the presence of major peaks at four or more diffraction angles (2θ) selected from 23.2°, 16.7°, 22.6°, 26.6° and 12.0° (±0.2°).

20. A substantially crystalline form (Form B) of the compound of formula (1) according to claim 1 having an X-ray powder diffraction pattern characterised by the presence of major peaks at five or more diffraction angles (2θ) selected from 23.2°, 16.7°, 22.6°, 26.6° and 12.0° (±0.2°).

* * * * *

SEQUENCE LISTING

```
<160> NUMBER OF SEQ ID NOS: 2

<210> SEQ ID NO 1
<211> LENGTH: 13
<212> TYPE: PRT
<213> ORGANISM: Artificial sequence
<220> FEATURE:
<223> OTHER INFORMATION: Laboratory synthesized sequence

<400> SEQUENCE: 1

Lys Lys Ser Arg Gly Asp Tyr Met Thr Met Gln Ile Gly
1               5                   10

<210> SEQ ID NO 2
<211> LENGTH: 14
<212> TYPE: PRT
<213> ORGANISM: Artificial sequence
<220> FEATURE:
<223> OTHER INFORMATION: Laboratory synthesized sequence

<400> SEQUENCE: 2

Gly Glu Glu Glu Glu Tyr Phe Glu Leu Val Lys Lys Lys Lys
1               5                   10
```